United States Patent [19]

Kawai et al.

[11] Patent Number: 5,715,436
[45] Date of Patent: Feb. 3, 1998

[54] IMAGE PROCESSING LSI CIRCUIT WITH IMAGE PREPROCESSING, FEATURE EXTRACTION AND MATCHING

[75] Inventors: Hiroyuki Kawai; Yoshitsugu Inoue; Robert Streitenberger, all of Itami, Japan

[73] Assignee: Mitsubishi Denki Kabushiki Kaisha, Tokyo, Japan

[21] Appl. No.: 510,125

[22] Filed: Aug. 1, 1995

[30] Foreign Application Priority Data

Aug. 5, 1994 [JP] Japan .................... 6-185011

[51] Int. Cl.⁶ .................. G06F 15/80; G06T 1/60
[52] U.S. Cl. .......................... 395/505; 395/508
[58] Field of Search .................. 395/502, 505, 395/506, 508; 345/213, 201

[56] References Cited

U.S. PATENT DOCUMENTS

| | | | |
|---|---|---|---|
| 4,941,182 | 7/1990 | Patel | 382/141 |
| 4,985,848 | 1/1991 | Pfeiffer er al. | 395/164 |
| 5,291,189 | 3/1994 | Otake et al. | 345/200 |
| 5,325,189 | 6/1994 | Mimura | 348/231 |
| 5,560,029 | 9/1996 | Papadopoulos et al. | 395/800 |

FOREIGN PATENT DOCUMENTS 4 44306  7/1992  Japan .

OTHER PUBLICATIONS

PC-Hardwarebuch, Addison-Wesley, pp. 124–133, 1992, Klaus-Peter Messmer, "Aufbau, Funktionsweise, Programmierung Ein Handbuch Nicht Nur Fuer Profis".

Double Speed, pp. 102/104, Apr. 1992, Georg Schnurer, "i486 DX2—Intels 50–MHz–Prozessor Fuer Aufsteiger".

VLSI and Modern Signal Processing, pp. 434–450, 1985, S. Y. Kung, et al., "VLSI Architectures for Pattern Analysis and Image Database Management".

IEEE Journal of Solid-State Circuits, vol. 24, No. 2, pp. 338–348, Apr. 1989, P. Ruetz, "The Architectures and Design of a 20–MHz Real–Time DSP Chip Set".

*Primary Examiner*—Raymond J. Bayerl
*Assistant Examiner*—Cao H. Nguyen
*Attorney, Agent, or Firm*—Oblon, Spivak, McClelland, Maier & Neustadt, P.C.

[57] ABSTRACT

There is disclosed a high-speed programmable image processing LSI circuit adaptable to image preprocessing, feature extraction, and matching, which includes a DMA transfer control portion (4) for DMA transfer which reads input data from an external memory to transfer the input data to data memories in the LSI circuit; a sequence control portion (8), an instruction memory (7), and an address generating portion (3) which control writing to and reading from the data memories in response to an instruction code; the DMA transfer control portion (4) accommodating a wait time caused during external data transfer to prevent the wait time from affecting instruction code control in the LSI circuit; SIMD type processing units arranged in parallel and connected to output lines of the data memories for completing the process steps of image processing in cooperation with a postprocessing portion which in turn provides an output signal (54) to the exterior and accommodates a wait time at this time.

20 Claims, 42 Drawing Sheets

FIG. 8

| | 0 | 1 | 2 | 3 | 4 | 5 | 6 | 7 | 8 | 9 |
|---|---|---|---|---|---|---|---|---|---|---|
| | 10 | 11 | 12 | 13 | 14 | 15 | 16 | 17 | 18 | 19 |
| | 20 | 21 | 22 | 23 | 24 | 25 | 26 | 27 | 28 | 29 |
| (i−1)-TH ROW → | 30 | 31 | 32 | 33 | 34 | 35 | 36 | 37 | 38 | 39 |
| i-TH ROW → | 40 | 41 | 42 | 43 | 44 | 45 | 46 | 47 | 48 | 49 |
| (i+1)-TH ROW → | 50 | 51 | 52 | 53 | 54 | 55 | 56 | 57 | 58 | 59 |
| | 60 | 61 | 62 | 63 | 64 | 65 | 66 | 67 | 68 | 69 | j-TH COLUMN 22

| CLASSIFICATION | NAME | SYMBOL | FUNCTION | NUMBER OF BITS |
|---|---|---|---|---|
| TRANSFER MODE CONTROL REGISTER | DMA CONTROL REGISTER | DMCR | OPERATION CONTROL OF DMA PORTION | 16BITS |
| | TRANSFER WORD COUT REGISTER | DMWCR | INDICATION OF TRANSFER WORD COUNT | 16BITS |
| EXTERNAL DATA MEMORY ADDRESS CONTROL | FAME HORIZONTAL SIZE REGISTER | DMFHR | INDICATION OF HORIZONTAL SIZE OF TWO-DIMENSIONAL ADDRESS SPACE | 10BITS |
| | BLOCK HORIZONTAL SIZE REGISTER | DMBHR | INDICATION OF HORIZONTAL SIZE OF TRANSFER TWO-DIMENSIONAL DATA BLOCK | 10BITS |
| | BLOCK START ADDRESS REGISTER | DMBSR | INDICATION OF START ADDRESS TRANSFER TWO-DIMENSIONAL DATA BLICK | 16BITS |
| INTERNAL DATA MEMORY ADDRESS CONTROL | SCALAR START ADDRESS REGISTER | DMSSR | INDICATION OF RANSFER START ADDRESS OF INTERNAL DATA MEMORY | 11BITS |

F I G. 39

| No | CLASSIFICATION | NAME | SYMBOL | FUNCTION | NUMBER OF BITS |
|---|---|---|---|---|---|
| 1 | | LINKING MODE REGISTER | LUMDR | SELECTION OF LINK/SORT UNIT MODE | 8 BITS |
| 2 | LINKING CONTROL REGISTER | PU COUNT REGISTER | LUNPU | EFFECTIVE PU COUNT | 4 BITS |
| 3 | | STORED SORT RESULT COUNT REGISTER | LUNWR | STORED SORT RESULT COUNT | 4 BITS |
| 4 | | INPUT VECTOR COUNT REGISTER | LUNIV | INPUT VECTOR COUNT | 3 BITS |
| 5 | | TEMPLATE COUNT REGISTER | LUNWD | TEMPLATE COUNT | 16 BITS |

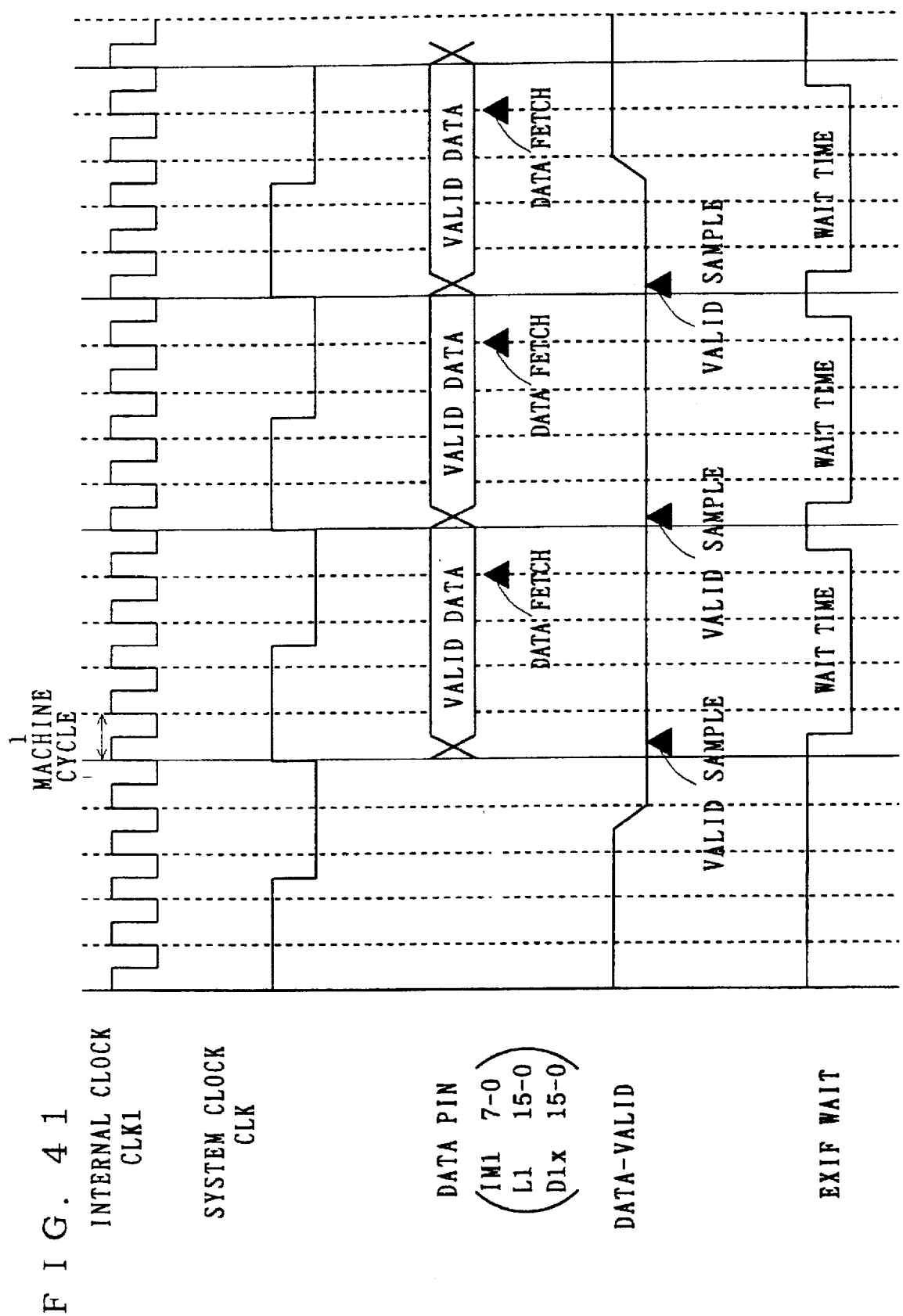

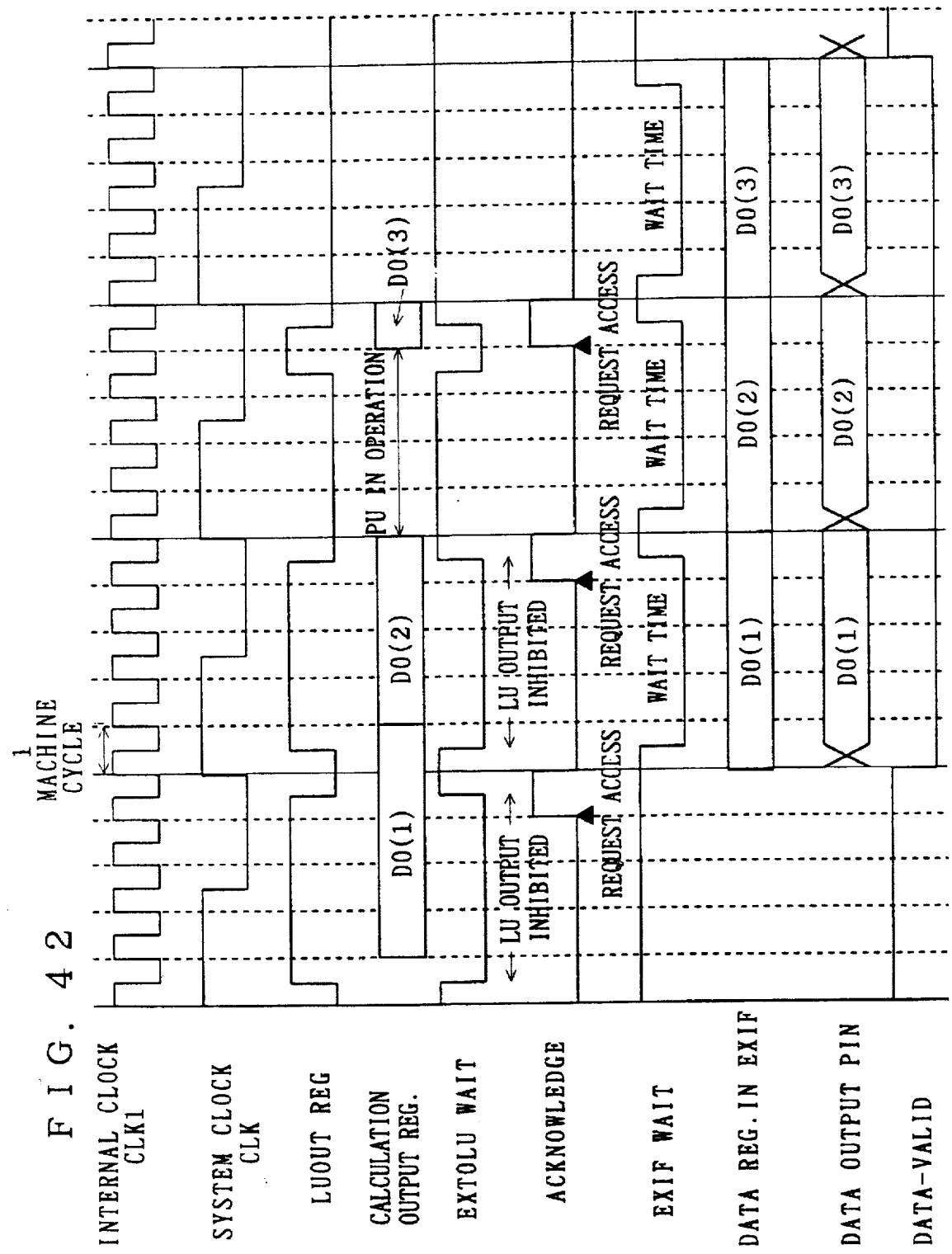

IMAGE PROCESSING LSI CIRCUIT WITH IMAGE PREPROCESSING, FEATURE EXTRACTION AND MATCHING

BACKGROUND OF THE INVENTION

1. Field of the Invention

The present invention relates to an LSI structure for various types of image processing based on picture information in FA (factory automation) and the like and image processing for use in a system for processing image data for an OCR (optical character reader) and the like. More particularly, the invention relates to an image processing LSI architecture for rapidly executing local parallel image processing (first image processing step) such as a spatial sum-of-product operation, feature parameter extraction (second image processing step) for determining a fillet diameter and an area, and feature vector matching (third image processing step) for selecting a template similar to an object of interest on the basis of a feature parameter, with easy throughput improvement by a multiprocessor construction.

2. Description of the Background Art

Image processing is carried out in generally three steps. The first image processing step is known as image preprocessing mainly including spatial filtering such as noise elimination.

In the image preprocessing, a spatial filter of a fixed size extracted from raster image data is subjected to a predetermined matrix calculation to determine the sum of elements of the resultant matrix. For example, when spatial filtering of 3×3 pixel size is executed on a pixel $a_{ij}$ in the i-th row, j-th column, the matrix calculation is:

$$\begin{pmatrix} a_{(i-1)(j-1)} & a_{(i-1)j} & a_{(i-1)(j+1)} \\ a_{i(j-1)} & a_{ij} & a_{i(j+1)} \\ a_{(i+1)(j-1)} & a_{(i+1)j} & a_{(i+1)(j+1)} \end{pmatrix} \begin{pmatrix} C_1 & C_2 & C_3 \\ C_4 & C_5 & C_6 \\ C_7 & C_8 & C_9 \end{pmatrix} \quad (1)$$

The sum of the resultant matrix elements is used as a new pixel in the i-th row, j-th column. In Expression (1), the matrix C is a 3×3 matrix of predetermined coefficient values.

The second image processing step is known as feature extraction in which the features of the image data (pixels) shaped by the preprocessing are extracted as numeric data from the image data. An example of the features includes a measure of the area of black portions forming a character. The feature extraction corresponds to conditional branch processing.

In the third image processing step, it is examined to which template the object of interest is most similar among prepared dictionaries (referred to hereinafter as templates) by using the feature parameters (sometimes handled as vector quantities) extracted in the second image processing step. Some applications do not employ all of these image processing steps.

The preprocessing is a mathematically simple matrix calculation but requires (F×F) sum-of-product calculations to calculate the result of one pixel where the spatial filter is of a F×F pixel size. Thus, a number of high-speed LSI circuits for this purpose only have been developed. However, these LSI circuits are optimized for high-speed processing of simple matrix calculations but do not meet the requirement of the second and third image processing steps. Otherwise, the LSI circuits provide very low performance when applied to the second and third image processing steps, failing to take full advantage of original high-speed processing thereof.

The second image processing step needs complicated conditional branch processing and employs image data as input data, resulting in a large amount of processing calculations. The third image processing step does not need the conditional branch processing but requires the calculation of similarity measures to various dictionary data and sorting of the calculated similarity measures. Particularly for the OCR using large dictionaries (templates), the amount of calculations in the third image processing step is comparable to that in the first image processing step. The LSI circuits adaptable to the second image processing step which have been heretofore developed have a programmability adaptable to the conditional branch processing but are not designed to speed up the processing employing the spatial parallel property of two-dimensional image data, resulting in a low processing rate. LSI circuits for softing in the third image processing step have already been developed, but no LSI circuits containing a similarity measure calculating function and a sorting function in the same chip have yet been developed. This is because the LSI circuits containing the similarity measure calculating function and the sorting function in the same chip find limited applications. In this manner, the LSI circuits optimum for each of the first to third image processing steps are available but there are no LSI circuits which can process all of the first to third image processing steps in the same chip in the current state of the art.

The current state of the art in image processing and image processing LSI circuits has been described above and, accordingly, the construction of an image processing system has required to collect LSI circuits suitable for each of the first to third image processing steps and design/develop a board from the ground up by using the LSI circuits. The combination of the LSI circuits each of which can individually afford high-speed processing causes parasitic capacitances on interconnection lines, resulting in a low processing rate.

Further, when system specifications are changed, e.g. a filter size is changed, a need arises to change the number of pins to permit different LSI circuits to be used. This necessitates the development of a new board.

Based on the above stated background, the technical challenge has been presented to develop a high-speed programmable processor (image processing LSI circuit) adaptable to all of the first to third image processing steps.

SUMMARY OF THE INVENTION

According to a first aspect of the present invention, an image processing LSI circuit comprises: clock signal generating means for multiplying an externally applied basic clock to generate a clock; data memory means; DMA transfer control means for reading and transferring an input data signal to be subjected to image processing from an external memory storing the input data signal in response to the basic clock to write the transferred input data signal to the data memory means in response to a write address signal, the write address signal being generated in response to the clock; an instruction memory for storing an instruction code signal; and control means for generating a read address signal synchronized with the clock in response to the instruction code signal read from the instruction memory to control reading of the input data signal from the data memory means by outputting the read address signal.

Preferably, according to a second aspect of the present invention, the data memory means comprises a plurality of data memories, and the image processing comprises first image processing and second image processing, and the image processing LSI circuit further comprises: a plurality of SIMD type processing units provided in corresponding relation to outputs of the plurality of data memories for executing the first image processing by parallel calculation processing in response to the clock; and a postprocessing portion connected to outputs of the plurality of processing units for executing the second image processing in response to the clock to output an output data signal to the exterior.

Preferably, according to a third aspect of the present invention, the plurality of data memories and the plurality of processing units include first to N-th data memories and first to N-th processing units ($N \geq 2$), respectively, and an input of the first data memory is connected to an output of the DMA transfer control means, and inputs of the second to N-th data memories are connected to outputs of the first to (N−1)-th data memories, respectively.

Preferably, according to a fourth aspect of the present invention, the plurality of data memories are separately connected to the DMA transfer control means.

Preferably, according to a fifth aspect of the present invention, the plurality of data memories and the plurality of processing units include first to N-th data memories and first to N-th processing units ($N \geq 2$), respectively, and the DMA transfer control means includes N outputs ($N \geq 2$), and the image processing LSI circuit further comprises: first to (N−1)-th selector means having outputs connected to inputs of the second to N-th data memories, respectively, wherein an input of one of the selector means corresponding to an i-th one ($2 \leq i \leq N$) of the data memories is connected to an i-th one of the outputs of the DMA transfer control means and an output of an (i−1)-th one of the data memories, and wherein the selector means switch their inputs in response to a select signal outputted from the control means.

Preferably, according to a sixth aspect of the present invention, a connection between the input of the first data memory and the first output of the DMA transfer control means and a connection between the input of one of the selector means connected to the input of the i-th data memory and the i-th output of the DMA transfer control means are established by N first data buses, respectively.

Preferably, according to a seventh aspect of the present invention, connections between the outputs of the processing units and the postprocessing portion are established by second data buses equal in number to the processing units, respectively.

Preferably, according to an eighth aspect of the present invention, each of the data memories comprises a plurality of banks, and while the DMA transfer control means writes the input data signal to one of the plurality of banks in response to the write address signal, the control means reads the input data signal which has been written from the next one of the banks in response to the read address signal.

Preferably, according to a ninth aspect of the present invention, the image processing LSI circuit further comprises: processing unit output control means connected between the plurality of processing units and the postprocessing portion for judging whether or not the postprocessing portion is in a wait state only when the plurality of processing units output processing results, the processing unit output control means causing the plurality of processing units to stop outputting the processing results when the postprocessing portion is in the wait state, the processing unit output control means permitting the plurality of processing units to output the processing results when the postprocessing portion is not in the wait state.

Preferably, according to a tenth aspect of the present invention, the postprocessing portion performs linking or sorting of processing results of the plurality of processing units as the second image processing.

Preferably, according to an eleventh aspect of the present invention, the image processing LSI circuit further comprises: data input ports arranged in parallel and receiving the externally applied input data signal to be applied to the plurality of processing units for transferring the input data signal to the DMA transfer control means; data output ports arranged in parallel and receiving a processing result of the postprocessing portion for outputting the processing result to the exterior; and a link output port receiving a linking result of the postprocessing portion for outputting the linking result to the exterior.

Preferably, according to a twelfth aspect of the present invention, the image processing LSI circuit further comprises: an input data signal output port connected to an output of the N-th data memory for receiving the input data signal delayed in the plurality of data memories to output the input data signal to the exterior.

Preferably, according to a thirteenth aspect of the present invention, the image processing LSI circuit further comprises: a link input port receiving an externally applied linking intermediate result for transferring the result to the postprocessing portion.

Preferably, according to a fourteenth aspect of the present invention, each of the plurality of processing units comprises a first output connected to the postprocessing portion and a second output connected with a fourth data bus to an input of one of the data memories which transmits the input data signal to a first input of the each processing unit through a third data bus.

Preferably, according to a fifteenth aspect of the present invention, the control means and the plurality of processing units are connected to each other with an immediate data transfer data bus for transferring immediate data of the control means to the processing units.

Preferably, according to a sixteenth aspect of the present invention, the first to N-th data memories and the first to N-th processing units are connected to each other with a broadcast transfer data bus for transferring and applying a data signal read from one of the first to N-th data memories to all of the first to N-th processing units.

Preferably, according to a seventeenth aspect of the present invention, the image processing LSI circuit further comprises: N first image processing result transfer data buses for connecting the first outputs of the processing units associated therewith to the postprocessing portion; and N processing unit input selector means each having an input connected to a corresponding one of the N first image processing result transfer data buses and an output connected to a second input of a corresponding one of the processing units, wherein the control means outputs a processing unit input select signal to the N processing unit input selector means to control outputs from the N processing unit input selector means.

Preferably, according to an eighteenth aspect of the present invention, the control means comprises: a control register for holding a control information signal for generation of a control signal in the image processing LSI circuit; and a register selector for selectively outputting data read from the broadcast transfer data bus and data read from the immediate data transfer data bus to the control register.

In the first aspect of the present invention, the clock signal generating means multiplies the basic clock to generate the clock to output the clock to the DMA transfer control means, the instruction memory, and the control means. On receipt of the basic clock, the DMA transfer control means reads and transfers the input data signal from the external memory in response to the basic clock. The wait time generated at this time is accommodated by the DMA transfer control means. The DMA transfer control means writes the transferred input data signal to the data memory means in response to the write address signal synchronized with the clock.

The control means reads the instruction code signal from the instruction memory in response to the clock to produce the read address signal synchronized with the clock in response to the instruction code signal. The control means outputs the read address signal to the data memory means to read the input data signal from the data memory means.

In the second aspect of the present invention, the DMA transfer control means outputs the write address signal to the data memories to write the input data signal to the data memories in synchronism with the clock. The control means outputs the read address signal to the data memories to reads the input data signal from the data memories in synchronism with the clock. This causes the data memories to output the read input data signal to the processing units corresponding thereto.

The processing units receiving the input data signal execute the first image processing by the parallel calculation processing in response to the clock to output the result to the postprocessing portion. Upon receipt of the result of the first image processing, the postprocessing portion executes the second image processing in response to the clock to output the processing result as the output data signal to the exterior.

In the third aspect of the present invention, the DMA transfer control means outputs the write address signal to the N data memories and outputs the input data signal to the first data memory. The control means outputs the read address signal synchronized with the write address signal to the data memories. The input data signal read from the first data memory in response to the read address signal is applied to the first processing unit and is written to the second data memory in response to the write address signal. Then each of the third to N-th data memories is written with the input data signal outputted from its preceding data memory in response to the write address signal and outputs the input data signal stored therein to the corresponding processing unit and the next data memory in response to the read address signal.

In the fourth aspect of the present invention, the DMA transfer control means transfers and writes the externally applied input data signal to the data memories. Each of the processing units receives the input data signal read from the corresponding data memory to execute the first image processing.

In the fifth aspect of the present invention, the control means and the selector means control the input data signal written to and read from the data memories. That is, when the selector means connects the input of the i-th data memory (2≦i≦N) to the i-th output of the DMA transfer control means in response to the select signal outputted from the control means, the input data signal transferred from the i-th output of the DMA transfer control means is applied directly to the i-th data memory. As a matter of course, the input data signal transferred from the first output of the DMA transfer control means is applied directly to the first data memory.

On the other hand, when the selector means connects the input of the i-th data memory to the output of the (i-1)-th data memory, the DMA transfer control means only at its first output directly provides the externally applied input data signal to the first data memory. The first data memory is written with the input data signal in response to the write address signal and directly applies the input data signal stored therein to the second data memory in response to the read address signal synchronized with the write address signal. Each of the second to N-th data memories (i-th data memory) is written with the input data signal outputted from the (i-1)-th data memory in synchronism with the output of the (i-1)-th data memory and outputs the input data signal stored therein to the (i+1)-th data memory in synchronism with the write operation.

In the sixth aspect of the present invention, the input data signal outputted from the first output of the DMA transfer control means is transferred through the first one of the first data buses to the input of the first data memory. The input data signal outputted from each of the second to N-th outputs (i-th output) of the DMA transfer control means is transferred through the i-th one of the first data buses to the input of the i-th selector means.

In the seventh aspect of the present invention, each of the processing units transfers the output result of the first image processing through the corresponding one of the second data buses to the postprocessing portion.

In the eighth aspect of the present invention, writing and reading of the input data signal in the data memories are carried out in a manner to be described below. While the input data signal is written to one of the plurality of banks, the input data signal is read from the next bank storing the input data signal in synchronism with the write operation.

In the ninth aspect of the present invention, the processing unit output control means detects whether or not the postprocessing portion is in the wait state when the plurality of processing units reach the step of outputting the processing results thereof. If the postprocessing portion is not in the wait state, the processing unit output control means permits the plurality of processing units to output the first image processing results. If the postprocessing portion is in the wait state, the processing unit output control means causes the plurality of processing units to stop outputting the processing results, and then the processing units interrupt their operation into the wait state at this stage.

In the tenth aspect of the present invention, the postprocessing portion has the linking and sorting functions.

In the eleventh aspect of the present invention, the externally applied input data signal is transferred through the data input ports arranged in parallel to the DMA transfer control means. The postprocessing portion outputs the processing result to the exterior through the data output ports arranged in parallel or the link output port depending upon the contents of the image processing.

In the twelfth aspect of the present invention, the N-th data memory outputs the input data signal stored therein to the output port under the control of the read address signal outputted from the control means. This allows the input data signal delayed in the plurality of data memories to be outputted to the exterior through the output port.

In the thirteenth aspect of the present invention, the externally applied linking intermediate result is transferred to the postprocessing portion through the link input port. The postprocessing portion receives the linking intermediate result to continue performing the subsequent linking to output the linking result to the exterior through the link output port.

In the fourteenth aspect of the present invention, each of the data memories outputs the input data signal stored therein to the corresponding processing unit through the third data bus. Each of the processing units then applies the calculation result to the corresponding data memory through the fourth data bus.

In the fifteenth aspect of the present invention, the control means transfers the immediate data to the processing units through the immediate data transfer data bus.

In the sixteenth aspect of the present invention, when one of the N data memories outputs the data signal stored therein to the broadcast transfer data bus, the data signal is transferred through the broadcast transfer data bus to all of the processing units. This allows the processing units to execute the calculation using the immediate data and the data signal on the broadcast transfer data bus.

In the seventeenth aspect of the present invention, each of the processing unit input selector means selects one of the N first image processing result transfer data buses which is connected in response to the processing unit input select signal outputted from the control means to output the data signal on the selected data bus to the corresponding processing unit.

In the eighteenth aspect of the present invention, the calculation results of the processing units are stored in the data memories through the fourth data bus. One of the data memories outputs the calculation result to the register selector through the broadcast transfer data bus. Further, the data signal on the immediate data transfer data bus is applied to the register selector. Then the register selector selects one of the two applied data signals to apply the selected input to the register.

It is a primary object of the present invention to achieve a high-speed image processing LSI circuit adaptable to all image processing steps in the same LSI chip.

It is another object of the present invention to achieve a highly programmable image processing LSI circuit adaptable to changes in image processing contents (for example, changes in filter size) within the LSI chip.

It is still another object of the present invention to reduce the occurrence of wait times within an image processing LSI circuit to achieve higher-speed processing.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 illustrates an example of image data;

FIG. 35 illustrates functions of a DMA control register;

FIG. 39 illustrates functions of a control register of the linking/sorting portion;

FIG. 41 is a timing chart illustrating data transfer into the image processing LSI circuit; and FIG. 42 is a timing chart illustrating data transfer out of the image processing LSI circuit.

DESCRIPTION OF THE PREFERRED EMBODIMENTS

Figure 1:
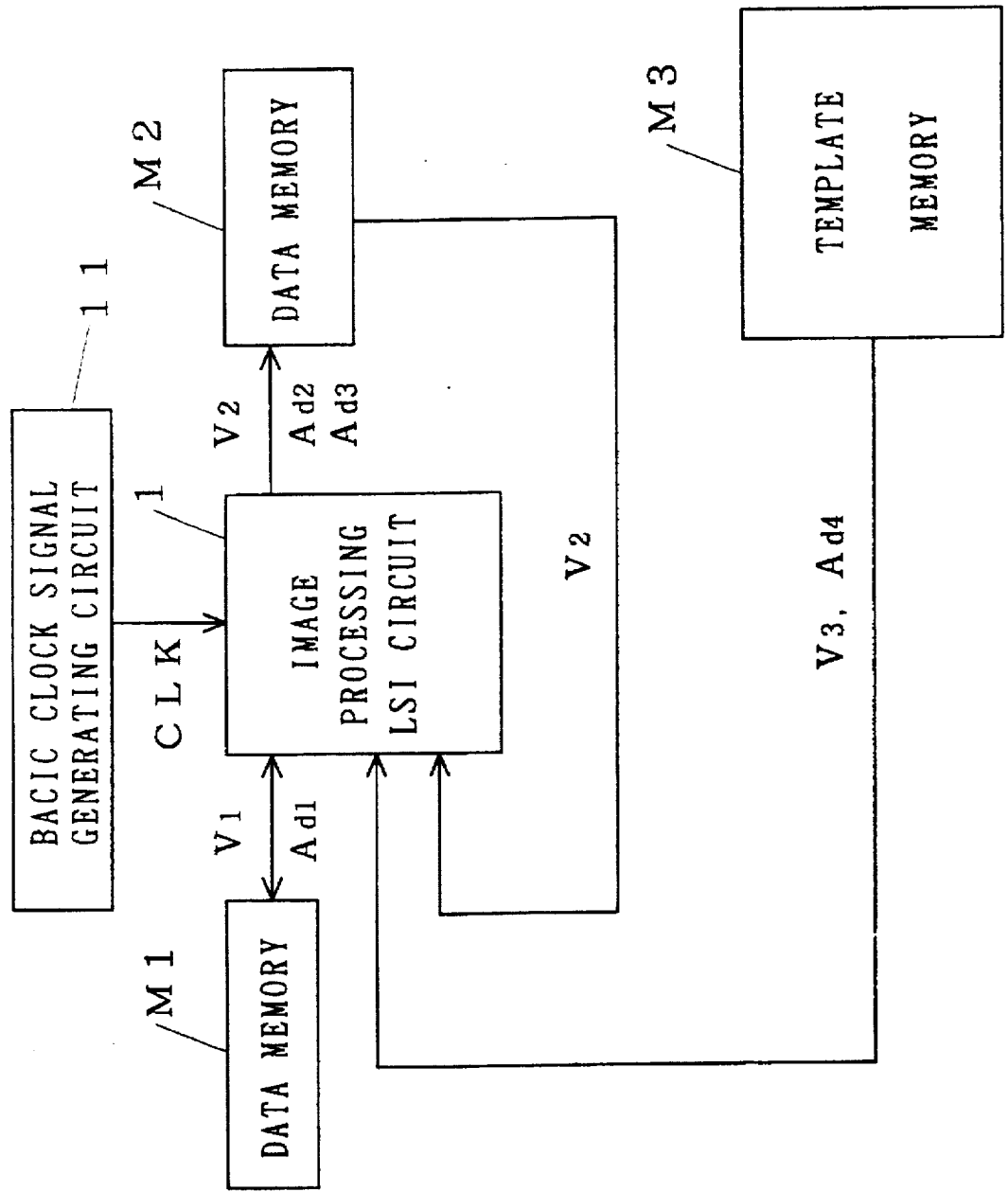
FIG. 1 is a block diagram illustrating connections between an image processing LSI circuit and external memories.

FIG. 1 is a block diagram illustrating connections between an image processing LSI circuit 1 (image processor) and external memories according to preferred embodiments of the present invention. Referring to FIG. 1, a data memory M1 stores image data $V_1$ (pixel data) therein and receives a read address signal $A_{d1}$ (input data transfer clock signal) from the image processing LSI circuit 1 to output the image data $V_1$ to the image processing LSI circuit 1 in a raster scanning manner.

A data memory M2 stores a signal $V_2$ indicative of the image processing result of the image processing LSI circuit 1 in response to a write address signal $A_{d2}$ from the image processing LSI circuit 1 to output the stored signal $V_2$ to the image processing LSI circuit 1 in response to a read address signal $A_{d3}$. A template memory M3 stores a signal $V_3$ indicative of template (dictionary) data therein to output the signal $V_3$ to the image processing LSI circuit 1 in response to a read address signal $A_{d4}$.

A basic clock signal generating circuit 11 generates a basic clock signal CLK to output the basic clock signal CLK as a system clock to the image processing LSI circuit 1. The address signals $A_{d1}$ to $A_{d4}$ are outputted in response to the basic clock signal CLK. That is, the frequency of the address signals $A_{d1}$ to $A_{d4}$ serving as input/output data transfer clock signals is the same as that of the basic clock signal CLK.

Data passing between the image processing LSI circuit 1 and the external memories M1 to M3 are generally as described below. In a first image processing step (preprocessing), the image processing LSI circuit 1, on receipt of the image data $V_1$ from the data memory M1, performs the preprocessing to write the preprocessing result as the signal $V_2$ to the data memory M2. The image processing LSI circuit 1 then receives the signal $V_2$ indicative of the preprocessing result from the data memory M2 to perform a second image processing step (feature extraction) to store the result in the data memory M2. The image processing LSI circuit 1 then performs a third image processing step (matching). That is, the image processing LSI circuit 1 receives the result of the second image processing step from the data memory M2 and also receives the signal $V_3$ from the template memory M3 to perform the matching. The image processing LSI circuit 1 writes the result as the signal $V_2$ to the data memory M2.

(First Preferred Embodiment)

Figure 2:
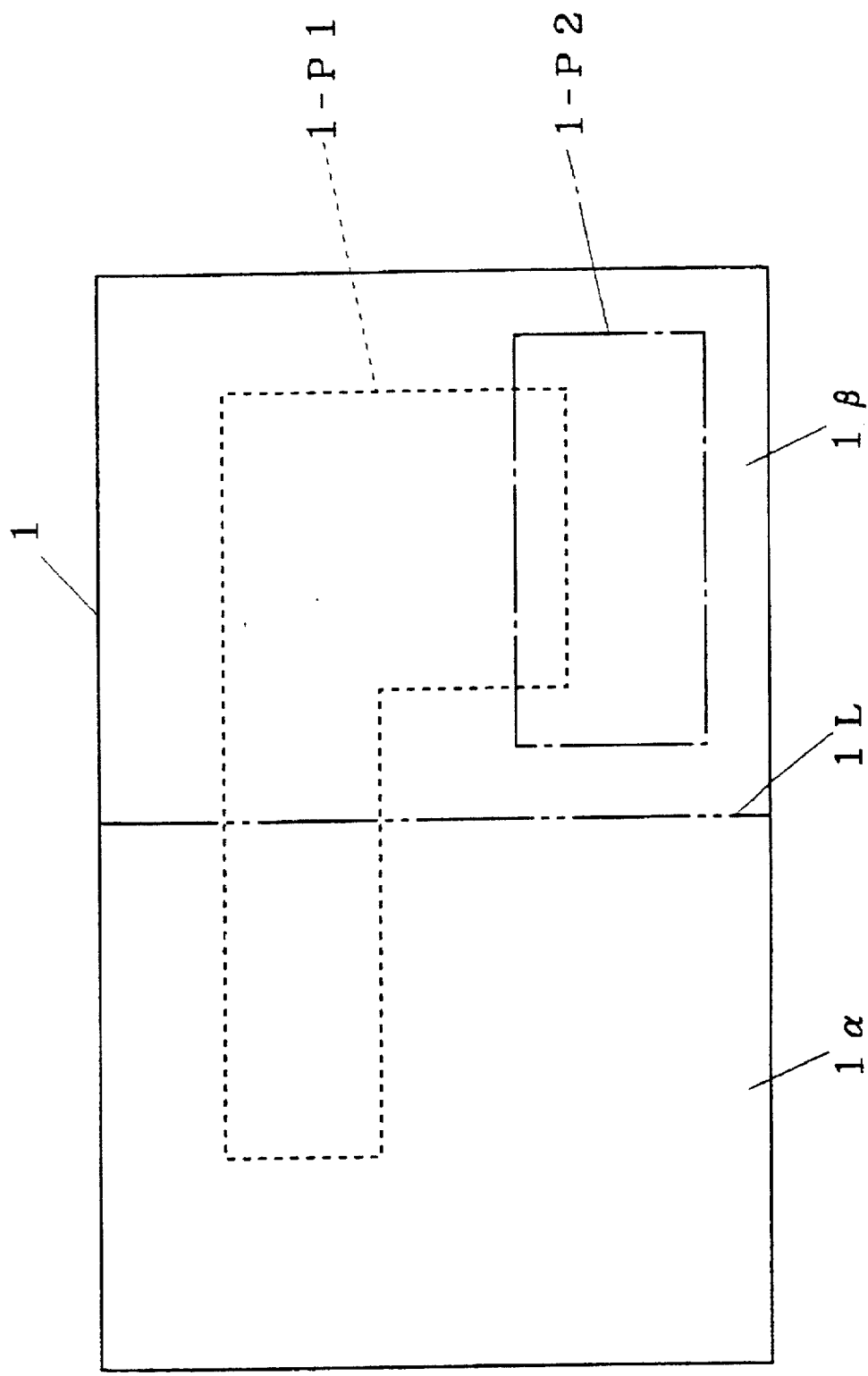
FIGS. 2 to 5 are block diagrams of respective portions of the image processing LSI circuit according to a first preferred embodiment of the present invention.
Figure 3:
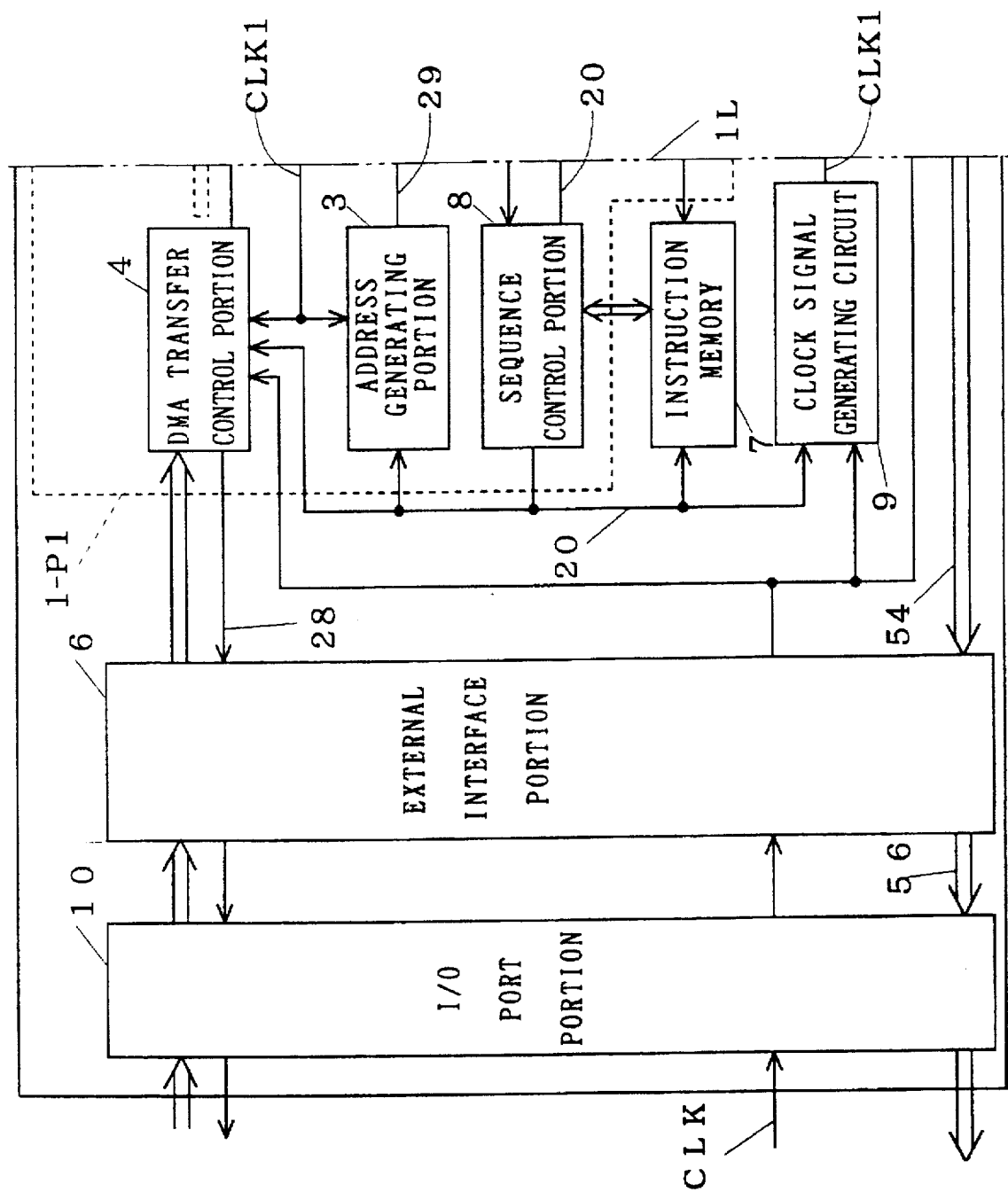
Figure 4:
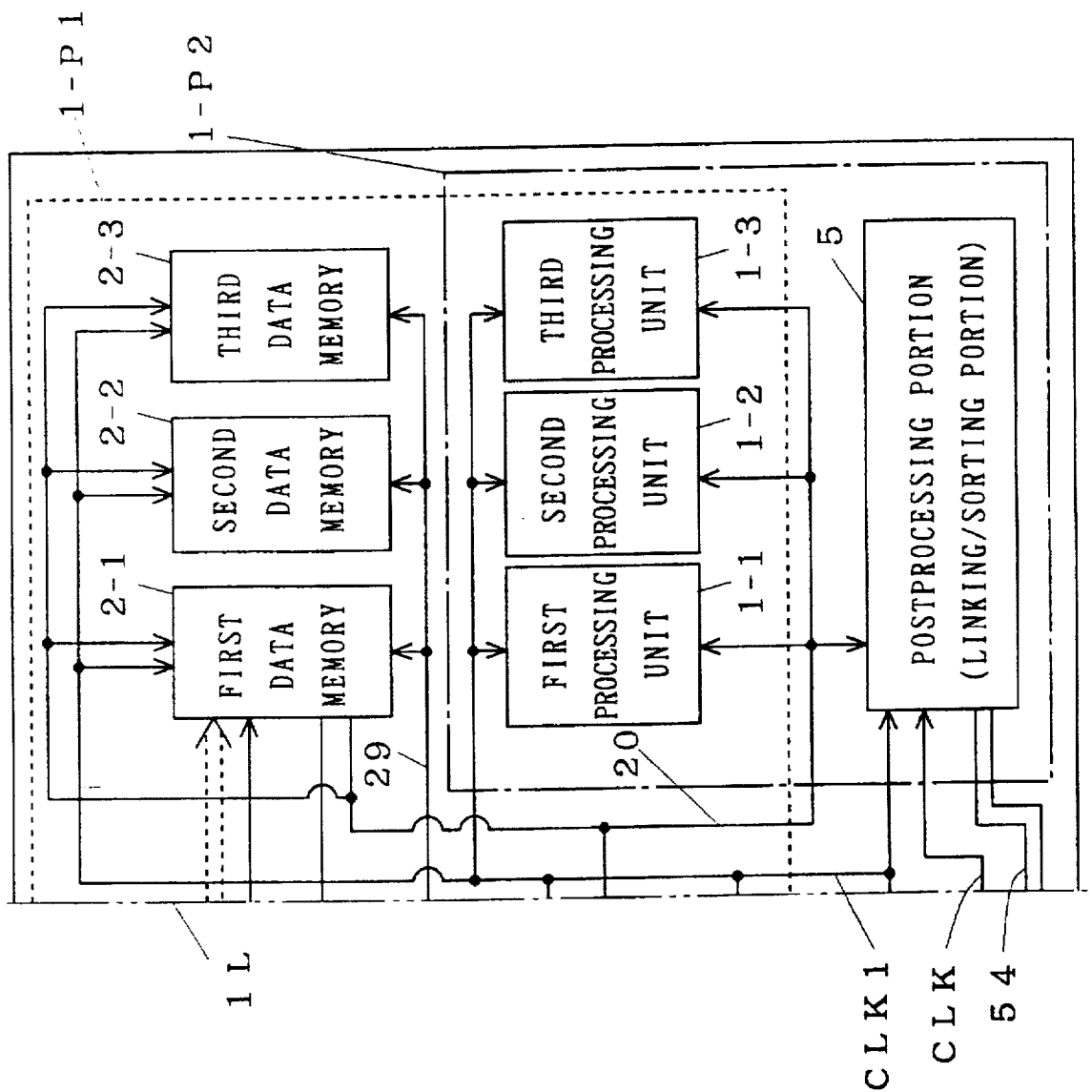

FIG. 2 is a block diagram of the whole image processing LSI circuit 1 according to a first preferred embodiment of the present invention. For purposes of illustration, FIG. 2 shows the image processing LSI circuit 1 as divided into two portions 1α and 1β by a boundary line 1L. The portions 1α and 1β are illustrated in FIGS. 3 and 4, respectively. The structure of the image processing LSI circuit 1 will now be described with reference to the block diagrams in FIGS. 3 and 4.

In FIGS. 3 and 4, the reference characters 1-1 to 1-3 designate SIMD type first to third processing units (referred to also as PU); 2-1 to 2-3 designate first to third data memories (referred to also as DM) associated respectively with the SIMD type first to third processing units 1-1 to 1-3; 3 designates an address generating portion for generating a read/write address signal 29 for the first to third data memories 2-1 to 2-3; 4 designates a DMA transfer control portion for controlling DMA (direct memory access) transfer between the first to third data memories 2-1 to 2-3 and the external data memories M1 to M3 (FIG. 1); 5 designates a postprocessing portion with an input connected to outputs of the first to third processing units 1-1 to 1-3 and having a linking (summing)/sorting function in the first preferred embodiment; 6 designates an external interface portion; 7 designates an instruction memory holding an instruction code signal (instruction signal) required for all constituents of the image processing LSI circuit 1; 8 designates a sequence control portion for producing a control signal 20 required to control the constituents of the image processing LSI circuit 1 from the instruction code signal read from the instruction memory 7; and 9 designates a clock signal generating circuit having a clock multiplication function achieved by a PLL (phase locked loop).

Figure 5:
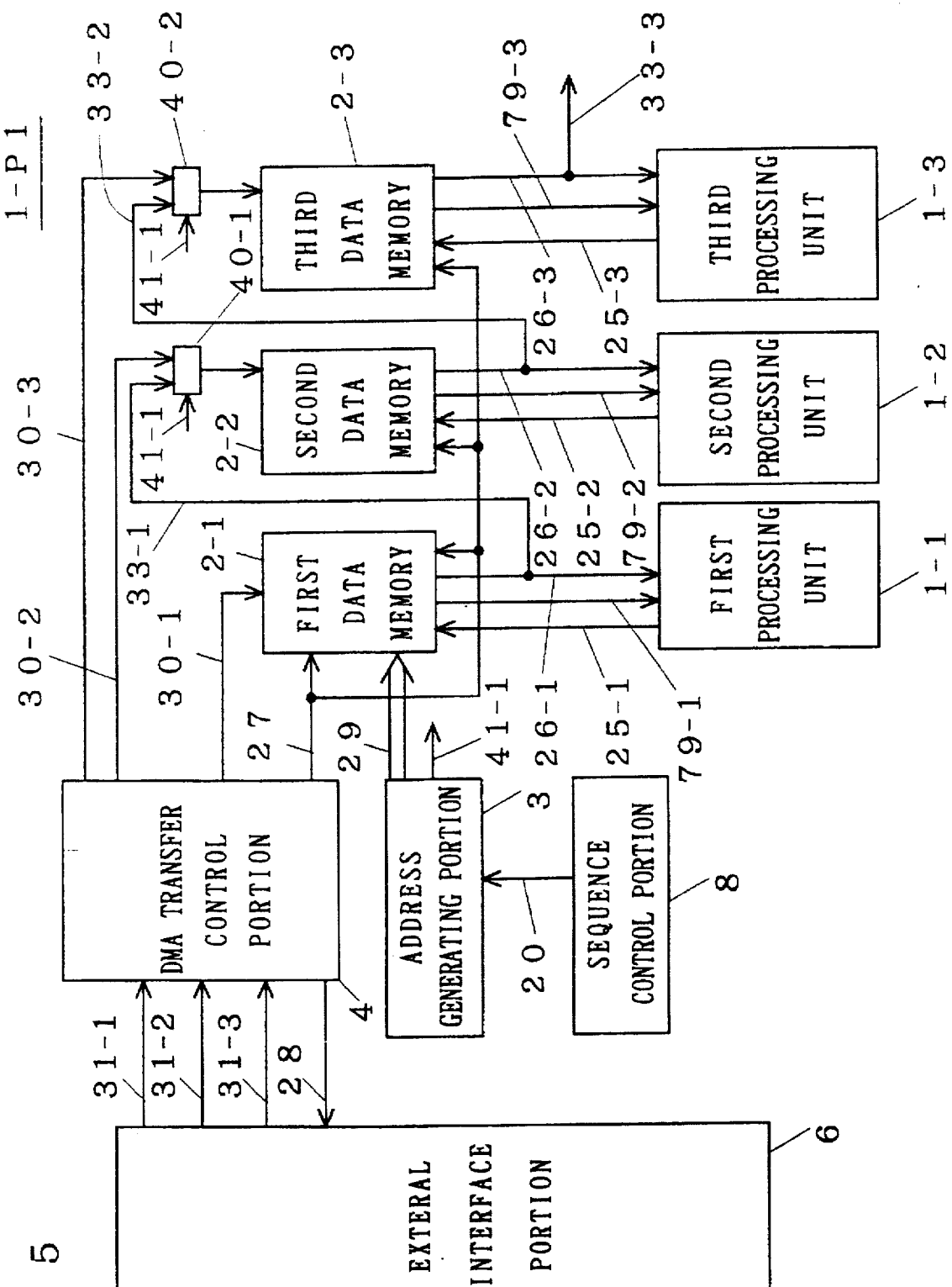
Figure 7:
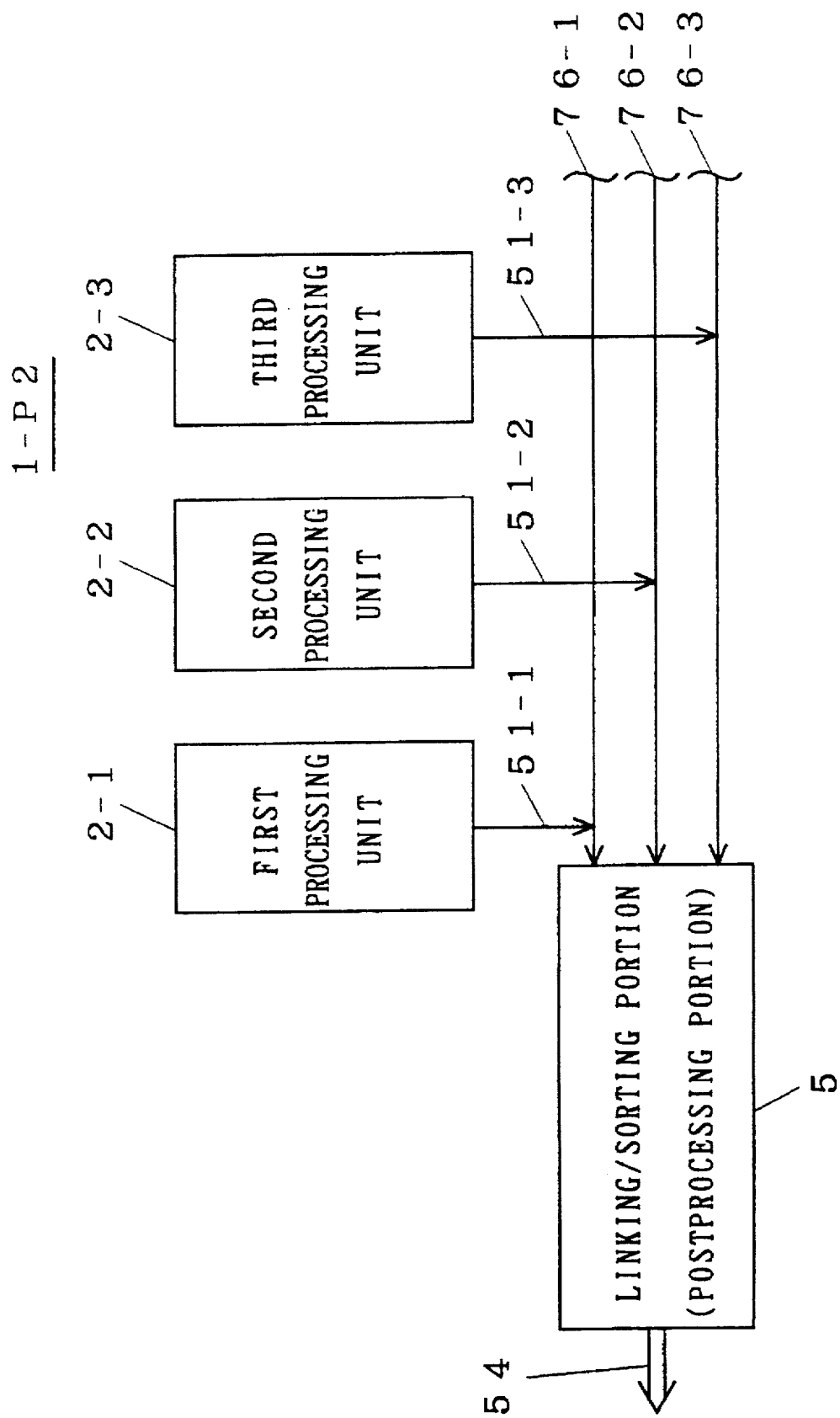
FIG. 7 is a block diagram of respective portions of the image processing LSI circuit of the first preferred embodiment.

The reference numeral 10 designates an I/O port portion; 54 and 56 designate output data signals; the reference character CLK1 designates a clock signal (internal clock) produced by multiplying the basic clock signal CLK. The data transfer and connection between the DMA transfer control portion 4 and the first to third data memories 2-1 to 2-3 are shown in FIG. 5 which illustrates a structure of a region 1-P1 indicated by the broken lines of FIGS. 2 to 4. The data transfer and connection between the first to third processing units 1-1 to 1-3 and the postprocessing portion 5 are shown in FIG. 7 which illustrates a structure of a region 1-P2 indicated by the dashed-and-dotted lines of FIGS. 2 and 4.

The image processing performed concurrently by the first to third processing units 1-1 to 1-3 is generally referred to as first image processing. The image processing performed by the postprocessing portion 5 receiving the result of the first image processing is generally referred to as second image processing.

The sequence control portion 8 and the address generating portion 3 are referred to as control means. The external interface portion 6 includes a register (not shown) receiving an input data signal read from the DMA transfer control portion 4. The register receives external input data to transfer the data to the first to third DMs 2-1 to 2-3. The register and the DMA transfer control portion 4 are referred to as DMA transfer control means.

In FIG. 5, the reference characters 40-1 and 40-2 designate selector circuits (selector means); 41-1 designates a selection command signal (select signal) indicative of selection command codes for the selector circuits 40-1, 40-2; 25-1 to 25-3 designate first data lines (fourth data buses) for writing back the outputs (second outputs) from the first to third processing units 1-1 to 1-3 to the first to third data memories 2-1 to 2-3, respectively; 26-1 to 26-3 designate second data lines (third data buses connected to first inputs of the processing units 1-1 to 1-3) for transferring data read from the first to third data memories 2-1 to 2-3, respectively; 79-1 to 79-3 designate fourth data lines (fifth data buses) for transferring data from the first to third data memories 2-1 to 2-3, respectively; 27 designates a read/write address signal (in synchronism with the clock CLK1) for the first to third data memories 2-1 to 2-3 which is produced by the DMA transfer control portion 4; 28 designates a read/write address signal (corresponding to the address signals $A_{d1}$ to $A_{d4}$ of FIG. 1) for the external data memories which is produced by the DMA transfer control portion 4; 29 designates a read/write address signal (in synchronism with the clock CLK1) for the first to third data memories 2-1 to 2-3 which is produced by the address generating portion 3; 30-1 to 30-3 designate third data lines (first data buses) for transferring the image data $V_1$, $V_2$ (image signals) and template data signal $V_3$ which are DMA-transferred from the external data memories M1 to M3 (FIG. 1) to the first to third data memories 2-1 to 2-3, respectively; 33-1 designates a data line for transferring to the second data memory 2-2 a data signal read from an address of the first data memory 2-1 indicated by the read address signal 29; 33-2 designates a data line for transferring to the third data memory 2-3 a data signal read from an address of the second data memory 2-2 indicated by the address signal 29; and 33-3 designates a data line for outputting a data signal read from an address of the third data memory 2-3 indicated by the address signal 29.

In the first preferred embodiment, the external input data to be subjected to the image processing are transferred on the data lines 30-1 to 30-3 to the first to third data memories 2-1 to 2-3 by the DMA transfer control portion 4. Then the DMA transfer control portion 4 produces a write address to apply the write address to the data memories 2-1 to 2-3 through the address bus (corresponding to the write address signal) 27. Since the external data are processed by reading the data stored in the first to third data memories 2-1 to 2-3, the internal calculation in the image processing LSI circuit 1 and the external data transfer are separated, thereby achieving the image processing LSI circuit in which the external data transfer, if at low speeds, does not interfere with the high-speed internal calculation. The address generating portion 3 generates the read address signal 29 for reading data from the first to third data memories 2-1 to 2-3 under the control of the sequence control portion 8. The data memories 2-1 to 2-3 may include a plurality of banks such that the DMA transfer and the read/write operation by instruction operation are set to different banks, providing greater effects of the present invention.

Description will be given on features and operation of the respective portions of the first preferred embodiment. In image processing, calculation of new one-pixel data requires a plurality of clock cycles. For real-time image processing, the throughput rate of the external data input must coincide with the throughput rate of a new image data output calculated from previously transferred data (in successive fashion). When the clock frequency for the transfer of external data to the internal data memories 2-1 to 2-3 coincides with the clock frequency required for the respective constituents, such as the first to third processing units 1-1 to 1-3, of the image processing LSI circuit 1, real-time processing is not performed if the input data transfer is completed in one clock cycle. To solve this problem, there is provided the clock signal generating circuit 9 having the clock multiplication function in the first preferred embodiment. The clock signal generating circuit 9 may specifically be of a PLL (phased locked loop) construction. In the first preferred embodiment wherein a data calculation typically requires three machine cycles, the clock signal generating circuit 9 produces a clock signal CLK1 having a frequency three times the frequency of the clock signal CLK for external input data transfer to use the clock signal CLK1 as a clock for the constituents of the image processing LSI circuit 1, thereby solving the problem. In general, the frequency of the clock signal CLK is multiplied by n when the data calculation is performed in n machine cycles (n≧b 2).

With high-speed operation in the image processing LSI circuit, it is technically difficult to provide an external instruction code indicative of processing procedure to the image processing LSI circuit for each cycle. This results from the greater influence of parasitic capacitances in interconnection lines on the board than in the image processing LSI circuit. To perform high-speed processing by multiplication of the frequency of the system clock signal CLK, it is essential to dispose the instruction memory 7 in the same image processing LSI circuit. In the first preferred embodiment, the instruction memory 7 is disposed in the image processing LSI circuit 1 as shown in FIG. 3.

Programmability is essential for execution of the image preprocessing (first image processing step), the feature extraction (second image processing step), and the matching (third image processing step) in the same image processing LSI circuit. However, data transfer from the external data memories M1, M2, M3 to the first to third data memories 2-1 to 2-3 in the image processing LSI circuit 1 by using the instruction codes as in the conventional image processing DSP causes the image processing LSI circuit to be placed in a wait state until the low-speed external data transfer is completed, interfering with the high-speed operation. Thus, the DMA transfer without instruction codes becomes essential. The DMA transfer control portion 4 achieves the DMA transfer. The DMA transfer control portion 4 includes a plurality of control registers which store start addresses of the external memories M1 to M3 to be read and instruction data indicative of information and the like about the number of pixels of image data to be fetched from the external memories M1, M2. The control registers are controlled by a data input transfer start command signal from the sequence control portion 8 to output the read address signal 28 at a transfer frequency of the clock signal CLK in response to the instruction in the registers.

In this manner, the DMA transfer control portion 4 executes the read transfer of the input data signal from the external memories M1 to M3 as a system different from the instruction memory 7 holding the instruction codes for controlling internal processing of the image processing LSI circuit 1. This allows the DMA transfer control portion 4 to accommodate the wait time during the data input and transfer. Thus, the sequence control portion 8 and address generating portion 3 can be devoted to writing and reading data transferred from the DMA transfer control portion 4.

The instruction code can execute the read/write address generation for the first to third data memories 2-1 to 2-3 with the address generating portion 3 independently of the DMA transfer.

The most significant feature of image processing is data independence. A large number of image processing LSI circuits developed for speeding up of the image preprocessing have an SIMD (single-instruction stream multi-data stream) type architecture which includes a plurality of processing units for parallel processing by the processing units. This permits the multiples of the frequency of the internal clock signal CLK1 to have practical values. For example, the multiple is 9 in the spacial filtering of 3×3 pixel size when no SIMD type processing units are used. However, the multiple is 3 when the three SIMD type processing units 1-1 to 1-3 are used as in the first preferred embodiment, which accomplishes the SIMD type architecture.

For the feature extraction and matching having similar data independence, no image processing LSI circuits having a parallel processing architecture have been developed. The technical reason is that the number of I/O pins increases in proportional relationship with the number of processing units arranged in parallel when the processing units are contained in the LSI circuit. Some individual image processing algorithms require outputs the number of which is proportional to the number of processing units arranged in parallel. However, from the viewpoint of an image processing system, the parallel output data are grouped by another process to provide a low degree of parallelism. The first preferred embodiment is adapted such that the processes by which the degrees of parallelism are lowered are contained in one LSI chip on the basis of the above stated image system characteristics to solve the problem of the number of pins. For this reason, the LSI circuit 1 contains the postprocessing portion 5.

The SIMD type processing units 1-1 to 1-3 perform the same type operation in parallel to output the results simultaneously. Thus, the SIMD type processing units 1-1 to 1-3 differ from each other only in input data. The postprocessing portion 5 is an arithmetic function unit receiving the output data (the results of the first image processing) from the SIMD type first to third processing units 1-1 to 1-3 performing parallel calculation processing, and outputs the processed result as the output data signal 54 to the external memory M2. In the first preferred embodiment, the postprocessing portion 5 performs linking/sorting as an example. The postprocessing portion 5 selectively executes linking and sorting by program control. This is merely an example, and various functions are considered to meet the above described requirements with similar effects of the first preferred embodiment and, accordingly, of the present invention.

When the postprocessing portion 5 functions as sorting means in the matching, the postprocessing portion 5 receives data determined independently by the first to third processing units 1-1 to 1-3. The postprocessing portion 5 sorts the data to determine a similarity measure. The output required after the repetition of the processing sequence is the sorting result (similarity measure judgement result), not the intermediate output data from the first to third processing units 1-1 to 1-3. In general, the sorting result need not be outputted in parallel. This is effective in greatly reducing the number of output data pins in the I/O port portion 10.

When the postprocessing portion 5 functions as linking means, summing for image preprocessing (sum-of-product operation) is performed in the postprocessing portion 5. Consequently, the number of output pins are significantly reduced. In this manner, the postprocessing portion 5 serving as a linking/sorting unit is adaptable to a plurality of image processing operations (first to third image processing steps) in the same image processing LSI circuit 1, permitting reduction in the number of output data pins with a small circuit scale for high-speed processing.

In the first and subsequent preferred embodiments, direct data application from the external memories M1 to M3 to the first to third processing units 1-1 to 1-3 is inhibited. The direct application of external data to the first to third processing units 1-1 to 1-3 causes the first to third processing units 1-1 to 1-3 to be placed in an input data wait state if external input data are transferred slowly, resulting in lowered processing efficiency. This problem is caused by the external data transfer speed, whether in the DMA transfer system or in the transfer system by an instruction, when the internal operating frequency (the frequency of the clock CLK1) of the image processing LSI circuit is higher than the operating frequency of peripheral circuits outside the image processing LSI circuit and the transfer rate via the board interconnection lines. Thus, the performance of the image processing LSI circuit is greatly influenced when the multiplied input clock is used as the internal clock of the image processing LSI circuit.

Figure 6:
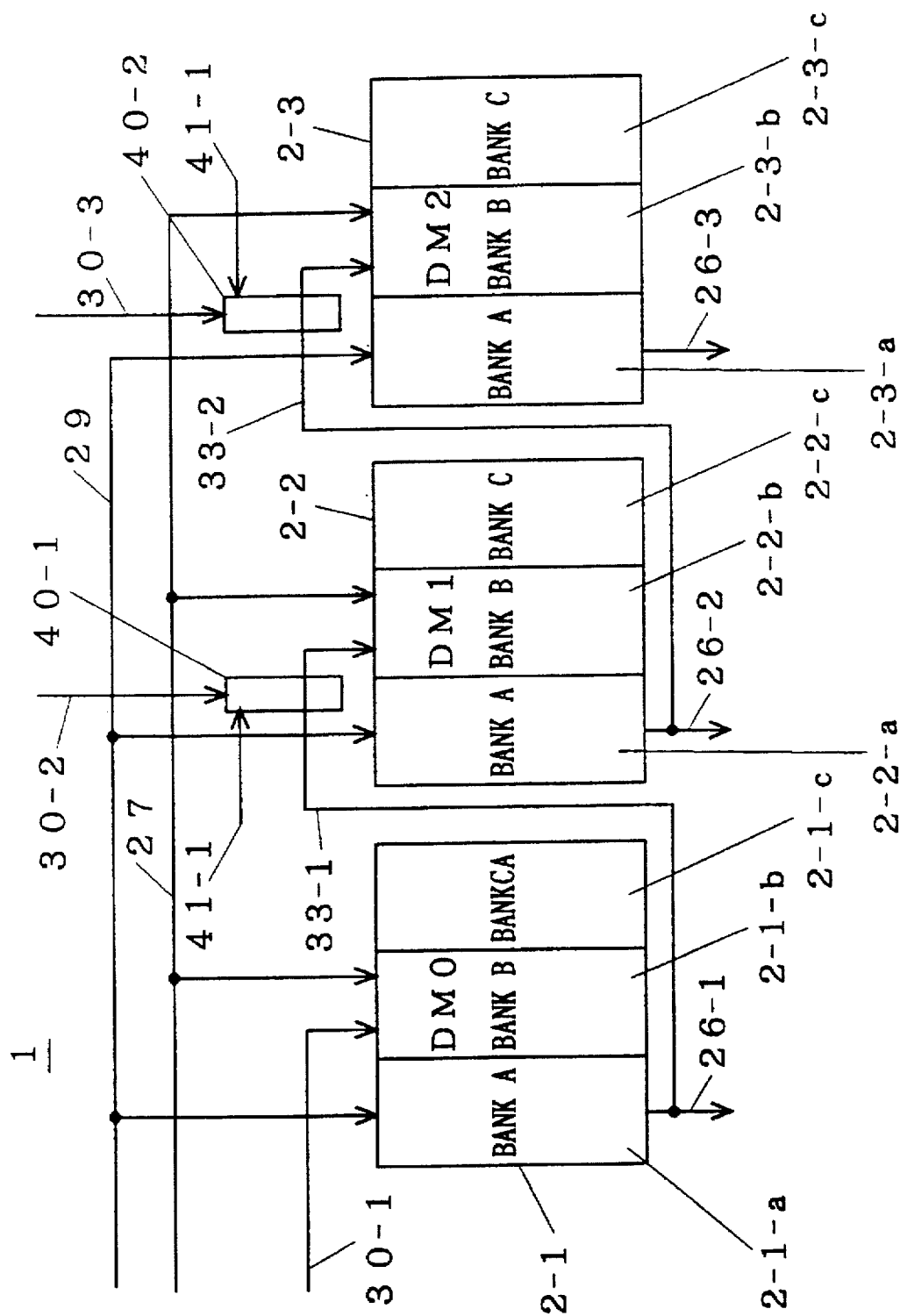
FIG. 6 is a block diagram of data memories of the image processing LSI circuit of the first preferred embodiment.

FIG. 6 illustrates the first to third data memories 2-1 to 2-3 in detail. In FIG. 6, the reference characters 2-1-a, 2-1-b, 2-1-c designate banks A, B, C forming the first data memory 2-1, respectively; 2-2-a, 2-2-b, 2-2-c designate banks A, B, C forming the second data memory 2-2, respectively; and 2-3-a, 2-3-b, 2-3-c designate banks A, B, C forming the third data memory 2-3, respectively.

In FIG. 6, each of the first to third data memories 2-1 to 2-3 is a single-port memory (writing is not permitted during reading, and reading is not permitted during writing) and includes the plurality of banks to enable write and read operations in a FIFO (first-in first-out) order. There is illustrated in FIG. 6 the selection of writing and reading of input data signals in the FIFO order by the selection instruction signal 41-1. In FIG. 6, data are illustrated as being read from the banks 2-1-a, 2-2-a, 2-3-a of the first to third data memories 2-1 to 2-3, and the input data signals are illustrated as written to the banks 2-1-b, 2-2-b, 2-3-b of the first to third data memories 2-1 to 2-3 by the DMA transfer.

FIG. 7 is a block diagram of the region 1-P2 of FIG. 4 and illustrates a connection between the first to third processing units 2-1 to 2-3 and the linking/sorting portion 5. Output lines 51-1 to 51-3 from the processing units 2-1 to 2-3 are connected respectively to data buses 76-1, 76-2, 76-3 (data buses GP0, GP1, GP2) which are in turn connected to the linking/sorting portion 5. The data buses 76-1 to 76-3 are defined as calculation result transfer buses and generally referred to as second data buses.

This prevents the external connections of the calculation result transfer buses (first image processing result transfer data buses) 76-1, 76-2, 76-3 which are equal in number to the processing units arranged in parallel and shortens the wiring length of the data buses 76-1, 76-2, 76-3, thereby reducing the parasitic capacitances of the data buses and power consumption due to charging and discharging thereof.

Description will be given below on the structure and operation of the respective portions of the image processing LSI circuit 1 in the first to third image processing steps.

(First Image Processing Step)

In the image preprocessing, that is, spatial filtering, pixel data required for the spatial filter size around each pixel are required to be extracted from the image data $V_1$ read and transferred from the external data memory M1 in the raster scanning manner and to be then subjected to filtering. The sequence control portion 8 produces a selection command for writing to the first to third data memories 2-1 to 2-3 in the FIFO order by program control to output the selection instruction signal 41-1 to the selector circuits 40-1, 40-2. Accordingly, the image data signal transferred by the DMA transfer control portion 4 is first written to the first data memory 2-1 through the data line 30-1 (the first data bus).

FIG. 8 schematically illustrates two-dimensional image data. The small box 20a of FIG. 8 represents a pixel. The numbers assigned to the pixels indicate the order of the pixels extracted by a scanning system known as raster scanning which is often used in image processing. The pixels are extracted in ascending order of the numbers.

Figure 9:
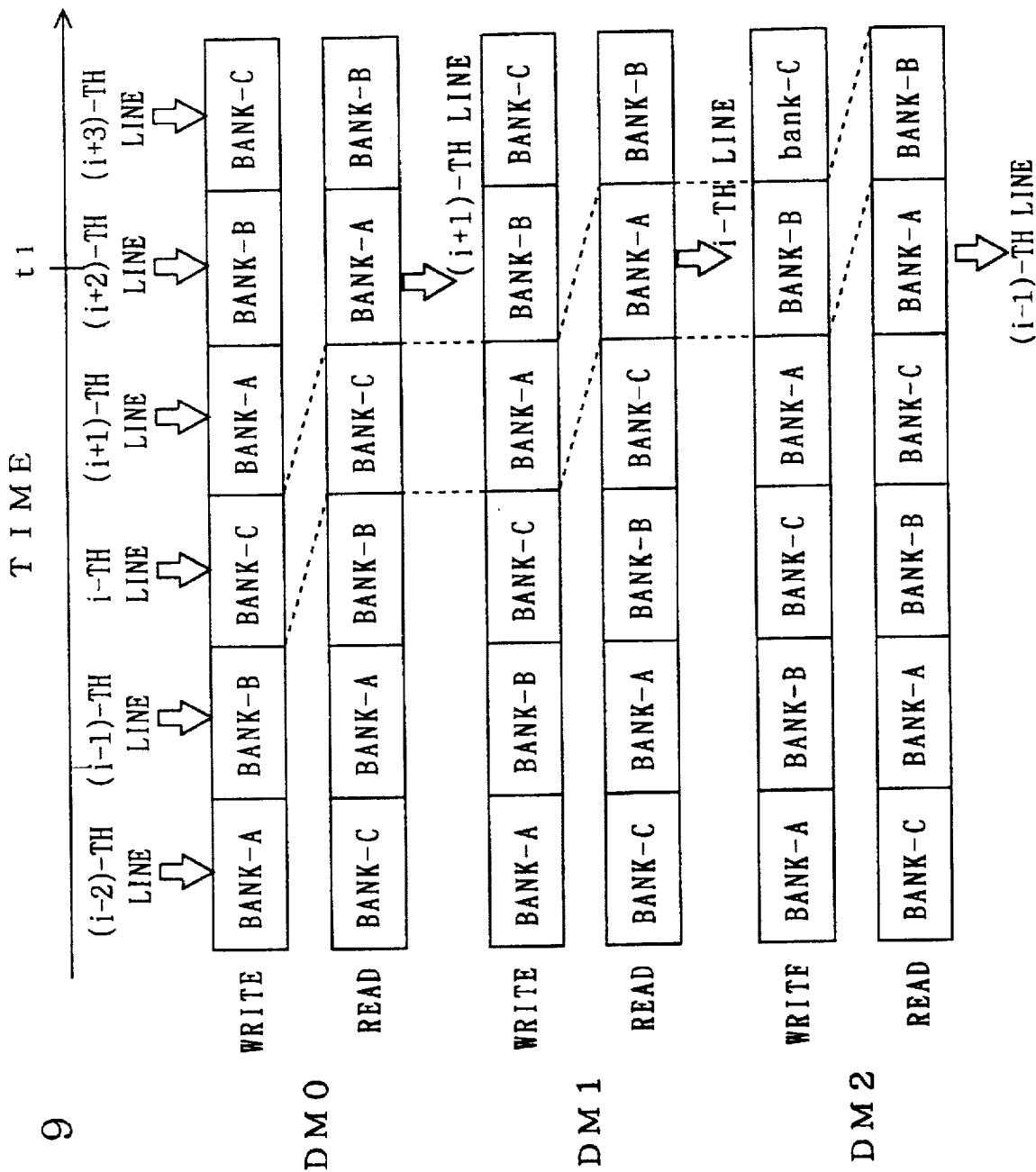
FIG. 9 schematically illustrates flows of the image data written to and read from the data memories of the first preferred embodiment in chronological order.

FIG. 9 illustrates a data flow (in FIFO order) when the two-dimensional image data as shown in FIG. 8 are transferred to the first to third data memories 2-1 to 2-3 of FIG. 6, with time represented as the abscissa. Referring to FIG. 9, pixel data in the (i+1)-th line, i-th line, (i−1)-th line are read from the banks A of the first to third data memories 2-1, 2-2, 2-3 (DM0, DM1, DM2) at a time $t_1$ and outputted to the first to third processing units 1-1 to 1-3, respectively.

Figure 16:
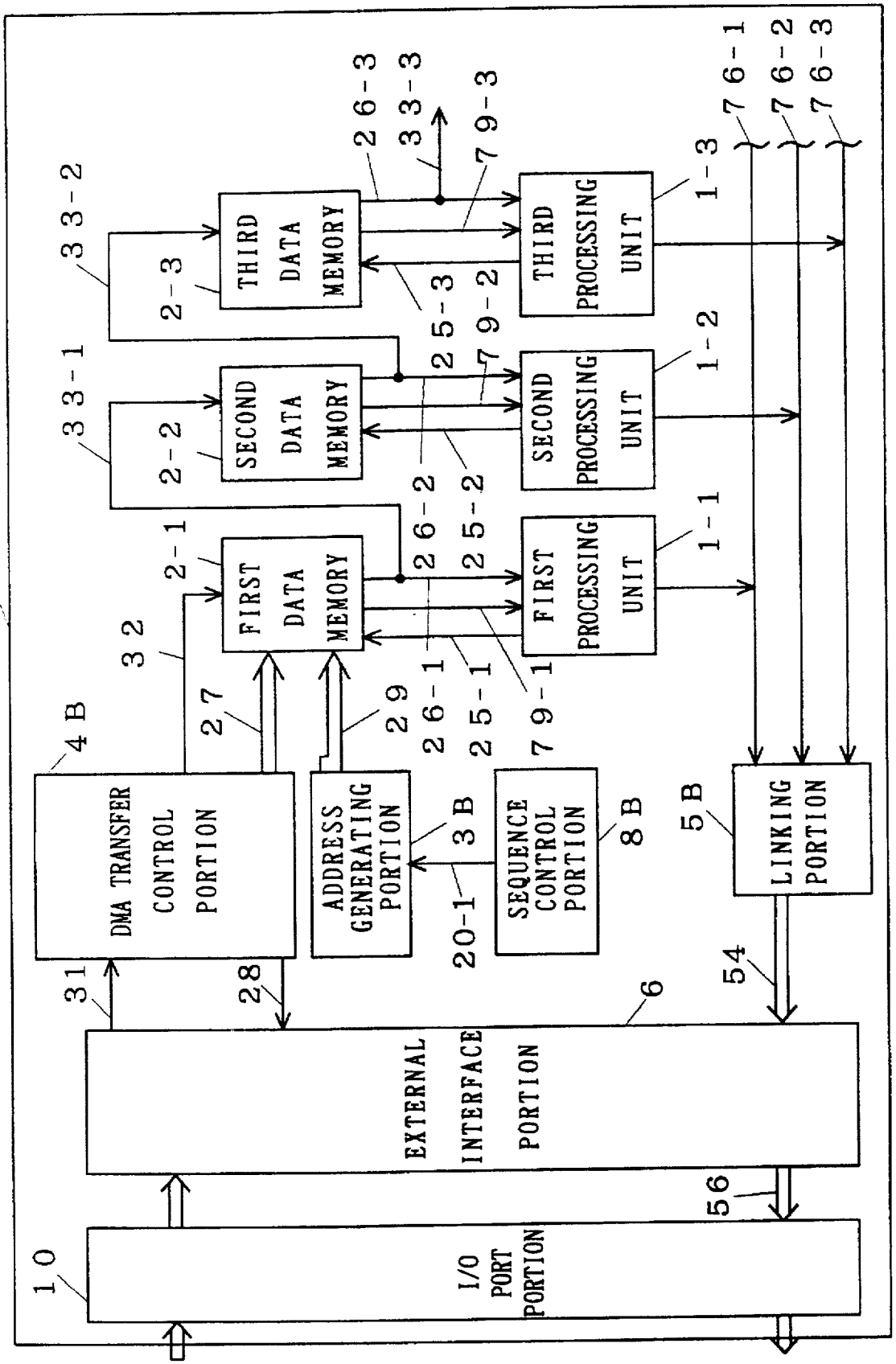
FIG. 16 is a block diagram of respective portions of the image processing LSI circuit according to a third preferred embodiment of the present invention.

In the first preferred embodiment, the image data as illustrated in FIG. 8 are read to the image processing LSI circuit 1 in the raster scanning manner by the DMA transfer. In this case, the image data are entered into the first to third data memories 2-1 to 2-3 serially, not in parallel. Specifically, the serial input of the image data is performed by switching of the selector circuits 40-1, 40-2 in the preprocessing as shown in FIG. 16 which illustrates another preferred embodiment. As shown in FIG. 9, switching between the banks A to C of the data memories 2-1 to 2-3 to be used for each completion of one-line image data transfer allows simultaneous execution of reading for internal calculation and writing to the first to third data memories 2-1 to 2-3 by the DMA transfer. Reading from the bank A of FIG. 9 is illustrated in FIG. 6. At the time $t_1$, the data read from the data memories 2-1 to 2-3 correspond respectively to an (i+1)-th raster, an i-th raster, and an (i−1)-th raster. This clarifies that the data transfer system of the first preferred embodiment achieves the functions required for spatial filtering.

The external image data are applied to the first data memory 2-1 (DM0) through the data line 30-1 from the DMA transfer control portion 4. The DMA transfer control portion 4 produces a write address at this time to apply the write address to the first to third data memories 2-1 to 2-3 through the address bus 27. Since the external data are processed by reading the data from the first to third data memories 2-1 to 2-3, the internal calculation and the external data transfer are separated from each other, thereby achieving the image processing LSI circuit 1 in which the external transfer, if at low speeds, does not interfere with the high-speed internal calculation.

This provides for both (1) data input in the raster scanning manner required for the image preprocessing and (2) other data input in the parallel inputting manner. In addition, the data input and the internal calculation are implemented independently, and the high-speed internal calculation is achieved.

The first and subsequent preferred embodiments include three processing units arranged in parallel for purposes of illustration. However, the technical ideas of the present invention do not depend on the degree of parallelism.

Operation of the processing units 1-1 to 1-3 in the first image processing step is discussed below. The first to third processing units 1-1 to 1-3 of FIGS. 4, 5, 7 execute the same matrix calculation. Since the first to third processing units 1-1 to 1-3 execute the same instruction step simultaneously, the output data 51-1 to 51-3 from the first to third processing units 1-1 to 1-3 are provided simultaneously. As shown in FIG. 7, the output data 51-1 to 51-3 from the processing units 1-1 to 1-3 are insured to be connected to the input terminals of the linking/sorting portion 5 through the second data buses 76-1 to 76-3, respectively.

In image processing, the data processing in the first to third processing units 1-1 to 1-3, in general, requires a number of process steps. The preprocessing using a spatial filter 22 of 3×3 pixel size shown in FIG. 8 is described herein for simplification. In this case, the arithmetic processing is expressed by:

$$\text{New}(l, m) = \Sigma\Sigma \text{Old}(l+i, m+j) * C(i, j) \tag{2}$$

where New means the filter output data of the pixel in the i-th row, j-th column (44th pixel in FIG. 8), Old means the input pixel data of the pixel in the i-th row, j-th column, and C means a filter coefficient. Expression (2) provides the sum of the matrix elements obtained from the product of the 3×3 matrix (Old) and the 3×3 matrix (C).

To execute this calculation by the first to third processing units 1-1 to 1-3 of FIG. 4, it is necessary to extract the calculation as a spatially parallel processable calculation. In Expression (2), for example, the first processing unit 1-1 executes the calculation for i=−1 (calculation for the (i−1)-line of FIG. 8), the second processing unit 1-2 executes the calculation for i=0 in Expression (2) (calculation for the i-th line of FIG. 8), and the third processing unit 1-3 executes the calculation for i=1 in Expression (2) (calculation for the (i+1)-th line of FIG. 8).

Then the calculation results 51-1 to 51-3 of the processing units 1-1 to 1-3 are added together (referred to as linking) to achieve the 3×3 pixel size spatial filter indicated by Expression (2). The linking/sorting portion 5 of the first preferred embodiment has the function of executing this final addition. The linking/sorting potion 5 executes a specified arithmetic processing, the linking herein, between the output data 51-1 to 51-3. The output of the processing result to the exterior is the output from the linking/sorting portion 5.

It is critical herein that the first to third processing units 1-1 to 1-3 have three process steps but the linking/sorting portion 5 has three process steps or less (depending upon the structure of an adder circuit; one-by-one addition provides the greatest number of process steps which is the worst), and therefore the following relation holds: (the number of process steps in the processing units)≧(the number of process steps in the linking/sorting portion).

As above described, the image processing LSI circuit 1 of the present invention is adapted such that the calculation results of the first to third processing units 1-1 to 1-3 are not intactly outputted through the I/O port portion 10 but are subjected to the linking in the postprocessing portion 5 in the image processing LSI circuit 1, thereby completing all preprocessing calculations in the image processing LSI circuit 1. This reduces the number of data lines for outputting the preprocessing results through the I/O port portion 10 to the external memory M2 and, accordingly, the number of pins of the output port portion down to the number of bits of the output signal 56 indicative of the preprocessing results. For example, the number of data lines and the number of pins are 16 when the output signal 56 is a 16-bit signal. Further, since the postprocessing portion 5 functions to output the preprocessing result to the external memory M2, the wait time caused during the data transfer to the external memory M2 may be generated by the postprocessing portion 5. Thus, the provision of processing unit output control means to be described later (FIG. 18) permits the first to third processing units 1-1 to 1-3 to continue calculations without operation interrupt in the wait state if the wait time occurs during outputting.

(Second Image Processing Step)

In the second image processing step, the data calculated in the first image processing step are read from the external memory M2 as input data and written to the respective data memories in the image processing LSI circuit 1. Since all of the data calculated in the first image processing step when used are the raster scanning data, the selector circuits 40-1, 40-2 are controlled so that the write and read operations are enabled in FIFO order. On the other hand, only data in an area among the data calculated in the first image processing step are sometimes read from the external memory to be subjected to the second image processing step. In this case, a need arises to achieve the parallel input of the data to the data memories in the image processing LSI circuit 1. Thus, the selector circuits 40-1, 40-2 connect the first data buses 30-2, 30-3 to the second and third data memories 2-2, 2-3, respectively.

Detailed processing procedure of the second image processing step will be described below. As an example, the second image processing step performs histogram processing for counting the concentration values of an image for each raster line.

The input data are the image data stored in the external memories in this example. The selector circuits 40-1, 40-2 are assumed to be switched so that the input data signals are entered into the second and third data memories 2-2, 2-3 in FIFO order, respectively. The input data signals indicative of the input data pass through the first data buses 30-1, 30-2, 30-3 by the DMA transfer to be stored in the internal first to third data memories 2-1 to 2-3. The first to third data memories 2-1 to 2-3 have different raster line data, respectively. In this example, each of the data memories 2-1 to 2-3 includes three banks (banks A, B, C), and the image data are stored in the banks A. The intermediate results for histogram processing are stored in the banks B of the data memories 2-1 to 2-3.

The first to third processing units 1-1 to 1-3 read the input data (image data) from the banks A of the corresponding first to third data memories 2-1 to 2-3 to transmit the data to the data memories through data buses 25-1 to 25-3. The data memories receive the transmitted data and then read data in the banks B using the transmitted data as an address to transmit the read data to the processing units. The processing units increment the data by +1 to write the incremented data to the read address of the banks B. By repeating the above described processing, the concentration histogram for raster scanning is produced in the banks B. In this preferred embodiment, three lines of data calculations are simultaneously processed since three processing units are arranged in parallel.

When one-line data processing is completed, the data in the banks B of the data memories 2-1 to 2-3 are sequentially read and transmitted to the linking/sorting portion 5. Since the number of words in the banks A of the data memories 2-1 to 2-3 is equal to the number of pixels of the raster line in this example, the processing unit outputs need not be added together in the linking/sorting portion 5. Since no plural-chip construction is required, a link input 115 is invalidated when the linking/sorting portion used herein is that of FIG. 13 which is a preferable example. The outputs from the linking/sorting portion 5 (5a) are provided in parallel from the external interface portion 6 in synchronism with the externally applied system clock CLK.

It is now assumed that the number of words in the banks A of the data memories is less than the number of pixels of the raster line. For ease of understanding, it is supposed that each of the three processing units processes ⅓-line data. The sequence is the same. The linking/sorting portion 5 adds the processing unit outputs together and then outputs the result of addition from the external interface portion 6 in synchronism with the external system clock CLK. At this time, one datum is outputted at one time.

Figure 23:
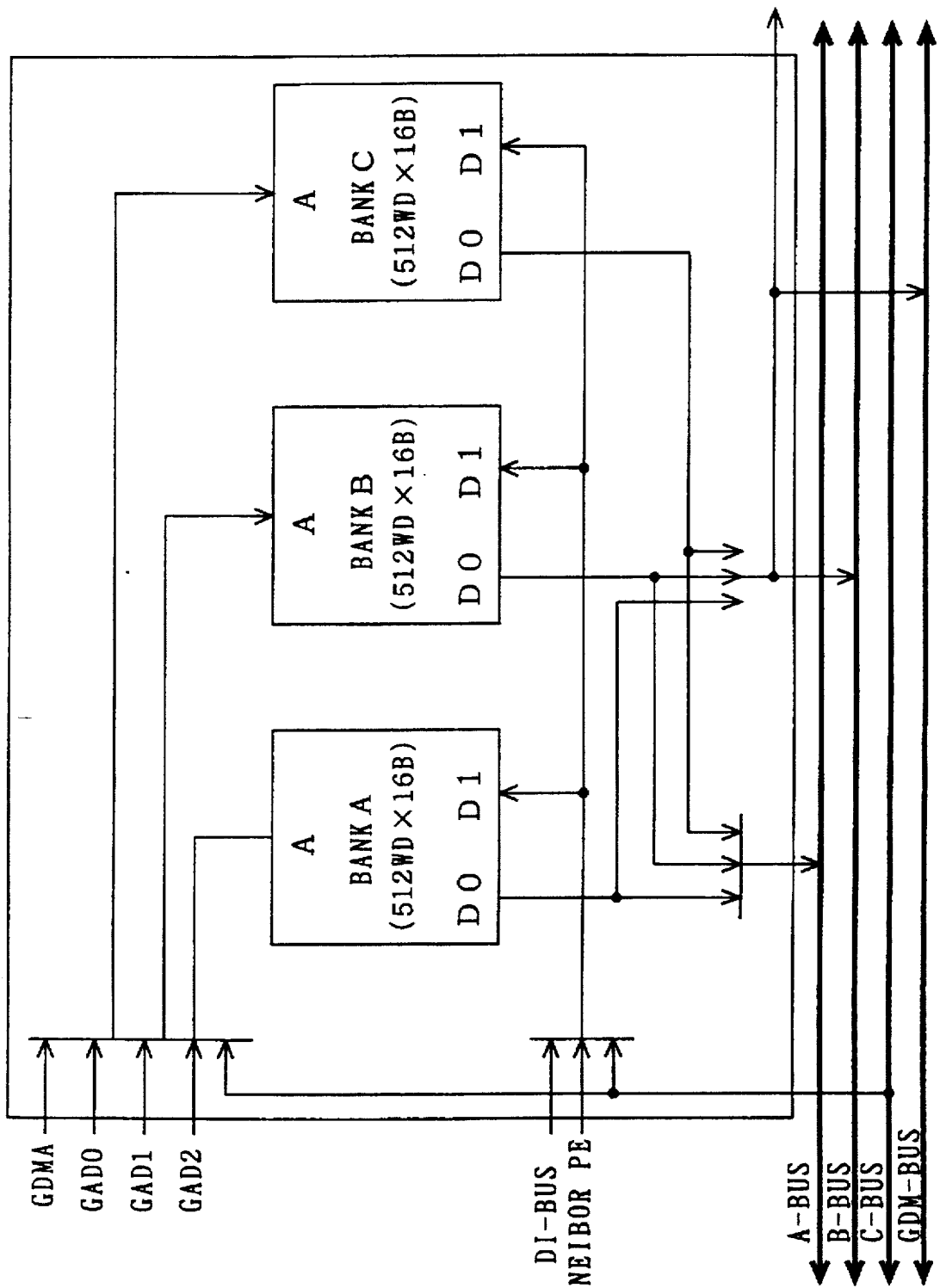
FIG. 23 is a block diagram of the data memory when a bank B of the data memory is used as a reference table in a second image processing step.
Figure 24:
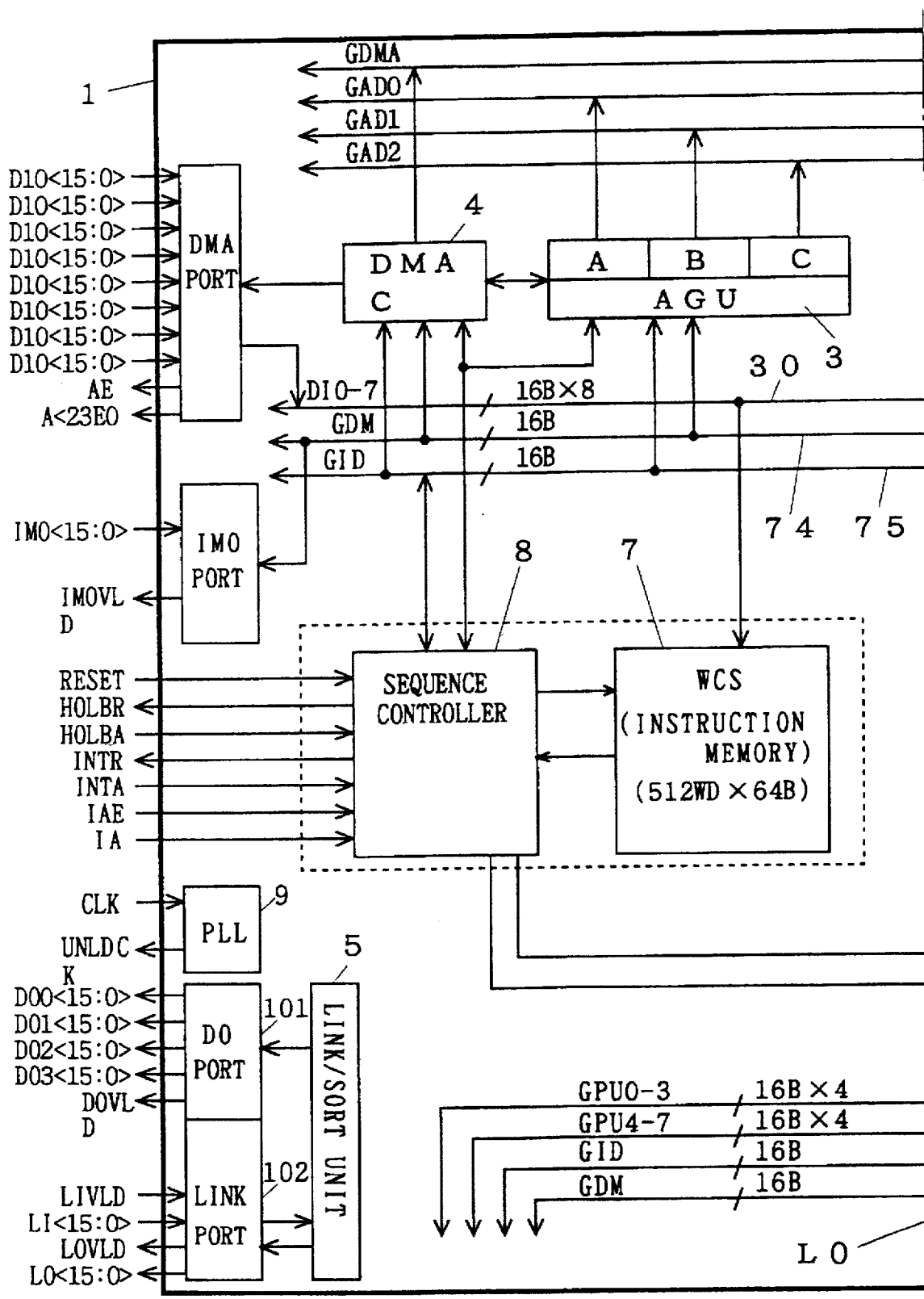
FIGS. 24 to 29 are block diagrams of the whole image processing LSI circuit.
Figure 25:
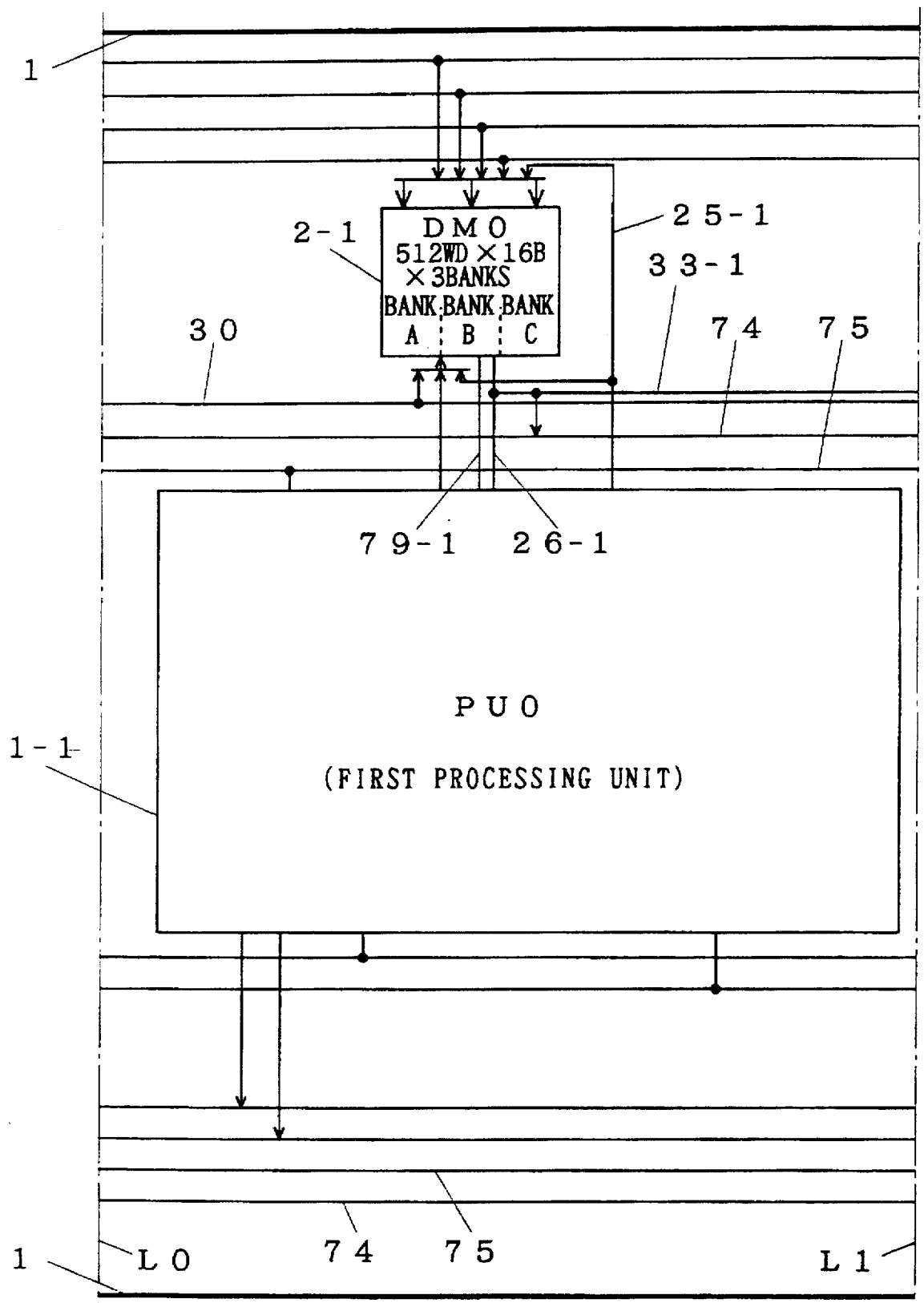
Figure 26:
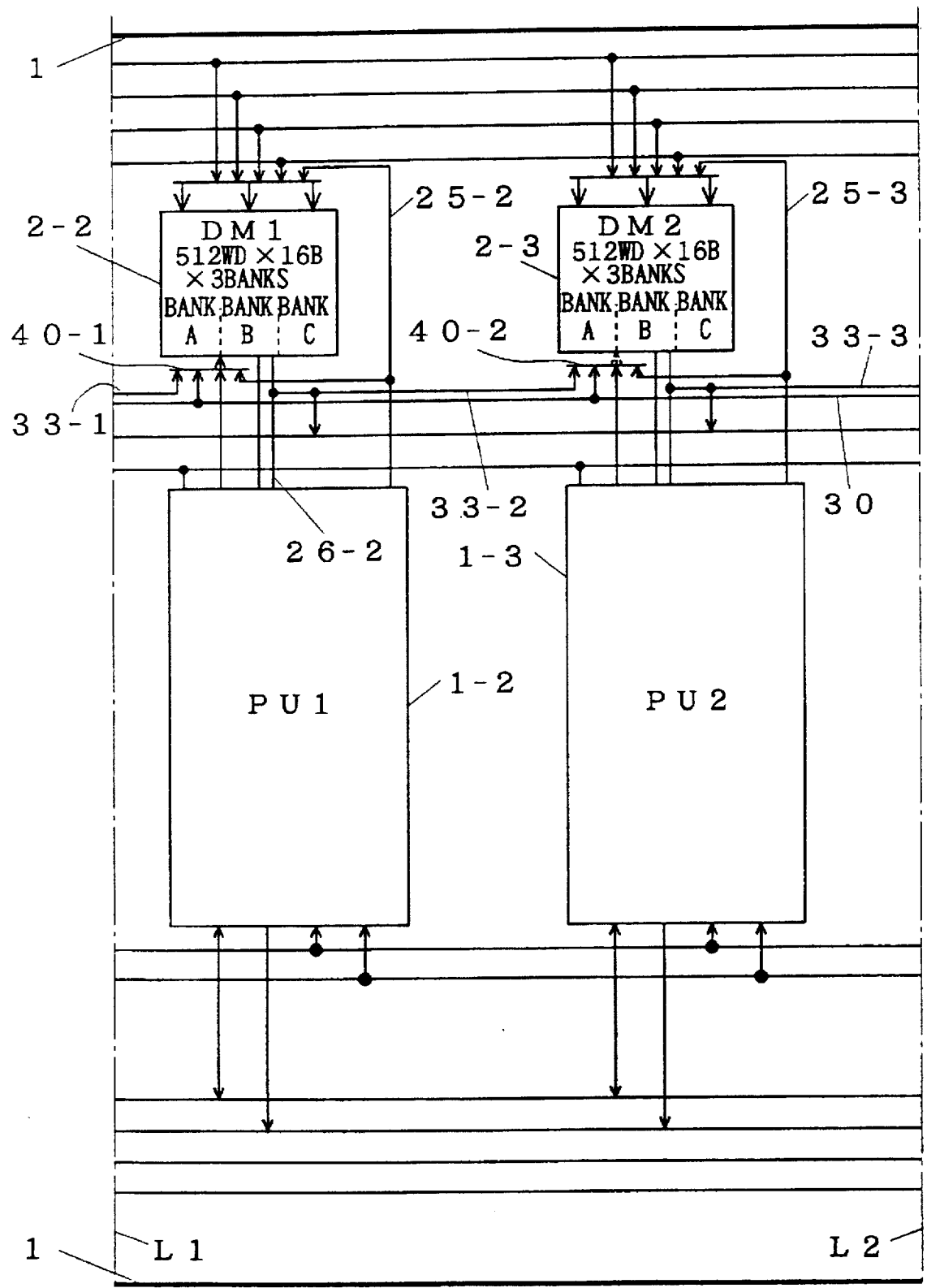
Figure 27:
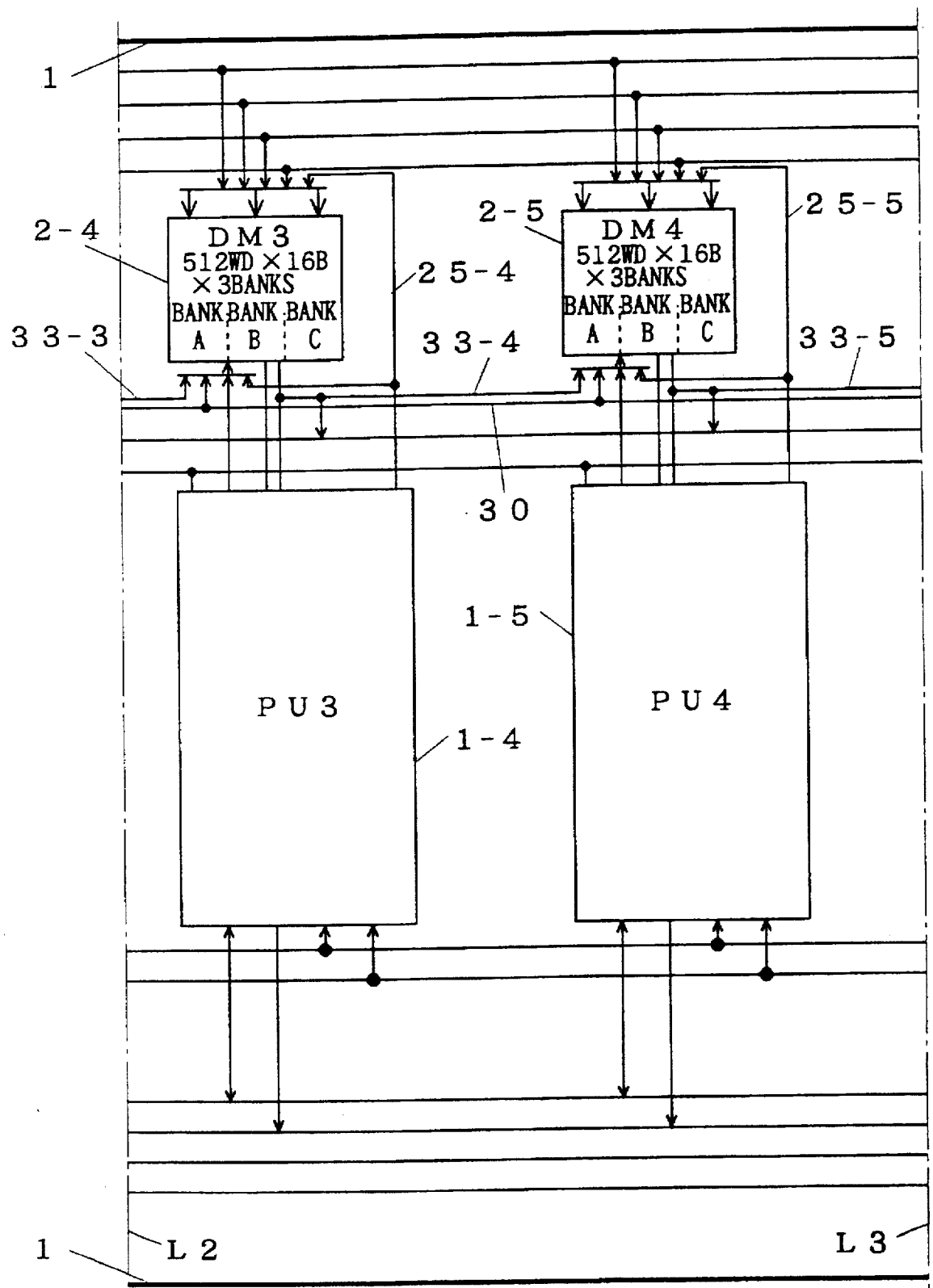
Figure 28:
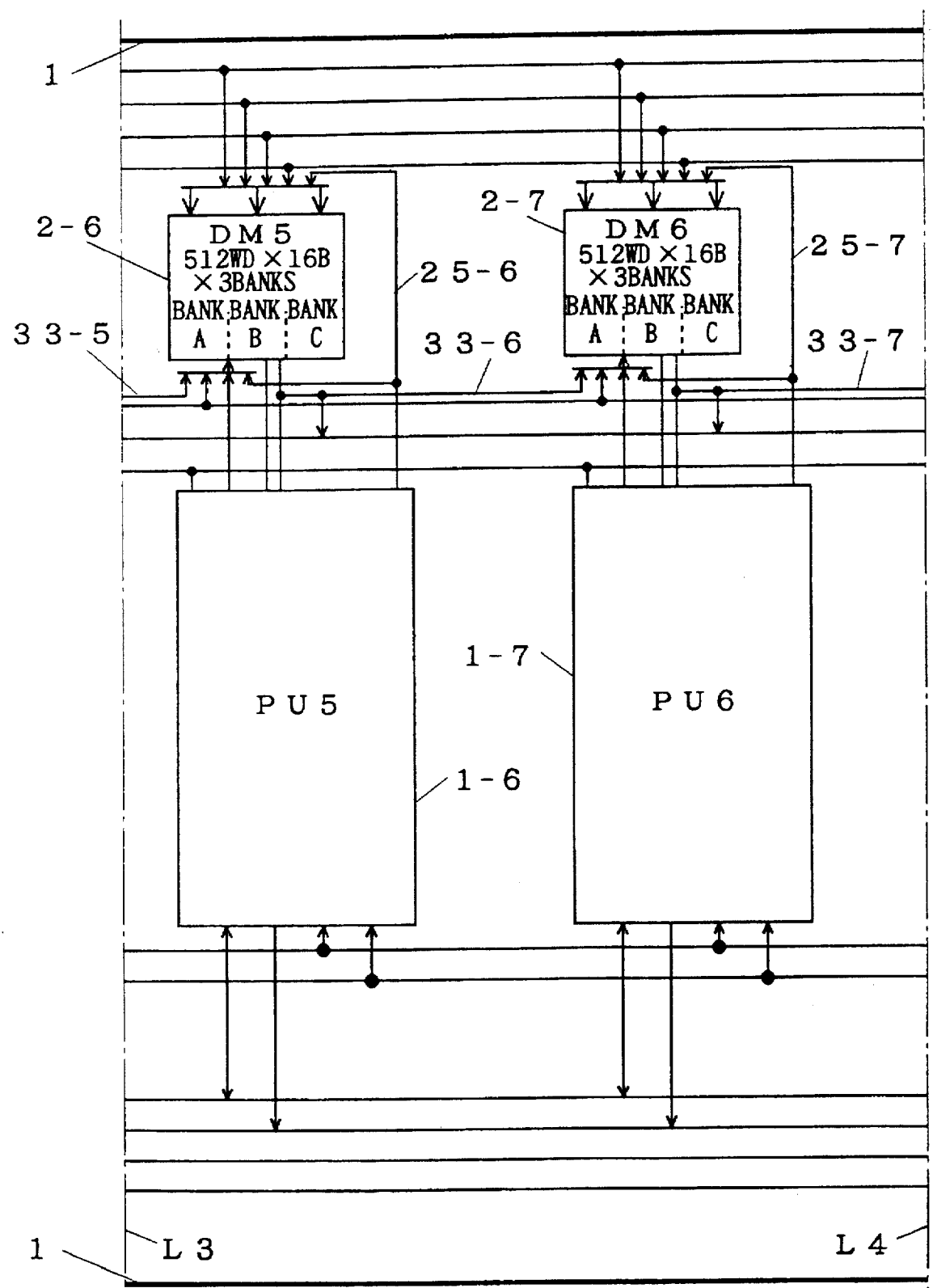
Figure 29:
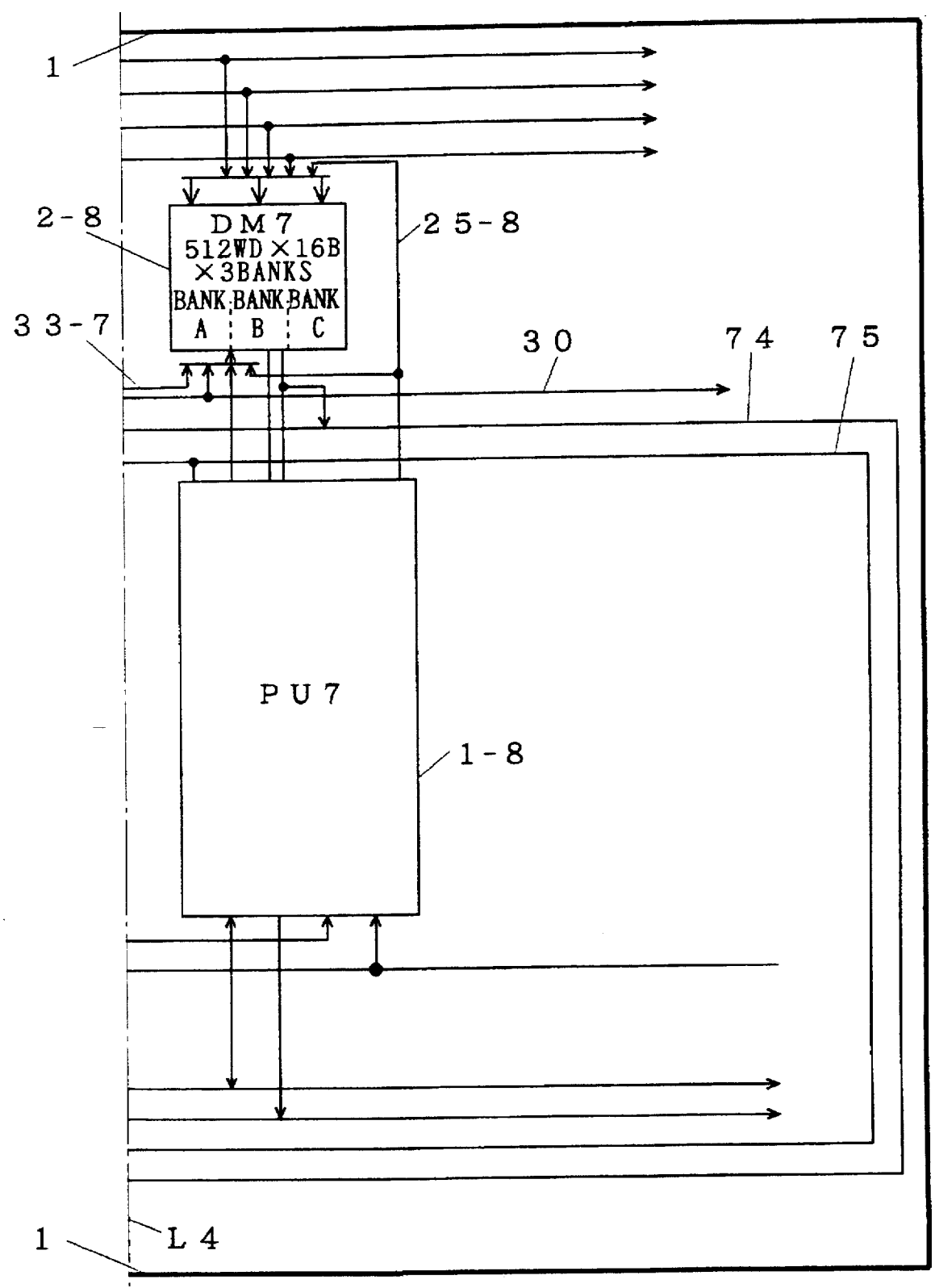

In the description of the operation of the second image processing step, the banks B of the data memories are used as reference tables. The internal structure of each data memory in this case is illustrated in FIG. 23 as a reference. The A-bus, B-bus, C-bus of FIG. 23 are data buses in the processing units 2-1 to 2-3. The C-bus is a data bus for processing unit output data transfer and corresponds to the fourth data buses 25-1 to 25-3 of FIG. 5.

The reference characters GAD0 to GAD2 designate read/write address data outputted from the address generating portion 3 and corresponding to the read/write address signal 29 of FIG. 5; and GDMA designates write address data outputted from the DMA controller (DMA transfer control portion) 4 and corresponding to the write address signal 27 of FIG. 5.

The C-bus is connected to both a selector circuit for address selection and a write data selecting circuit. The circuit holding the address data and write/read data is not illustrated in FIG. 23 for purposes of illustration.

(Third Image Processing Step)

Description will be given on operation in the image processing LSI circuit 1 in the third image processing step, or matching.

As an example of the third image processing step, consideration is given to a feature vector matching for use in an OCR system. The feature vector matching is expressed by:

$$C = \text{Min}(D(0), D(1), \ldots, D(n)) \quad (3)$$

where $$D(i) = \Sigma F(T(i, j), I(j))$$

where C is the most similar candidate obtained from the matching result; D(i) is a distance value between the i-th dictionary data T(i) and the input data I; and F is a distance function. I and T are vector data in about 128 dimensions. From Expression (3), C is obtained as a result of judgement that the dictionary data indicative of the minimum value among the distance values between n dictionary data and the input data are the most similar data. The distance value indicative of the maximum value sometimes indicates the most similar dictionary data, depending on the distance function F. In this case, the Min function must be replaced with a Max function in Expression (3).

The matching is summarized based on the example as follows. When the feature data value determined in the second image processing step is 90, the input data value of 90 is applied to the first to third processing units 1-1 to 1-3. Then three dictionary data which are equal in number to the processing units 1-1 to 1-3 are read from the external template memory M3 to be fed to the first to third processing units 1-1 to 1-3, respectively. Assuming that the three template data applied to the first to third processing units 1-1 to 1-3 are 100 (e.g., indicative of A of an alphabet), 200 (e.g., indicative of B thereof), 150 (e.g., indicative of C thereof), respectively, each of the processing units 1-1 to 1-3 calculates the absolute value of the difference between the input data of 90 and the template data to output the absolute value as a similarity measure. In this case, the output data lines 51-1, 51-2, 51-3 provide the similarity measures of 10, 110, 60, respectively. These similarity measures are sorted, and the minimum measure is extracted. From the minimum measure is judged a character image indicated by the original image. The judgement is made as sorting by the postprocessing portion 5 in the image processing LSI circuit 1. In this example, the similarity measure of 10 is minimum, and the postprocessing portion 5 judges that the image is the alphabetic character A from the template data corresponding to the similarity measure of 10.

In practice, it is necessary to calculate the differences between all of the template data and the input data. Thus, three template data are extracted for each calculation to perform the aforementioned processing, and finally the minimum value is determined.

The summary of the third image processing step is described above. For adaptation of the image processing LSI circuit 1 to the third image processing step, there is a need to write the external input data to the data memories 2-1 to 2-3 in parallel and to read the data in parallel to apply the data to the first to third processing units 1-1 to 1-3. The sequence control portion 8 produces the selection command signal 41-1 indicative of parallel write to output the signal 41-1 to the selector circuits 40-1, 40-2 by program control. Then the selector circuits 40-1, 40-2 perform switching, and the data lines 30-1, 30-2, 30-3 are connected to the write ports of the first, second, and third data memories 2-1, 2-2, 2-3, respectively.

For execution of the feature vector matching in the first preferred embodiment, parallel processable portions are extracted from Expression (3) as well as the spatial filtering. It is obvious that D(i) in Expression (3) is calculated independently. The number of dictionary templates n is 3500 or more in the OCR system. However, it is impossible for one image processing LSI circuit 1 to contain n processing units arranged in parallel because of the restriction of the degree of integration of the semiconductor device.

Although the three processing units 1-1 to 1-3 are illustrated as arranged in parallel in FIGS. 4, 5, 7, the example for the OCR system includes four parallel-arranged processing units which are sufficiently available in the current state of the art. Each processing unit calculates the distance of 128 vectors/template, which requires 128 steps even by using a very simple distance function (the sum of absolute values of differences).

The linking/sorting portion 5 makes magnitude comparison (sorting in a broad sense) between the four outputs from the processing units for each 128 step (for each 128 clock cycle in the case of 1 step/clock). The comparison, if sequential, requires four process steps. In this manner, the feature vector matching satisfies the relation: (the number of process steps in the processing units)>(the number of process steps in the linking/sorting portion).

In the third image processing step, the postprocessing portion 5 performs sorting, and outputs the output data signal 54 to the external memory upon completion of the third image processing step. This reduces the number of pins. Further, the additional provision of the processing unit output control means (FIG. 18) to be described later allows the postprocessing portion 5 to burden with the wait state during the matching result output, which might prevent the influence of the wait state from being exerted upon the first to third processing units 1-1 to 1-3.

As above stated, to execute a series of image processing including the spatial filtering and feature vector matching at high speeds in the same image processing LSI circuit 1, it is very significant to arrange the processing units in parallel in the image processing LSI circuit 1 and to continuously operate the processing units without interrupt. The conventional programmable image processing LSI circuits, however, are designed such that data are directly transferred from the processing units to the external interface portion, which causes the wait state resulting from the external data transfer at lower speeds than the speeds within the image processing LSI circuit to thereby prevent high-speed continuous processing of the processing units. In the image processing LSI circuit 1 of the first preferred embodiment, the processing units are separated from the external transfer operation in the first to third image processing steps to reduce the processing loads, and the external data transfer is performed through the linking/softing portion 5 so that the wait state does not greatly influence the processing throughput. This allows the high-speed image processing throughout the first to third image processing steps in the same image processing LSI circuit 1. The image processing LSI circuit is sufficiently expected to greatly reduce the number of external data pins as compared with the conventional image processing LSI circuits in which the processing unit outputs are directly transferred to the exterior. This contributes to the reduction in area and power consumption of the image processing LSI circuit 1 and the reduction in parasitic capacitance for high-speed processing.

Figure 10:
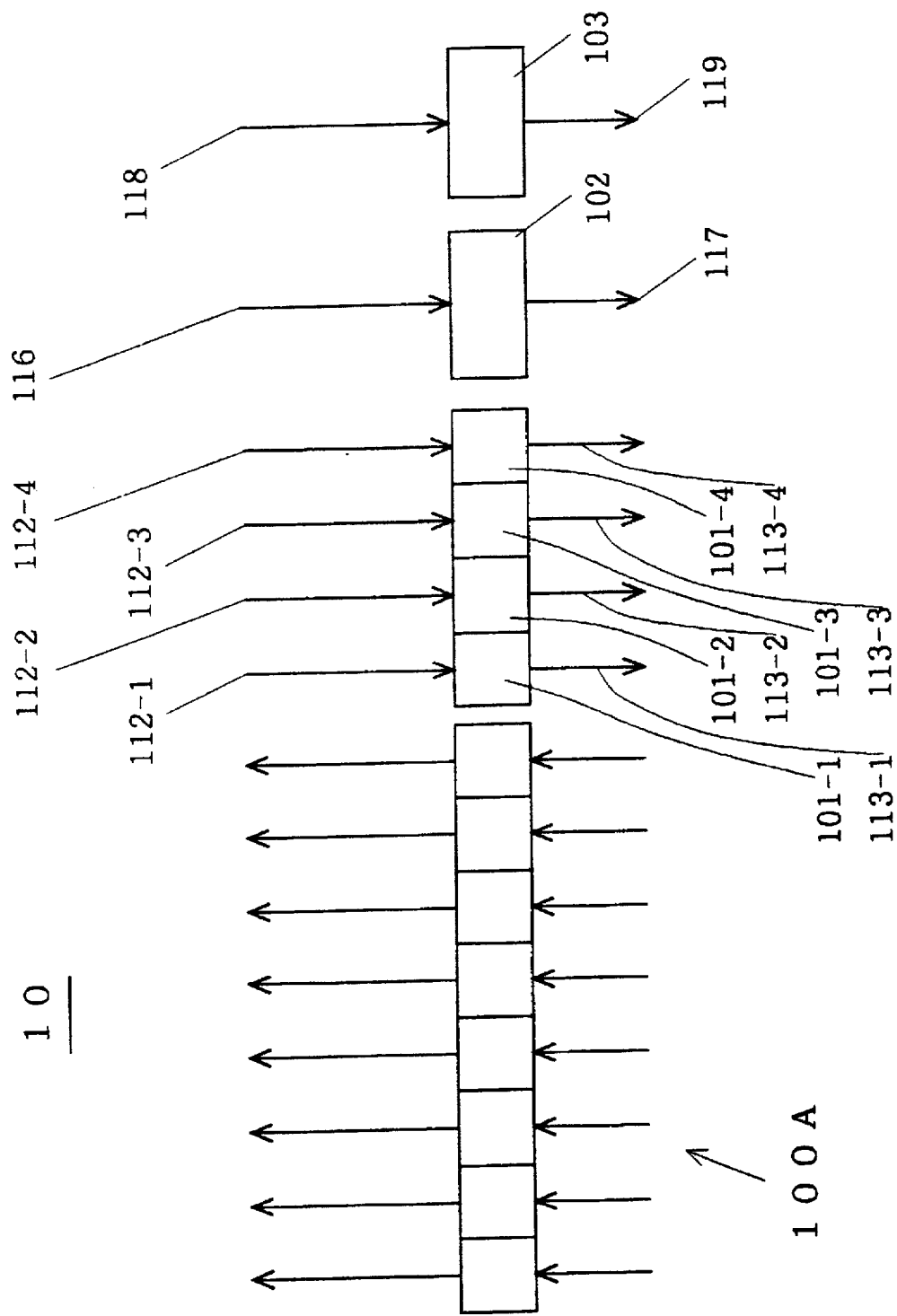
FIG. 10 is a schematic block diagram of an I/O port portion of the image processing LSI circuit of the first preferred embodiment.
Figure 11:
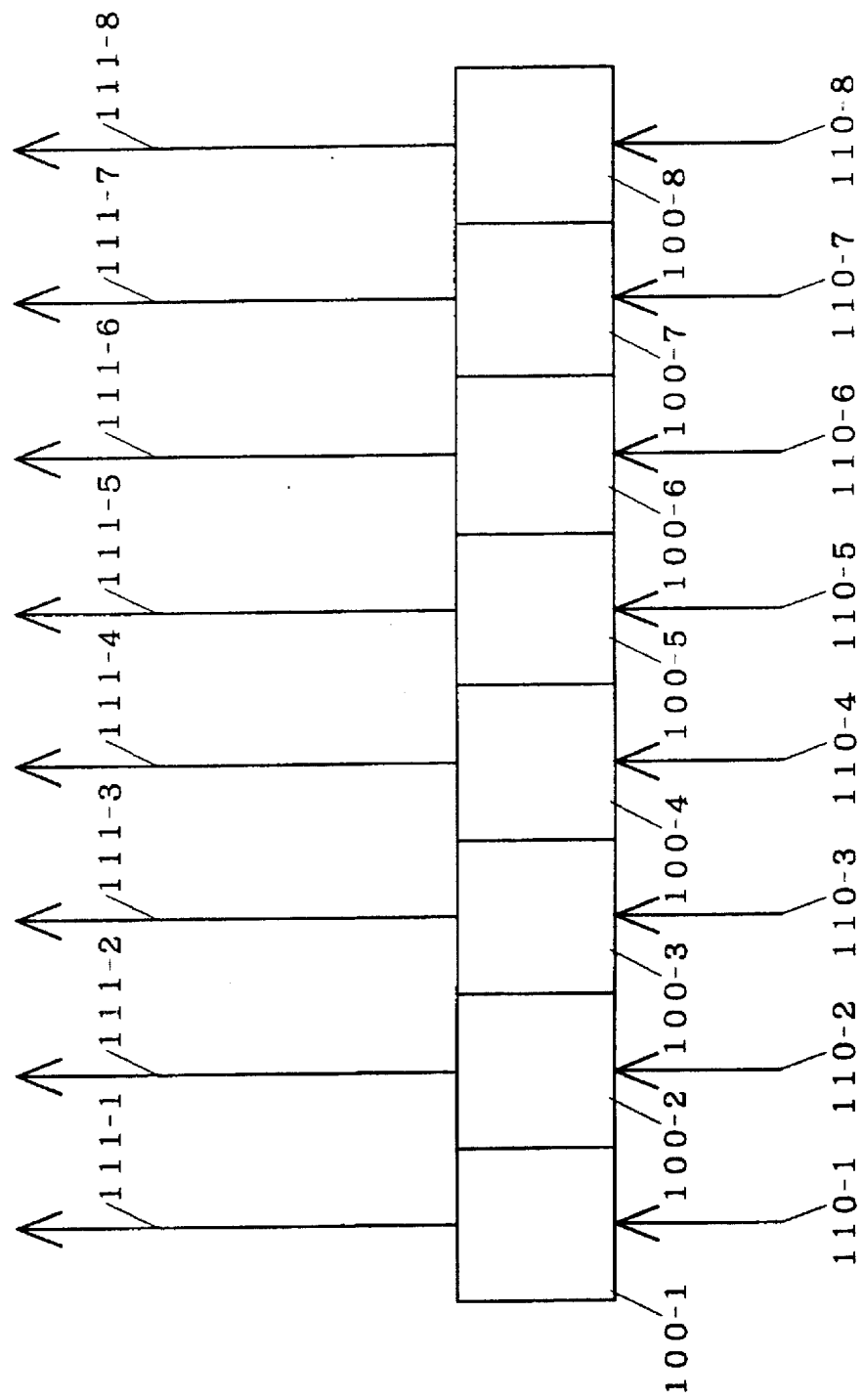
FIG. 11 is a schematic block diagram on an enlarged scale of a data input portion of the I/O port portion of the image processing LSI circuit of the first preferred embodiment.

FIGS. 10 and 11 are detail block diagrams of the I/O port portion 10 of the first preferred embodiment. FIG. 11 illustrates a port portion 100A for input data in FIG. 10 on an enlarged scale. The image processing LSI circuit 1 of the first preferred embodiment is in practice designed to include eight processing units (PU0 to PU7). In FIGS. 10 and 11, the reference character 100-n (n=1, 2, 3, 4, 5, 6, 7, 8) designates a data port (referred to hereinafter as a DI port or parallel data input port) for writing data to the n-th data memories 2-n; 101-m (m=1, 2, 3, 4; m=n/2) designates a data port (referred to hereinafter as a DO port or parallel data output port) for transferring the output data (output data signal 56) in the second and third image processing steps to the exterior of the image processing LSI circuit 1; 102 designates a link output data transfer data port (referred to hereinafter as a LINK port or link output port) for transferring the output data signal 56 in the first image processing step, or the link output data, to the exterior; 103 designates a data port (referred to hereinafter as an IMO port or delay input data signal output port) for transferring the raster scanning image data delayed by desired clock cycles in the image processing LSI circuit 1 to the exterior of the image processing LSI circuit 1; 110-n designates an external input data line connected to the DI port 100-n; 111-n designates a data bus for transferring the input data signal applied to the DI port 100-n to the n-th data memory 2-n in the image processing LSI circuit 1; 112-m designates a data line for transferring m-th data selected from the output data (provided through the linking/sorting portion 5) from the 2m (=n) processing units in the image processing LSI circuit 1; 113-m designates a data line for the data outputted from the DO port 101-m; 116 designates a link output transfer data bus; 117 designates a data line for link output data; 118 designates a data bus for the raster scanning image data delayed by the desired clock cycles in the image processing LSI circuit 1 and corresponding to the bus 33-3 of FIG. 5; and 119 designates a data line for delay raster image data.

Referring to FIG. 10, the four DO ports are provided for the reasons to be described below. One DO port is required when the sorting determines one similarity measure judgement result. In practice, however, like results are often produced to provide a plurality of similarity measure judgement results. In this case, there is a request to quickly output the plurality of candidates to the exterior. To flexibly accept the request, the four DO ports 101-1 to 101-4 are provided. In the second image processing step, the four DO ports 101-1 to 101-4 are sometimes used to output the output data signal to the exterior depending upon the contents of the second image processing step. To flexibly meet the requirement, the four DO ports 101-1 to 101-4 are provided.

The above-mentioned arrangement of the external data port (I/O port portion 10) provides for high-speed data supply to the processing units 1-1 to 1-n arranged in parallel in the image processing LSI circuit 1 and reduction in the number of external data pins by the simultaneous transfer of data the number of which is half the number of processing units. Consequently, power consumption in the output driver circuit portion is reduced.

As described hereinabove, some types of image processing include the process steps in the postprocessing which are fewer than the process steps in the processing units. In other words, there is a time allowance to output the postprocessing result. The number of postprocessing outputs arranged in parallel is often less than the degree of parallelism of the processing unit outputs. Increase in the number of external pins increases the external parasitic capacitances to be driven and, accordingly, increases power consumption of the image processing LSI circuit 1. One of the effects of the first preferred embodiment is to reduce the number of external pins without lowering the processing performance of the image processing LSI circuit.

(First Modification of First Preferred Embodiment)

In the first preferred embodiment, the first to third data memories 2-1 to 2-3 of FIG. 6 include a plurality of banks using the single-port memories. Instead, the first to third data memories may include multi-port memories such as 2-port memories having independently separated read and write ports. Other portions are the same. The first modification have similar effects to the first preferred embodiment. That is, the DMA transfer and the read/write operation by instructions may be separately executed, thereby achieving the image processing LSI circuit in which the external transfer operation, if at low speeds, does not interfere with the high-speed internal calculation.

(Second Modification of First Preferred Embodiment)

The FIFO order is accomplished in the general-purpose data memories in the first preferred embodiment. Instead, the first to third data memories 2-1 to 2-3 of FIG. 5 may include FIFO-only memories, providing similar effects.

(Second Preferred Embodiment)

Figure 12:
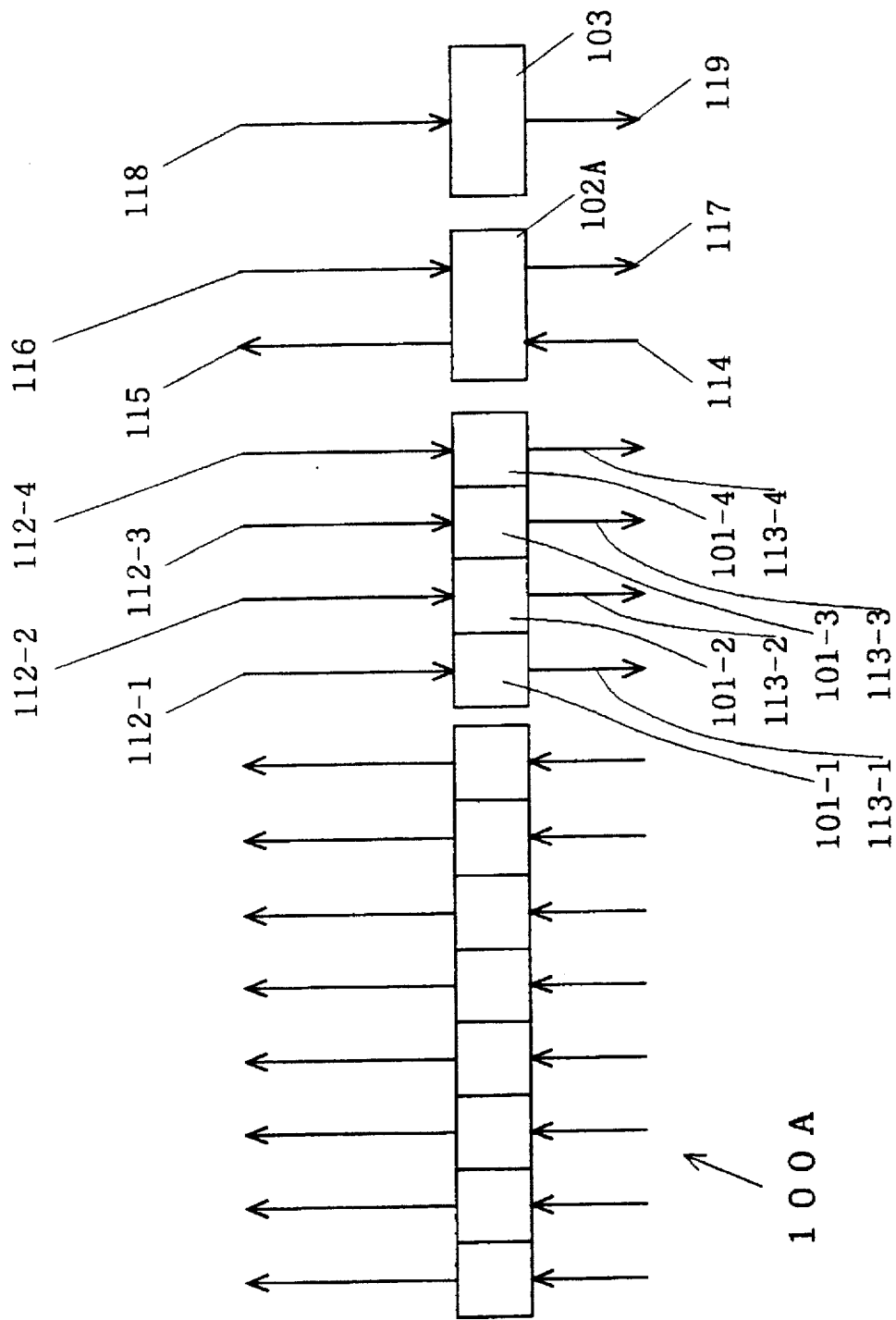
FIG. 12 is a schematic block diagram of the I/O port portion of the image processing LSI circuit according to a second preferred embodiment of the present invention.
Figure 13:
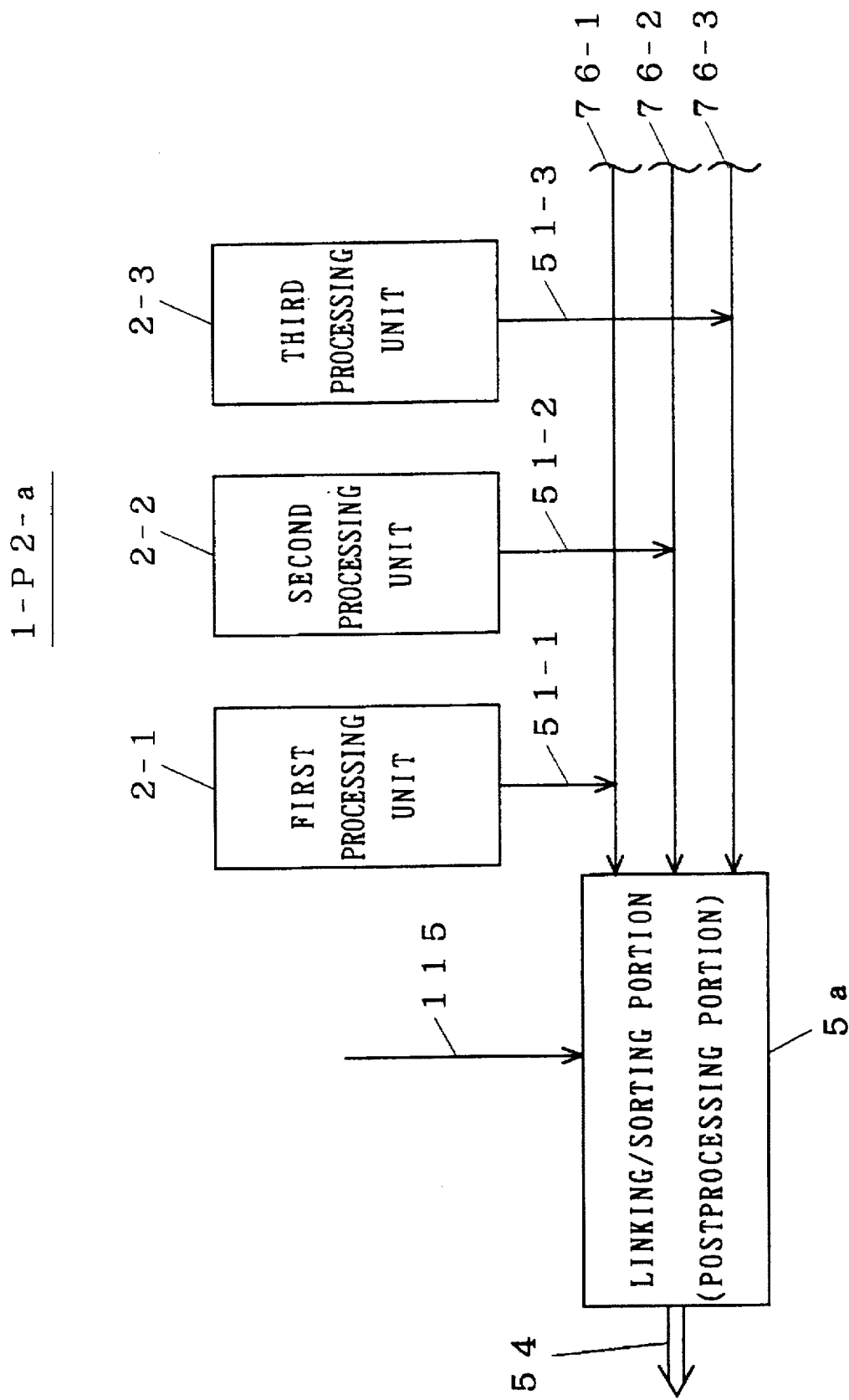
FIG. 13 is a block diagram of a linking/sorting portion of the image processing LSI circuit of the second preferred embodiment.

FIG. 12 is a block diagram of an I/O port portion 10A of the image processing LSI circuit according to a second preferred embodiment of the present invention. FIG. 13 is a block diagram of a peripheral area 1-P2-a of a linking/sorting portion (postprocessing portion) 5a of the image processing LSI circuit according to the second preferred embodiment of the present invention. Other portions of the image processing LSI circuit of the second preferred embodiment are identical with those of the first preferred embodiment. In FIGS. 12 and 13, the reference character 102A designates a data port (a LINK port or a link output and link input port) for transmission of intermediate processing data for use in a multiprocessor structure; 114 designates a data line for link input data connected to the LINK port 102A; and 115 designates a link input transfer data bus connected to the linking/sorting portion 5a through the external interface portion 6. Other reference characters are used to designate portions identical with those of the first preferred embodiment.

A structure in which the input data ports (DI ports) 100-n are reduced in number and data on the data lines 110-n are fetched in a time-shared manner does not sometimes satisfy the transfer rate required for the processing units, resulting in lowered processing performance. On the other hand, there arises a need for a filter size greater than 11×11 for the spatial filtering. However, the degree of semiconductor integration is not high enough to meet the filter size requirement. Development of an image processing LSI circuit for processing a large-sized filter at high speeds is essential for progress in the field of image processing. The structure of the external port 10A of the image processing LSI circuit 1 of the second preferred embodiment includes the LINK port 102A to meet the requirement. That is, a desired large-sized spatial filtering is executed in a multiprocessor construction system. Further, to process such a large-sized spatial filtering with a plurality of image processing LSI circuits, it is necessary to sequentially feed raster scanning image data between the image processing LSI circuits. For this purpose, the IMO port 103 is used. The DMA transfer control portion 4 is connected to one of the DI ports 100-n when the raster scanning image data are applied to the image processing LSI circuits. The conventional image processing LSI circuits are adapted to only specific processing (one of the image preprocessing, feature extraction, and matching) and do not include the external port 10A of the present invention.

Figure 14:
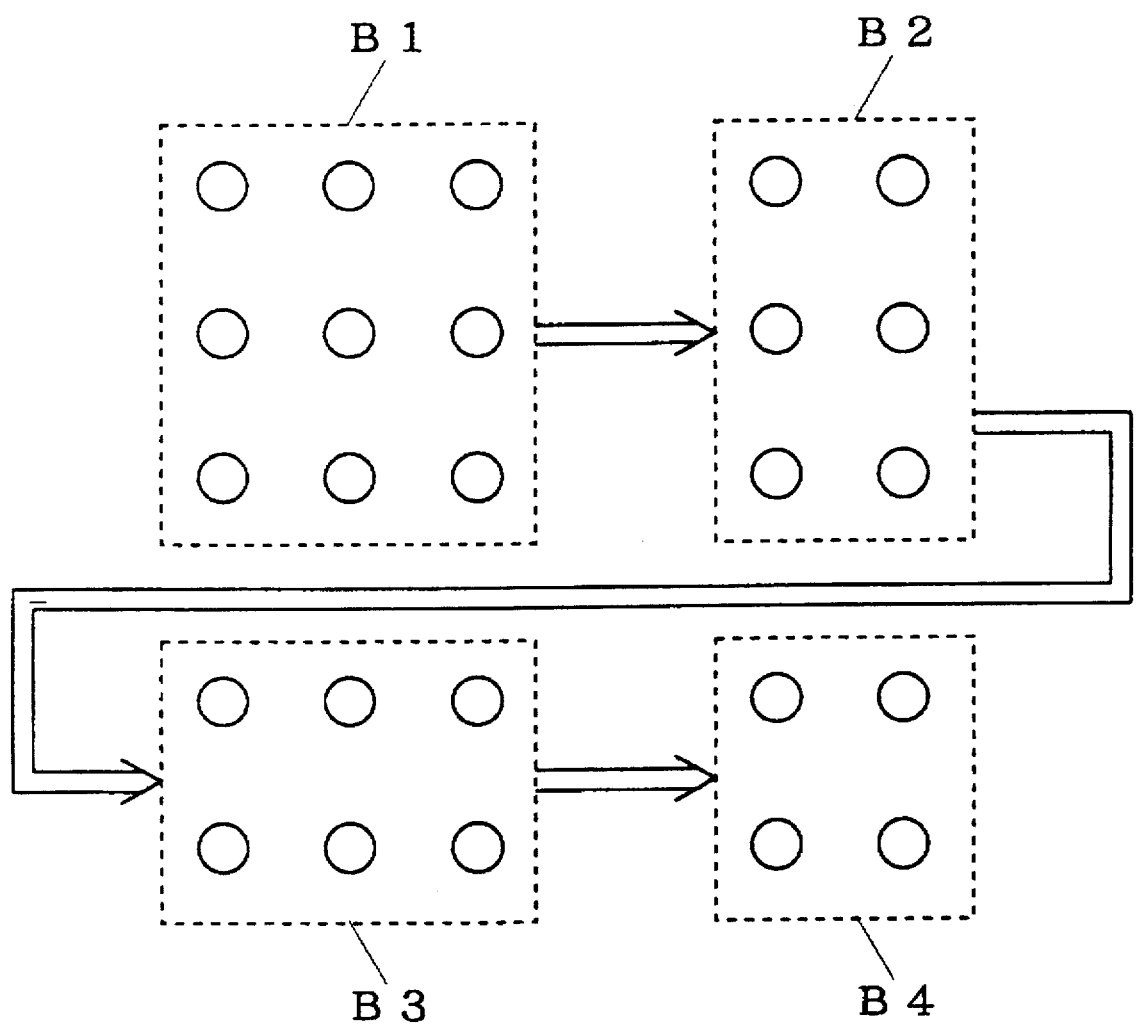
FIG. 14 schematically illustrates input and output of link data in a plurality of LSI structures applied to the image processing LSI circuit of the second preferred embodiment.
Figure 15:
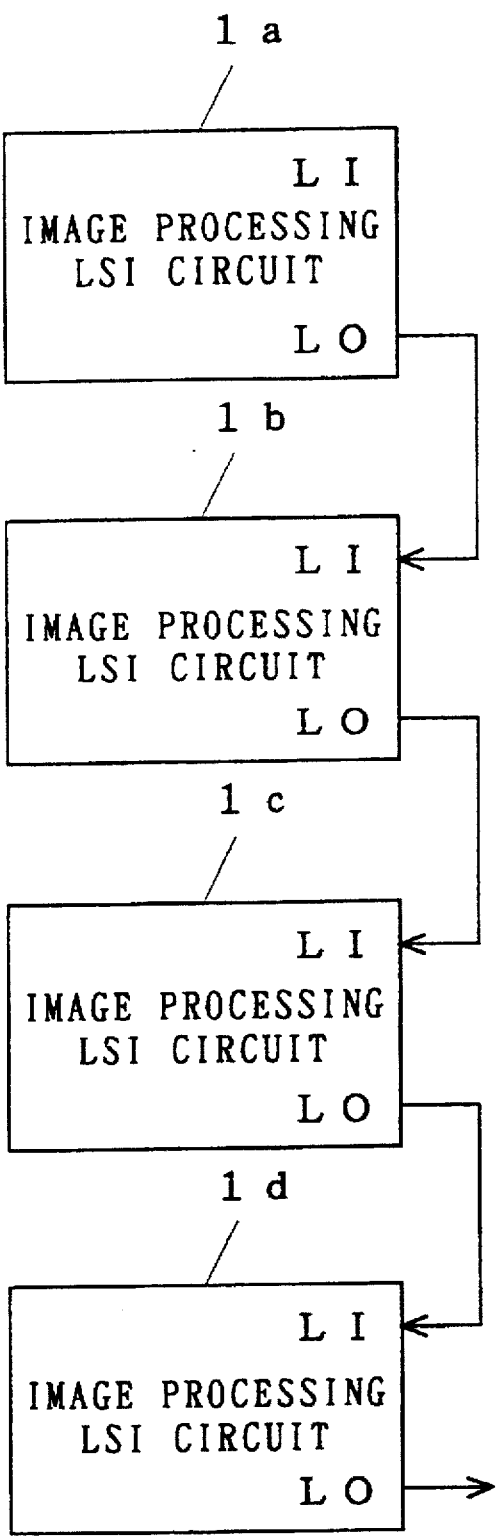
FIG. 15 is a schematic block diagram of the input and output of the link data in the plurality of LSI structures applied to the image processing LSI circuit of the second preferred embodiment.

To facilitate an understanding of the function of the LINK port 102A, the function will be discussed below with reference to FIGS. 14 and 15 in which the function is schematically illustrated in a simple example. It is supposed that the individual image processing LSI circuit 1 is adaptable to the image preprocessing using the spatial filter of 3×3 pixel size. If the spatial filtering is performed on a large-sized two-dimensional image with a spatial filter of 5×5 pixel size, the two-dimensional image is not processed by one image processing LSI circuit (one chip) 1 since the image processing LSI circuit 1 has three processing units arranged in parallel. Referring to FIG. 14, the spatial filter of 5×5 pixel size is divided into four blocks B1 to B4 each of which is of less than 3×3 pixel size to permit one image processing LSI circuit to perform the matrix calculations in the individual blocks B1 to B4. Sequential execution of the parallel processing of the blocks B1 to B4 in image processing LSI circuits 1a to 1d of FIG. 15 accomplishes the preprocessing with the large filter. Each of the image processing LSI circuits 1a to 1d includes a port LI for receiving the link input data and a port LO for outputting the link output data. The ports LI, LO correspond to the LINK port 102A of FIG. 12.

In this manner, the provision of the external data port 10A of the second preferred embodiment provides for high-speed supply of the input data to the processing units arranged in parallel in the image processing LSI circuit. This reduces the number of external data pins without lowering the processing performance of the image processing LSI circuit by the simultaneous transfer of data the number of which is half the number of processing units, and reduces power consumption in the output driver circuit portion. Processing of the plurality of image processing LSI circuits is achieved for high-speed image processing if the filter size increases in the spatial filtering.

(Third Preferred Embodiment)

FIG. 16 is a block diagram of an image processing LSI circuit 1B according to a third preferred embodiment of the present invention. In FIG. 16, the reference numeral 31 designates a data signal which is DMA-transferred from the external memory; and 32 designates a data line for transferring the data signal 31 to the first data memory 2-1. Other reference characters are used to designate portions identical with those of the first and second preferred embodiments. Some elements are designated by the reference characters of the first and second preferred embodiments with a character A for distinction (for example, a sequence control portion 8A).

In the third preferred embodiment, the DMA transferred input data are written to and read from the first to third data memories 2-1 to 2-3 in FiFO order. The image processing LSI circuit 1B accomplishes the image preprocessing (the first image processing step) at high speeds similar to the first preferred embodiment. The second image processing step using all spatially filtered pixel data stored in the external memory M2 is achieved at high speeds by the image processing LSI circuit 1B. The effect of reducing the number of pins in the I/O port portion 10A is also provided similar to the first preferred embodiment.

(Fourth Preferred Embodiment)

Figure 17:
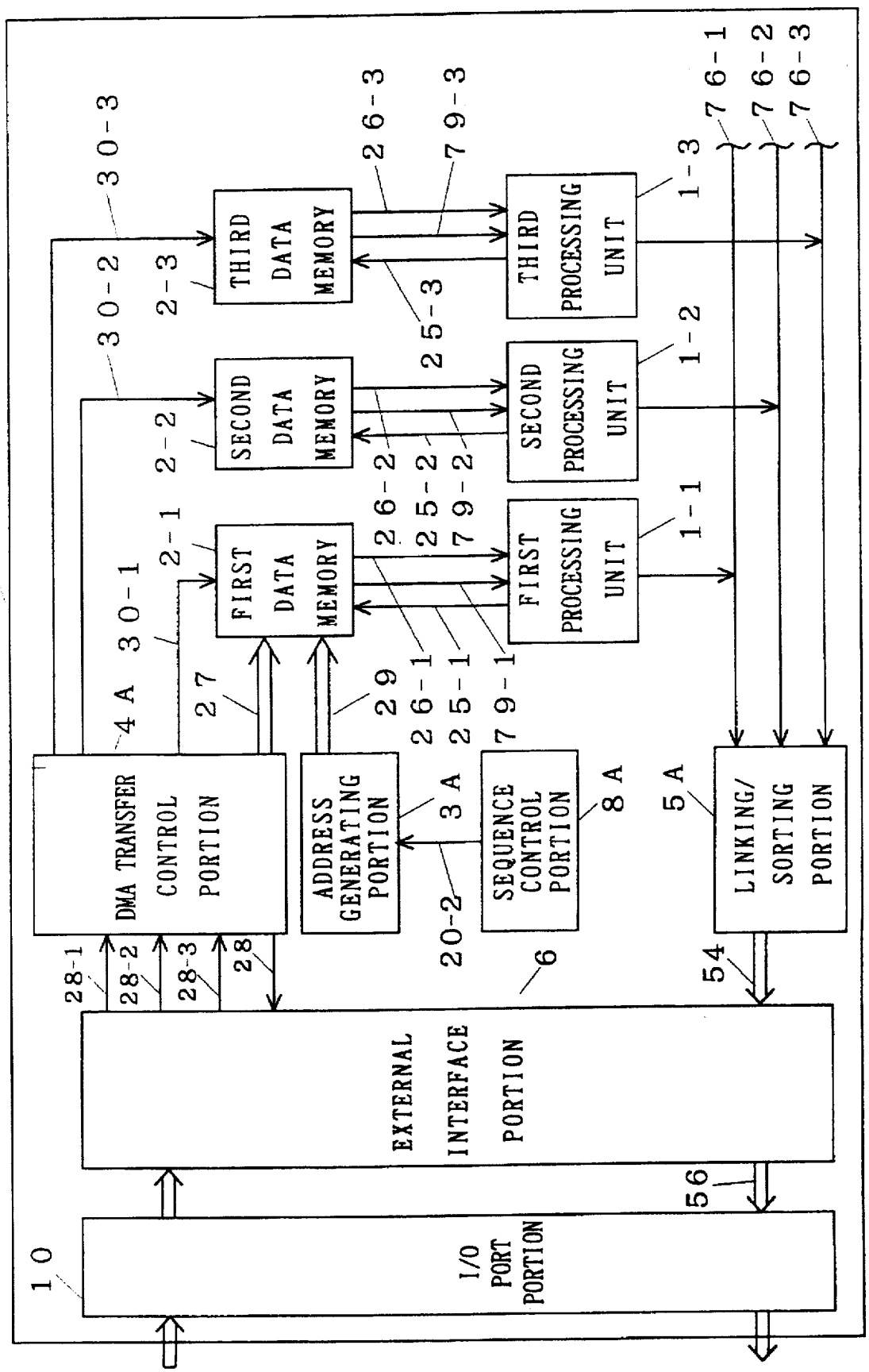
FIG. 17 is a block diagram of respective portions of the image processing LSI circuit according to a fourth preferred embodiment of the present invention.

FIG. 17 is a block diagram of an image processing LSI circuit 1A according to a fourth preferred embodiment of the present invention. The reference characters are used in FIG. 17 to designate elements corresponding to those of the first and second preferred embodiments. Some elements are designated by the reference characters with a character A. The image processing LSI circuit 1A executes the matching (the third image processing step) at high speeds similar to the first preferred embodiment. The number of pins in the I/O port portion 10 is reduced. The image processing LSI circuit 1A processes the second image processing step at high speeds when the second image processing step is executed using only the pixel data in an area among the spatially filtered pixel data stored in the external memory M2.

(Fifth Preferred Embodiment)

Figure 18:
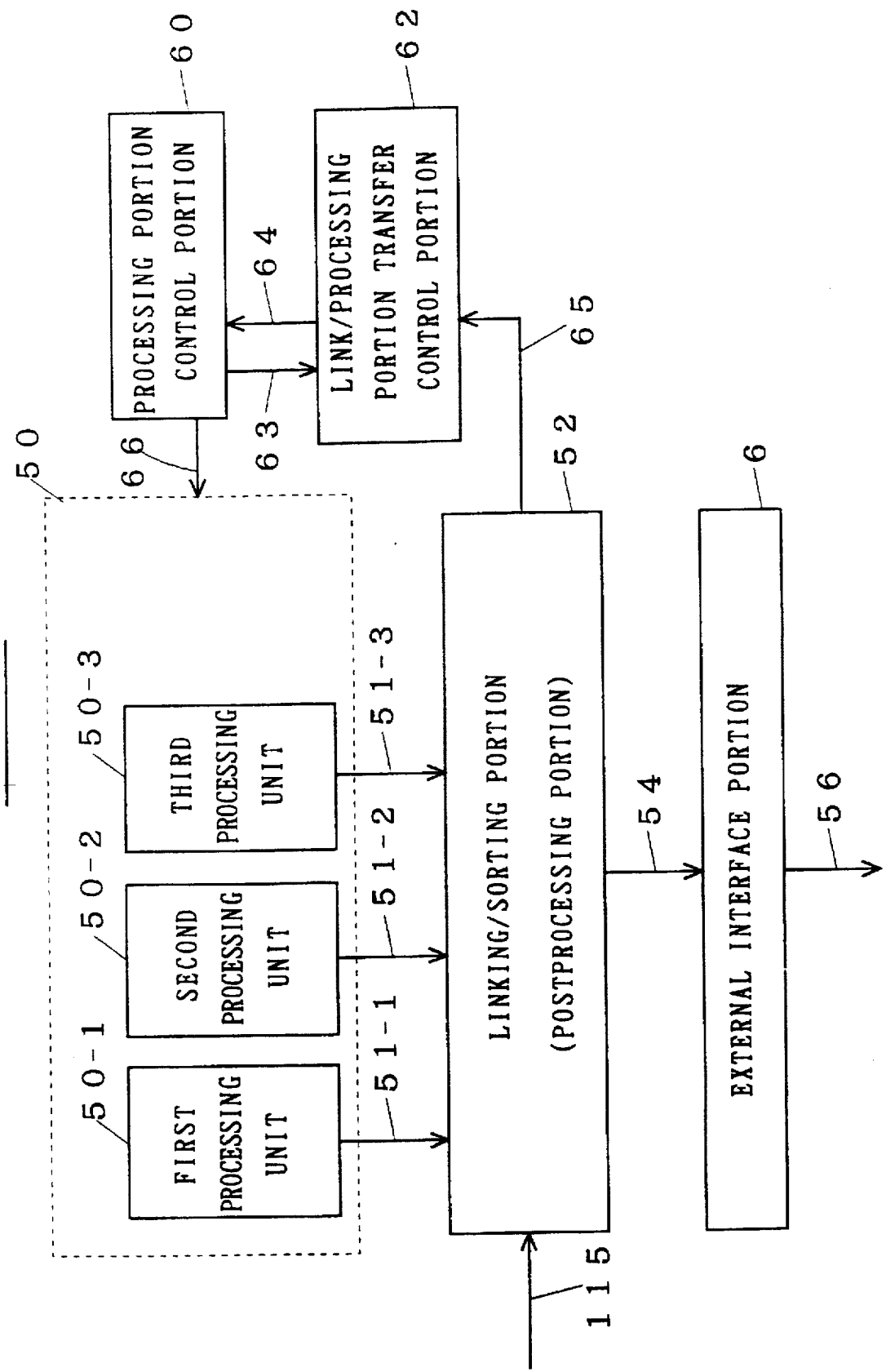
FIG. 18 is a block diagram of respective portions of the image processing LSI circuit according to a fifth preferred embodiment of the present invention.

FIG. 18 is a block diagram of a linking/sorting portion 52 and adjacent constituents of the image processing LSI circuit according to a fifth preferred embodiment of the present invention. FIG. 18 corresponds to a variation 1-P2-A of the region 1-P2 of FIG. 4. In the fifth preferred embodiment, the I/O port portion is equivalent to that of FIG. 12.

In FIG. 18, the reference numeral 50 designates a processing portion; 50-1 to 50-3 designate first to third processing units forming the processing portion 50; 51-1 designates an output signal (second data bus) from the first processing unit 50-1; 51-2 designates an output signal (second data bus) from the second processing unit 50-2; 51-3 designates an output signal (second data bus) from the third processing unit 50-3; 52 designates a postprocessing portion which serves as a linking/sorting portion having linking and sorting functions in the firth preferred embodiment; 115 designates an external input data signal (linking intermediate result in a plural-LSI structure) fed through the link port 102A and corresponding to 115 of FIG. 12; 54 designates an output signal from the linking/sorting portion 52; 6 designates an external interface portion; 56 designates an output data signal from the external interface portion 6; 60 designates a processing portion control portion for controlling the processing portion 50; 62 designates a link/processing portion transfer control portion for controlling the linking/sorting portion 52; 63 designates a transfer request signal for data transfer from the processing portion 50 to the linking/sorting portion 52; 64 designates a transfer permission signal from the link/processing portion transfer control portion 62 to the processing portion control portion 60; 65 designates a BUSY flag from the linking/sorting portion 52; and 66 designates a wait signal for the processing portion 50. Other constructions of the fifth preferred embodiment are identical with those of the first and second preferred embodiments. The processing portion control portion 60 and the link/processing portion transfer control portion 62 are generally referred to as processing unit output control means.

In FIG. 18, three processing units are arranged in parallel for purposes of illustration. The effects of the fifth preferred embodiment do not depend on the number of processing units arranged in parallel.

The feature of the fifth preferred embodiment is an isolation technique between the processing portion 50 and the linking/sorting portion 52. In the first to fourth preferred embodiments, the postprocessing portion 5 transfers the output data to the exterior, but the wait time caused during the output data transfer to the external data memories is not accommodated only by the postprocessing portion. The processing units might completely stop their operation when the linking/sorting portion 52 is in the wait state. Thus a need arises that the processing portion 50 executes the calculation when the linking/sorting portion 52 is in the wait state unless the processing portion 50 outputs a first image processing result to the linking/sorting portion 52.

For isolation between the external transfer operation from the linking/sorting portion 52 and the operation of the processing portion 50, the fifth preferred embodiment comprises the processing portion control portion 60 and the link/processing portion transfer control portion 62, with a handshake therebetween. This allows the processing portion control portion 60 and the link/processing portion transfer control portion 62 to place the processing portion 50 into the wait state when the processing portion 50 produces outputs 51-1 to 51-3 while the linking/sorting portion 52 is executing the postprocessing and output data transfer upon the previous outputs 51-1 to 51-3 received from the processing portion 50. The number of process steps executed in the processing portion 50 changes depending upon the processing contents. In the fifth preferred embodiment, the same control portions are adaptable to the changes in the number of process steps of the processing portion 50. Operation will be described below.

As the output data 51-1 to 51-3 become ready in the processing portion 50, the processing portion control portion 60 sets the transfer request signal 63 to "1" to output the transfer request signal 63 to the link/processing portion transfer control portion 62. The BUSY flag 65 is set to "1" when the linking/sorting portion 52 is in execution. The link/processing portion transfer control portion 62 samples the transfer request signal 63 and the BUSY flag 65 from the linking/sorting portion 52. If the transfer request signal 63 is asserted, with the BUSY flag being "1", the transfer permission signal 64 remains "0", and the processing portion control portion 60 continues asserting the transfer request signal 63 and asserts and outputs the wait signal 66 to the processing portion 50 to temporarily stop the processing of the processing portion 50. Then when the negation of the BUSY flag 65 (completion of the processing of the linking/sorting portion 52) is sampled, the link/processing portion transfer control portion 62 asserts the transfer permission signal 64. When the transfer permission signal 64 is asserted, the processing portion control portion 60 negates the wait signal 66 to restart the operation of the processing portion 50, and negates the transfer request signal 63. Upon sampling the negation of the transfer request signal 63, the link/processing portion transfer control portion 62 negates the transfer permission signal 64. Such a handshaking system provides for the image processing LSI circuit adaptable to the image processing including various numbers of process steps. This permits the linking/sorting portion 52 to accommodate the wait time caused during the external output of the output data signal 54 and prevents the influence of the wait time from being exerted upon the processing units to achieve high-speed image processing.

(Sixth Preferred Embodiment)

Figure 19:
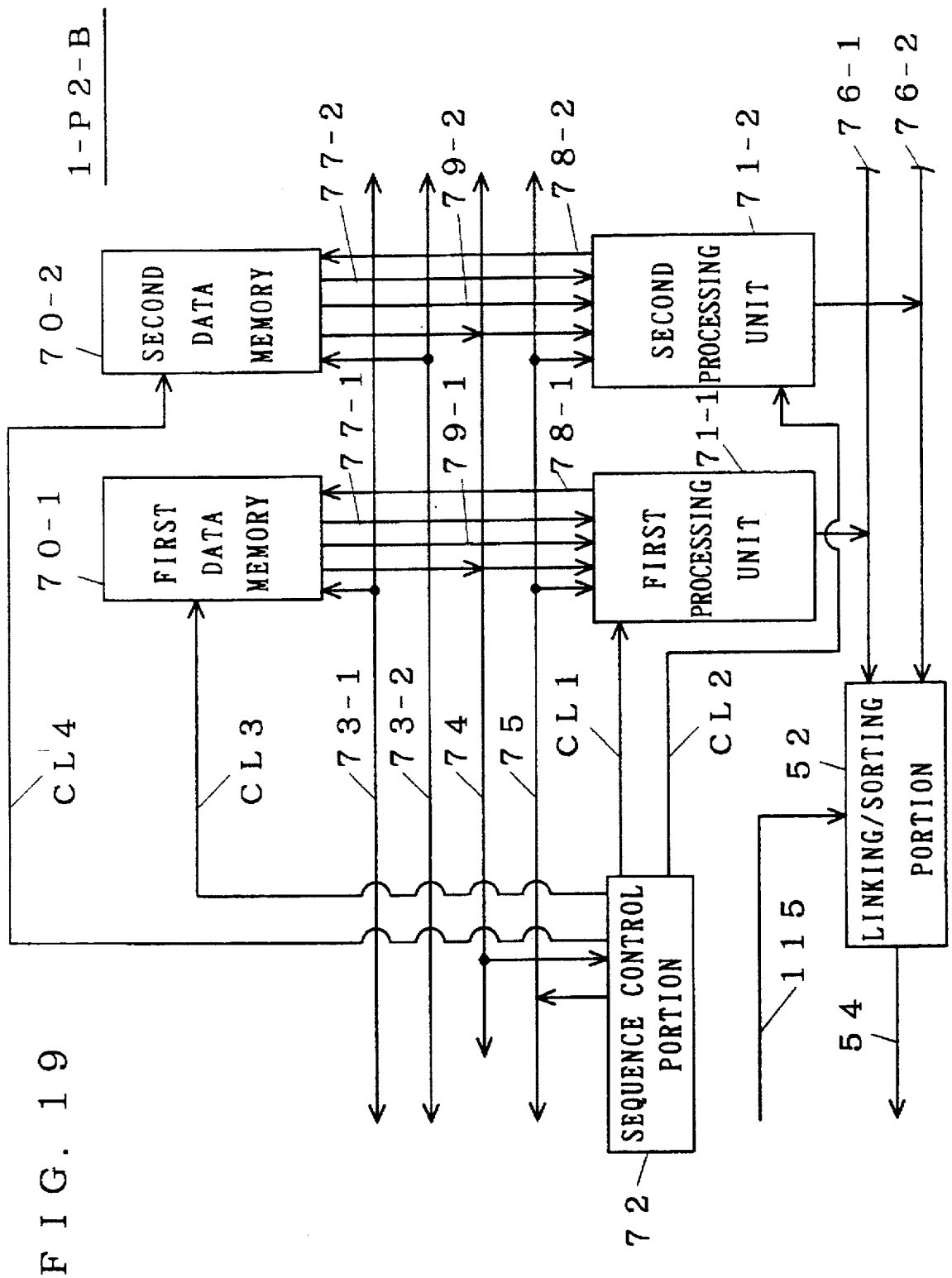
FIG. 19 is a block diagram of respective portions of the image processing LSI circuit according to a sixth preferred embodiment of the present invention.

FIG. 19 illustrates a characteristic portion 1-P2-B of the image processing LSI circuit according to a sixth preferred embodiment of the present invention. Other portions of the sixth preferred embodiment are identical with those of the first and second preferred embodiments.

In FIG. 19, the reference characters 70-1, 70-2 designate first and second data memories, respectively; 71-1, 71-2 designate first and second processing units, respectively; 72 designates a sequence control portion for controlling the first and second data memories 70-1, 70-2 and the first and second processing units 71-1, 71-2 and the like; 73-1 designates a data bus (referred to hereinafter as DI0 or first data bus) for transferring data (external data) read from the external memory and DMA-transferred, to the first data memory 70-1; 73-2 designates a data bus (referred to hereinafter as DI1 or first data bus) for transferring the external data to the second data memory 70-2; 74 designates a data bus (referred to hereinafter as GDM or broadcast data transfer data bus) for broadcast-transferring the data of selected one of the first and second data memories 70-1, 70-2; 75 designates a data bus (referred to hereinafter as GID or immediate data transfer data bus) for transferring immediate data (to be added to an address of the data memory and stored in the instruction memory 7) to be fed into an instruction code; 76-1 designates a data bus (referred to hereinafter as GP0 or second data bus) for transferring the output data from the first processing unit 71-1; 76-2 designates a data bus (referred to hereinafter as GP1 or second data bus) for transferring the output data from the second processing unit 71-2; 77-1 designates data transfer means (third data bus) for transferring the read data from the first data memory 70-1 to the first processing unit 71-1; 77-2 designates data transfer means (third data bus) for transferring the read data from the second data memory 70-2 to the second processing unit 71-2; 78-1 designates data transfer means (fourth data bus) for transferring data from the first processing unit 71-1 to the first data memory 70-1; 78-2 designates data transfer means (fourth data bus) for transferring data from the second processing unit 71-2 to the second data memory 70-2; 79-1, 79-2 designate data transfer means (fifth data buses) in another system for transferring the read data from the first and second data memories 70-1, 70-2 to the first and second processing units 71-1, 71-2; and CL1 to CLA designate signals for controlling the data input and output.

In the sixth preferred embodiment, external data are transferred to the first and second data memories 70-1, 70-2 through the DI0 73-1, DI1 73-2, respectively. In image processing, the key to performance improvement is to arrange a plurality of processing units for executing a large amount of calculations and to efficiently feed data to the plurality of processing units. The sixth preferred embodiment comprises the DI buses which are equal in number to the first and second processing units 71-1, 71-2 (two in this case). The two buses provide a greater band width during a transfer than one shared bus.

The first and second processing units 71-1, 71-2 arranged in parallel have respective local memories, that is, the first and second data memories 70-1, 70-2. A significant problem of this structure is how data are shared between the processing units. To solve this problem, the sixth preferred embodiment comprises the GDM bus 74 for selectively transferring the read data from the first and second data memories 70-1, 70-2. The so-called broadcast data transfer is carried out by using the GDM bus 74.

The broadcast data transfer system is a data transfer system in which one datum is fetched by all processing units. The datum shared between all of the processing units is referred to as broadcast data.

One of the features of the sixth preferred embodiment is that the broadcast data are fed only from the first and second data memories 70-1, 70-2. The external data are ensured to be stored in the first and second data memories 70-1, 70-2, and the calculation results of the first and second processing units 71-1, 71-2 are also stored in the first and second data memories 70-1, 70-2 through the data transfer means 78-1, 78-2. Thus, it is most efficient to provide the function (the GDM bus 74) of broadcast-transferring the data read from the first and second data memories 70-1, 70-2. The broadcast transfer requires only one datum at one time.

The sixth preferred embodiment further comprises the GID bus 75 for transferring the immediate data. The bus 75 is essential for calculation using the immediate data in the instruction code. This affords the calculation between the data on the GID 75 and the data on the GDM 74. This operation is required for data initialization of data registers in the first and second processing units 71-1, 71-2, and the data bus structure of the sixth preferred embodiment is adaptable to such processing.

(Seventh Preferred Embodiment)

Figure 20:
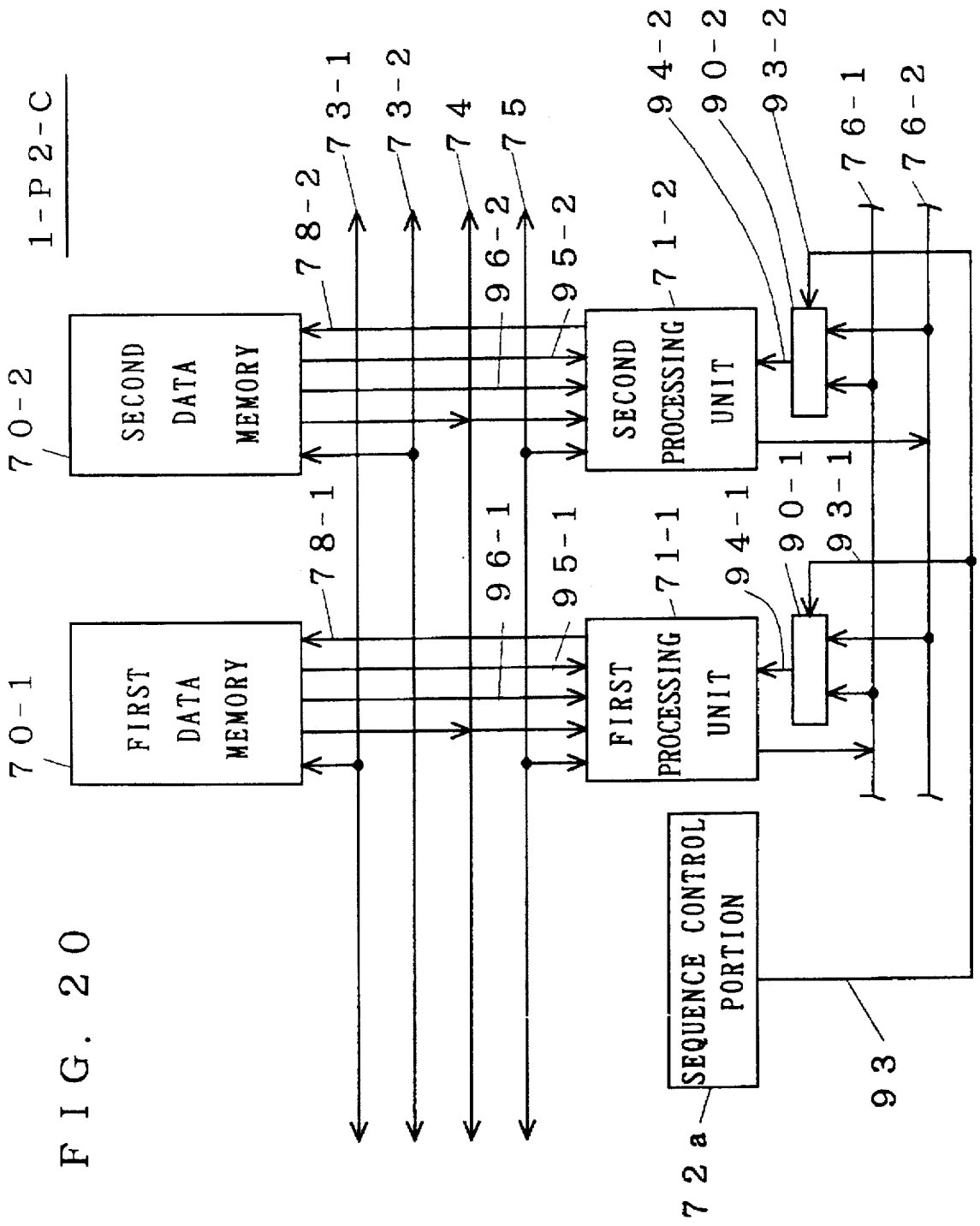
FIG. 20 is a block diagram of respective portions of the image processing LSI circuit according to a seventh preferred embodiment of the present invention.

FIG. 20 illustrates a characteristic portion 1-P2-C of the image processing LSI circuit according to a seventh preferred embodiment of the present invention. In FIG. 20, the reference characters 70-1, 70-2 designate first and second data memories, respectively; 71-1, 71-2 designate first and second processing units, respectively; 73-1 designates a data bus (referred to hereinafter as DI0) for transferring the external data to the first data memory 70-1; 73-2 designates a data bus (referred to hereinafter as DI1) for transferring the external data to the second data memory 70-2; 74 designates a data bus (referred to hereinafter as GDM) for transferring data of selected one of the first and second data memories 70-1, 70-2; 75 designates a data bus (referred to hereinafter as GID) for transferring immediate data to be given into an instruction code; 76-1 designates a data bus (referred to hereinafter as GP0) for transferring the output data from the first processing unit 71-1; 76-2 designates a data bus (referred to hereinafter as GP1) for transferring the output data from the second processing unit 71-2; 95-1, 96-1 designate data transfer means (third and fifth data buses) for transferring the read data from the first data memory 70-1 to the first processing unit 71-1; 95-2, 96-2 designate data transfer means (third and fifth data buses) for transferring the read data from the second data memory 70-2 to the second processing unit 71-2; 78-1 designates data transfer means (fourth data bus) for transferring data from the first processing unit 71-1 to the first data memory 70-1; 78-2 designates data transfer means (fourth data bus) for transferring data from the second processing unit 71-2 to the second data memory 70-2; 90-1, 90-2 designate data selection circuits (processing unit input selector means) for selecting one datum from the two data buses 76-1, 76-2; 93 designate a selection signal (processing unit input select signal) common to the data selection circuits 90-1, 90-2; 94-1 designates output data from the data selection circuit 90-1; and 94-2 designates output data from the data selection circuit 90-2.

In image processing, each of the data memories 70-1, 70-2 often holds one-raster data. For parallel processing requiring image information for a plurality of rasters in a plurality of processing units, a need exists for data transfer means which can exchange data simultaneously. This operation is different in character from the broadcast of the same data. If the data exchange requires a number of clock cycles, the continuity of processing in the first and second processing units 71-1, 71-2 is failed, and the processing efficiency is lowered. According to the present invention, the provision of the GP0 76-1, GP1 76-2 serving as the data buses for transmitting the calculation results aside from the means 78-1, 78-2 for transferring the processing results to the local data memories allows simultaneous data shift between the processing units.

The feature of the seventh preferred embodiment is input data variations to the first and second processing units 71-1, 71-2. The data entering the first processing unit 71-1 are the data on the GID bus 75, the broadcast data on the GDM bus 74, the read data 95-1, 96-1 from the first data memory 70-1, and the data 94-1, that is, the data on one of the output buses GP0 76-1, GP1 76-2 of the first and second processing units 71-1, 71-2 which is selected by the data selection circuit 90-1 in response to a data selection signal 93-1. All of the processing units have similar data inputs. That is, the data entering the second processing unit 71-2 are the immediate data from the GID bus 75, the broadcast data from the GDM bus 74, the read data 95-2, 96-2 from the second data memory 70-2, and the data 94-2, that is, the data on one of the output buses GP0 76-1, GP1 76-2 of the first and second processing units 71-1, 71-2 which is selected by the data selection circuit 90-2 in response to a data selection signal 93-2. Such an arrangement provides data transfer functions to be described below.

One of the data transfer functions is the broadcast data transfer of data stored in any data memory. Another data transfer function is a selective transfer (data shift transfer) of any calculation output.

The data shift transfer means such processing that when there are N processing units and N data memories, each of the processing units (in the case of four processing units arranged in parallel) selects the output data from three adjacent processing units on the right.

The first processing unit 71-1 of the present invention receives the following data: the data on the GID bus 75, the data on the GDM bus (for broadcast function), the read data 95-1, 96-1 from the first data memories 70-1, and the data 94-1 (for data shift function) selected by the data selection circuit 90-1 among the data on the data buses GP0 and GP1. The second processing unit 71-2 receives data corresponding to the data entered to the first processing unit 71-1. The effect of the present invention is to achieve the calculation by the arbitrary combination of these data.

The seventh preferred embodiment includes two read data 95-1, 96-1 from the first data memory 70-1 but may include one read datum therefrom depending upon the structure of the data memory. The two data memories, two processing units, two DI buses, and two GP buses are provided in the seventh preferred embodiment. However, the number of these elements is not limited to two and may be M ($\geq 2$) which is general and provides similar effects. Such an example is described in a modification of the seventh preferred embodiment.

(Modification of Seventh Preferred Embodiment)

Figure 22:
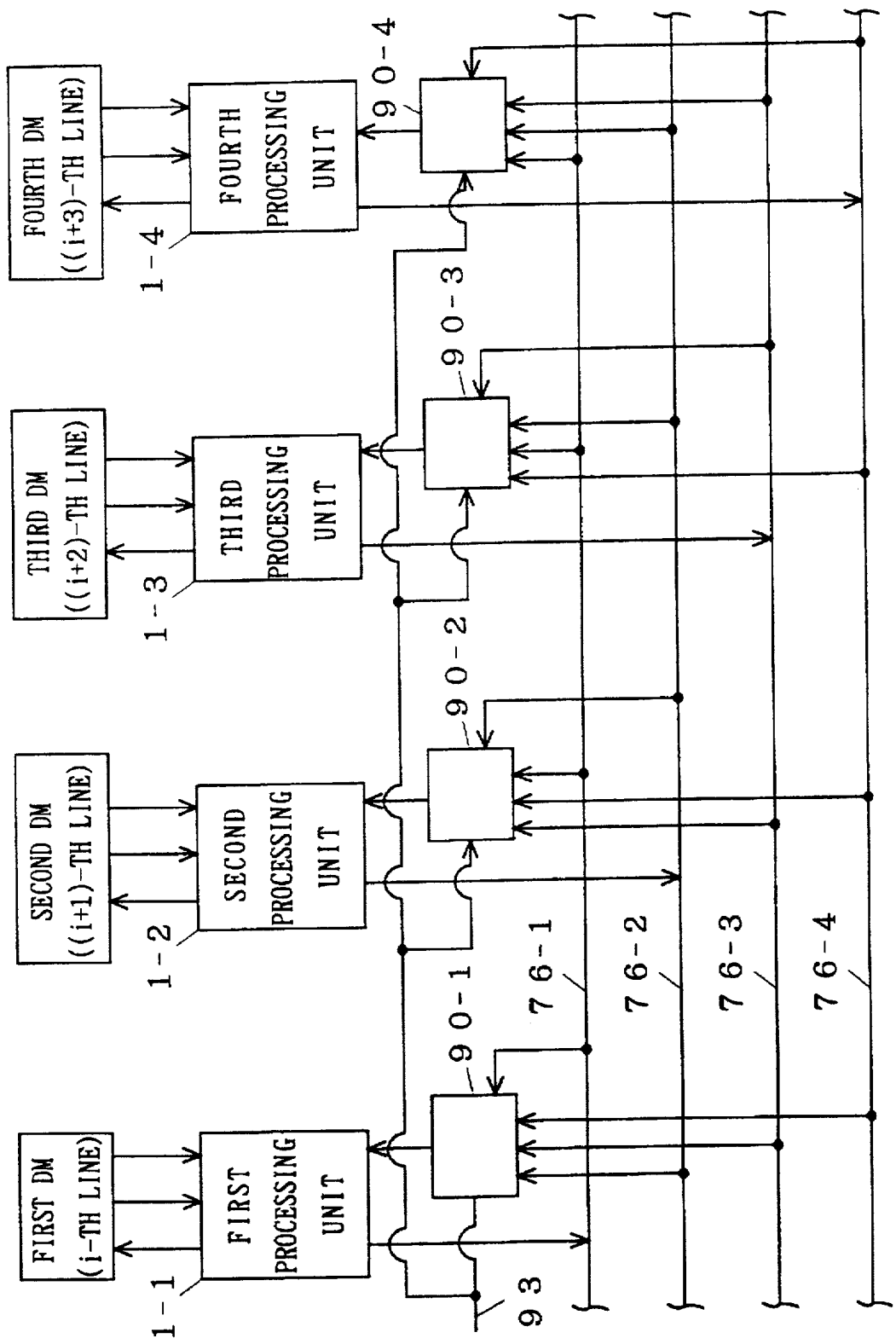
FIG. 22 is a block diagram of a modification of FIG. 21.

FIG. 22 illustrates a modification of FIG. 20 which comprises four data memories (DMs), four processing units, four second data buses (first image processing result transfer data buses), and four data selection circuits (M=4). For example, when the selection signal 93 selects the next processing unit but one on the right, the data selection circuits 90-1, 90-2, 90-3, 90-4 apply the data on the data buses 76-3, 76-4, 76-1, 76-2 to the corresponding processing units, respectively.

In the modification, each of the processing units 1-1 to 1-4 may receive the output data arbitrarily selected among the output data of other three processing units as one of its inputs.

(Eighth Preferred Embodiment)

Figure 21:
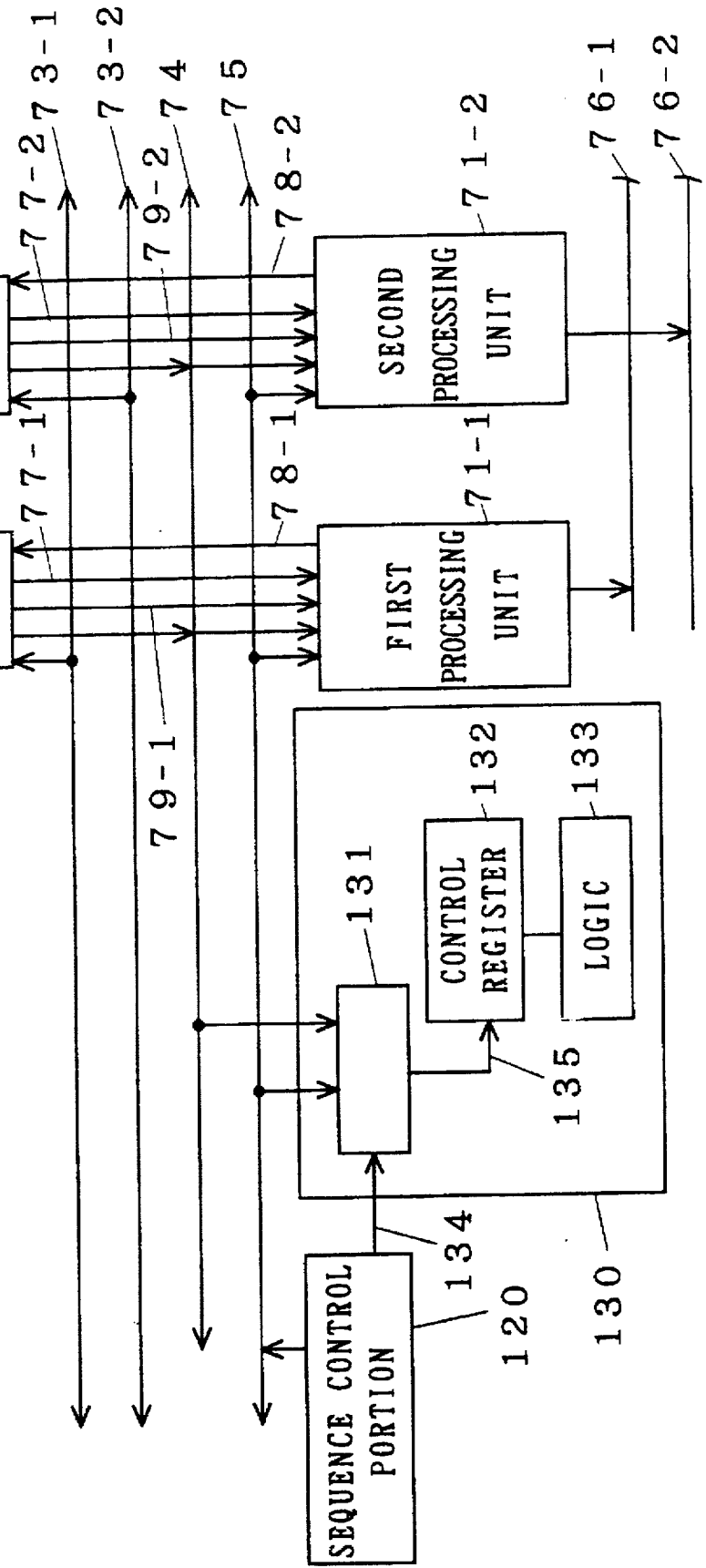
FIG. 21 is a block diagram of respective portions of the image processing LSI circuit according to an eighth preferred embodiment of the present invention.

FIG. 21 is a block diagram of a characteristic portion of 1-P2-D according to an eighth preferred embodiment of the present invention. In FIG. 21, the reference characters 70-1, 70-2 designate first and second data memories, respectively; 71-1, 71-2 designate first and second processing units, respectively; 73-1 designates a data bus (referred to hereinafter as DI0) for transferring the external data to the first data memory 70-1; 73-2 designates a data bus (referred to hereinafter as DI1) for transferring the external data to the second data memory 70-2; 74 designates a data bus (referred to hereinafter as GDM) for transferring data of selected one of the first and second data memories 70-1, 70-2; 75 designates a data bus (referred to hereinafter as GID) for transferring immediate data to be given into an instruction code; 76-1 designate a data bus (referred to hereinafter as GP0) for transferring the output data from the first processing unit 71-1; 76-2 designates a data bus (referred to hereinafter as GP1) for transferring the output data from the second processing unit 71-2; 77-1 designates data transfer means for transferring the read data from the first data memory 70-1 to the first processing unit 71-1; 77-2 designates data transfer means for transferring the read data from the second data memory 70-2 to the second processing unit 71-2; 78-1 designates data transfer means for transferring data from the first processing unit 71-1 to the first data memory 70-1; 78-2 designates data transfer means for transferring data from the second processing unit 71-2 to the second data memory 70-2; 120 designates a sequence control portion; 130 designates a control circuit (DMA transfer control portion, address generating portion, and the like) having the function of portions of the sequence control portion 120 for controlling the image processing LSI circuit and other control functions; 131 designates a data selector circuit (control register selector) for selecting one of the GID bus 75 and the GDM bus 74; 132 designates a control register; 133 designates a circuit for signal generation based on the data of the control register 132; 134 designates a selection signal fed to the data selector circuit 131 from the sequence control portion 120; and 135 designates output data from the data selector circuit 131 and connected to the control register 132.

The technical ideas of the eighth preferred embodiment are to be described below. Consideration is given to the addressing of the data memories using the calculation results of the processing units (writing to the control register 132 with the outputs from the processing units). This purpose may be achieved by connecting the data buses 76-1, 76-2 to the control register 132. However, this method requires the connection of the data buses 76-1, 76-2 to the data selector circuit 131, which causes an increased length of the interconnection lines, resulting in an increased area of the LSI chip and increased parasitic capacitances.

To solve the problem and achieve the aforesaid purpose, the calculation results are transferred from the processing units through the data memories to the broadcast bus 74 in the eighth preferred embodiment. In this manner, the eighth preferred embodiment positively uses the GDM bus 74 for broadcast transfer.

Operation of the eighth preferred embodiment will be discussed below wherein the control circuit 130 functions as a DMA transfer control portion.

There is a need to transfer the image data from the external memory to the first and second data memories 70-1, 70-2 in the image processing LSI circuit. The execution of the transfer, not by instructions, is effective in speeding up of the processing, reduction in the number of instruction steps, and reduction in instruction memory capacitances, and has been often employed. It is well known in the art that a two-dimensional addressing function is essential for handling of image data since meaningful partial image data must be extracted from the image data which are two-dimensional information. It is assumed that the control register 132 stores a transfer start address for the external data memories (M1 to M3) during the DMA transfer. The required two-dimensional addresses are produced by the logic 133 and other registers not shown. In order to start extracting a two-dimensional image after completion of extraction of the preceding two-dimensional image, it is necessary to establish the transfer start address for the external data memories (M1 to M3) again in the control register 132. The next start address is calculated from the previous start address or given by an instruction. In general, this calculation is performed by the processing units. This necessitates the provision of the data transfer means for transferring the calculation results of the first and second processing units 71-1, 71-2 to the control register 132 and the means for transferring the immediate data in the instruction. In the conventional image processing LSI circuit including a single processing unit, only the connection of the output from the processing unit to the input of the control register is required. However, the image processing LSI circuit of the present invention containing the processing units arranged in parallel (SIMD type) needs the means for selectively transferring the output from any processing unit to the control register 132. Only simple connections of the output data from all processing units to the control register 132 cause a multiplicity of bit data lines in the image processing LSI circuit as above described, resulting in a lowered operation speed and increased power consumption (with capacitance charging and discharging) due to the increases in wiring area and wiring load capacitance.

The present invention employs the GDM bus 74 for selectively transferring the read data from one of the first and second data memories 70-1, 70-2 corresponding to the processing units 71-1, 71-2. The calculation result of the first or second processing unit 71-1 or 71-2 is stored once in the first or second data memory 70-1 or 70-2, read as required, and connected to the control register 132 through the GDM bus 74.

The GID bus 75 for transferring the immediate data is also required to be connected to the control register 132. Thus the control register 132 is designed to receive data through the data selector circuit 131. The data selector circuit 131 switches connection between the GDM bus 74 and the GID bus 75 in response to the select signal 134.

Such an arrangement permits a single bus for transferring the calculation result data (GDM bus 74), reducing the chip area and parasitic capacitances without data transfer flexibility. Since the data transfer from the first and second data memories 70-1, 70-2 is enabled, data stored at any address in the first and second data memories 70-1, 70-2 previously storing a set value for the control register 132 may be transferred to the control register 132 with the same arrangement.

The first to eighth preferred embodiments have effects to be described below.

The first preferred embodiment comprises the SIMD type processing units, the data memories, the address generator; the DMA transfer control portion, the linking/sorting portion (postprocessing portion), the external interface for the external data memories, the instruction memory, the sequence control portion, and the PLL, thereby performing the preprocessing, feature extraction, and matching of the image processing at high speeds, adapted to system specification changes due to program changes, and greatly reducing the time for system development. The SIMD type processing units which are programmable allow conditional branching.

The external input data are entered into the data memories 2-1 to 2-3 only by DMA transfer. The DMA transfer control portion 4 generates the write address which is in turn applied to the first to third data memories 2-1 to 2-3 through the address bus 27. Since the processing of the external data are carried out by reading data stored in the first to third data memories 2-1 to 2-3, the internal calculation and external data transfer are completely separated. This provides the image processing LSI circuit in which the external transfer, if at low speeds, does not interfere with the high-speed internal calculation. The address generator 3 generates the address 29 for reading data from the first to third data memories 2-1 to 2-3 under control of the sequence control portion 8.

In addition, the first preferred embodiment provides high-speed image processing since the data input to the processing units and the external transfer are separated and the external data transfer is performed through the postprocessing portion 5 (linking/sorting portion) in which calculation loads are low and the wait state does not greatly influence the processing throughput. The first preferred embodiment is expected to require fewer external data pins of the output port portion than the structure in which the processing unit outputs are directly transferred to the exterior. This contributes to reduction in area and power consumption of the image processing LSI circuit.

The sixth preferred embodiment comprises the GDM bus 74 which is one of the data buses for selectively transferring the read data from the data memories 70-1, 70-2. The broadcast data transfer is carried out using the GDM bus 74. One of the features of the sixth preferred embodiment is that the broadcast data are fed only from the first and second data memories 70-1, 70-2. The external data are ensured to be stored in the first and second data memories 70-1, 70-2, and the calculation results are stored in the data memories 70-1, 70-2 through the data transfer means 78-1, 78-2. The provision of the broadcasting function (GDM bus 74) of the read data from the first and second data memories 70-1, 70-2 is most efficient. One datum should be used for broadcast transfer at one time. In image processing, each of the data memories 70-1, 70-2 often stores one-raster data. For parallel processing of the calculations requiring image information for a plurality of rasters in a plurality of processing units, a need exists for data transfer means which can exchange data simultaneously. This operation is different in character from the broadcast of the same data. If the data exchange requires a number of clock cycles, the continuity of processing in the first and second processing units is failed, and the processing efficiency is lowered. To improve the technique of the sixth preferred embodiment, the seventh preferred embodiment comprises the GP0 76-1 and the GP1 76-2 serving as the data buses for calculation result transfer aside from the means 78-1, 78-2 for transferring the processing results to the local data memories, and the GID bus 75 for data transfer. The bus 75 is essential for calculation using constant value data in the instruction code. This permits calculation between the data on the GID bus 75 and the data on the GDM bus 74.

In the seventh preferred embodiment, the processing unit 71-1 (71-2) receives the data on the GID bus 75, the data on the GDM bus 74, and the data 94-1 (94-2) obtained by selecting one of the output buses GP0 76-1 and GP1 76-2 of the processing units 71-1, 71-2 by the data selection means 90-1, 90-2 in response to the data selection signal 93-1 (93-2) independently of the data on the read data transfer means from the data memory. This arrangement provides the data transfer functions to be described below.

One of the functions is the broadcast data transfer of the data stored in any data memory. The other is the selective transfer (data shift transfer) of any calculation output.

Further, in the respective preferred embodiments, the I/O port (external data port) of the image processing LSI circuit includes the data ports (DI ports) for writing data to the n-th data memory ($n \geq 2$); the data ports (DO ports) for selectively transferring a half amount of the output data from the n processing units to the exterior of the image processing LSI circuit at one time; the data port (LINK port, which is absent in the first preferred embodiment) for transferring the intermediate processing data for use in the multiprocessor structure; and the data port (the IMO port) for transferring the raster scanning image data delayed by the desired clock cycles in the image processing LSI circuit to the exterior of the image processing LSI circuit. This provides for a high-speed data feed to the SIMD type processing units arranged in parallel in the image processing LSI circuit. The simultaneous transfer of data the number of which is half the number of processing units may reduce the number of external data pins and power consumption in the output driver circuit portion. As above stated, some types of image processing require the process steps in the postprocessing which are fewer than the process steps in the processing units. In other words, there is a time allowance to output the postprocessing result. The number of postprocessing outputs arranged in parallel is often less than the degree of parallelism of the outputs of the processing units. Increase in the number of external pins increases the sum of the external parasitic capacitances to be driven to increase the power consumption of the image processing LSI circuit. The common effect of the respective preferred embodiments is the reduction in the number of external pins without lowering the processing performance of the image processing LSI circuit.

In the eighth preferred embodiment, the data bus 74 (GDM bus) for 25 transferring data from selected one of the first and second data memories 70-1, 70-2 and the data bus 75 (GID bus) for transferring the immediate data in the instruction code are connected to the control register 132 through the data selector circuit 131 for selecting one of the GID bus 75 and the GDM bus 74. Both of the immediate data and the data which are the processing unit results previously stored in the data memories are transferred to the control register 132, providing high flexibility. Further, the use of one broadcast function bus 74 for this transfer prevents a multiplicity of bit data lines from being wired in the image processing LSI circuit, thereby avoiding increase in wiring area, lowering of the operation speed due to increase in wiring load capacitance, and increase in power consumption (due to capacitance charging and discharging).

(Supplemental Description)

Figure 30:
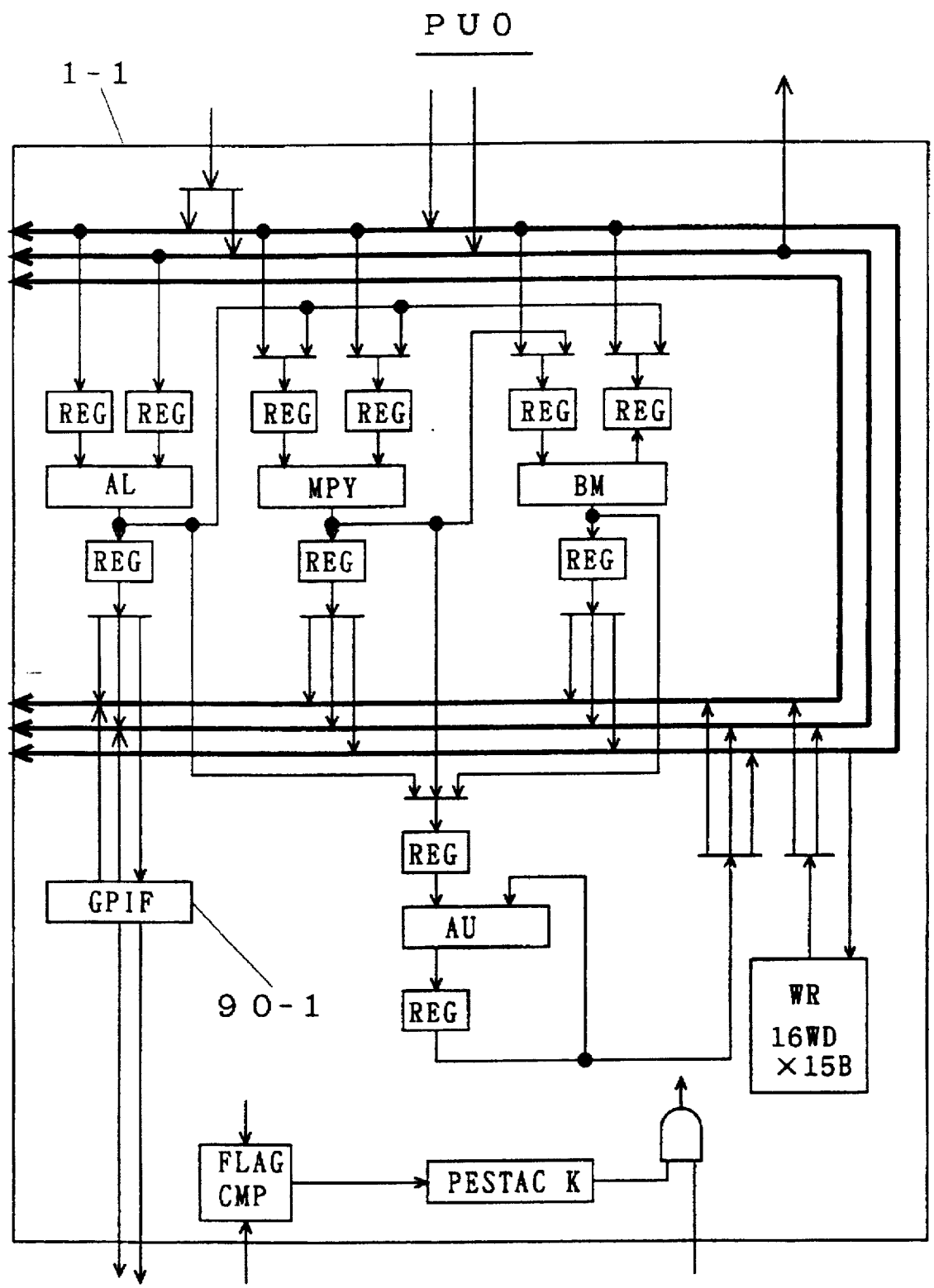
FIG. 30 is a block diagram of a processing unit.

FIGS. 24 to 29 illustrate a general internal structure of the image processing LS1 circuit 1 as a reference. In FIGS. 24 to 29, "DMAC" represents the DMA transfer control portion; "AGU" represents the address generating portion; "Sequence Controller" represents the sequence control portion; "WCS" represents the instruction memory; "PU" represents the processing units; and "DM" represents the data memories. FIG. 30 illustrates an internal structure of the PU0 (first processing unit) on an enlarged scale. Other processing units (PU1 to PU7) are similar in construction to the PU0.

Figure 31:
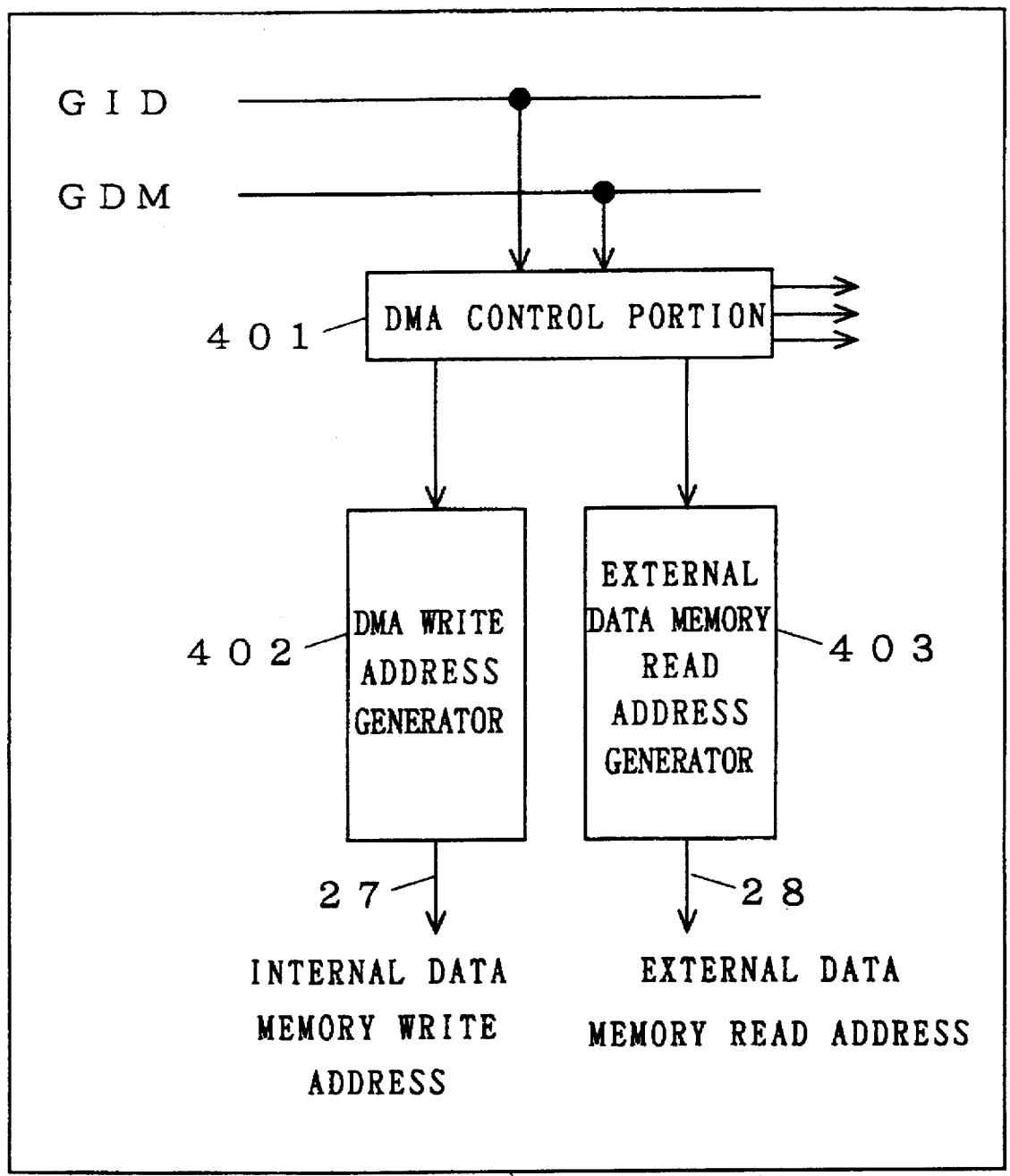
FIG. 31 is a block diagram of a DMA transfer control portion.

FIG. 31 is a block diagram illustrating the internal structure of the DMA transfer control portion 4. In FIG. 31, the reference numeral 401 designates a DMA control portion; 402 designates a portion for generating the write address signal 27 (FIG. 5) for data memories; and 403 designates a portion for generating the read address signal 28 (FIG. 3) for the external data memories.

Figure 32:
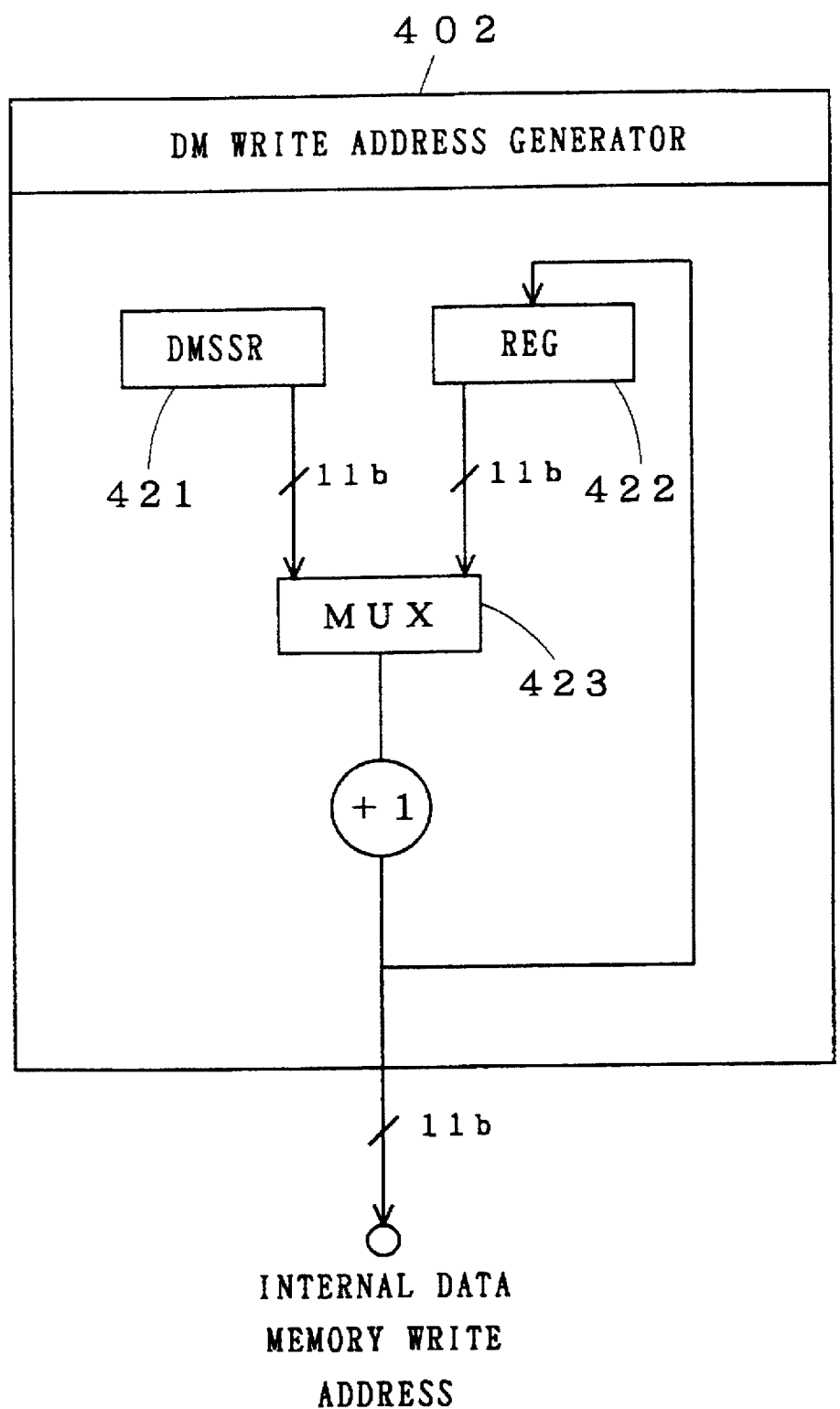
FIG. 32 is a block diagram of a DM write address generator.
Figure 33:
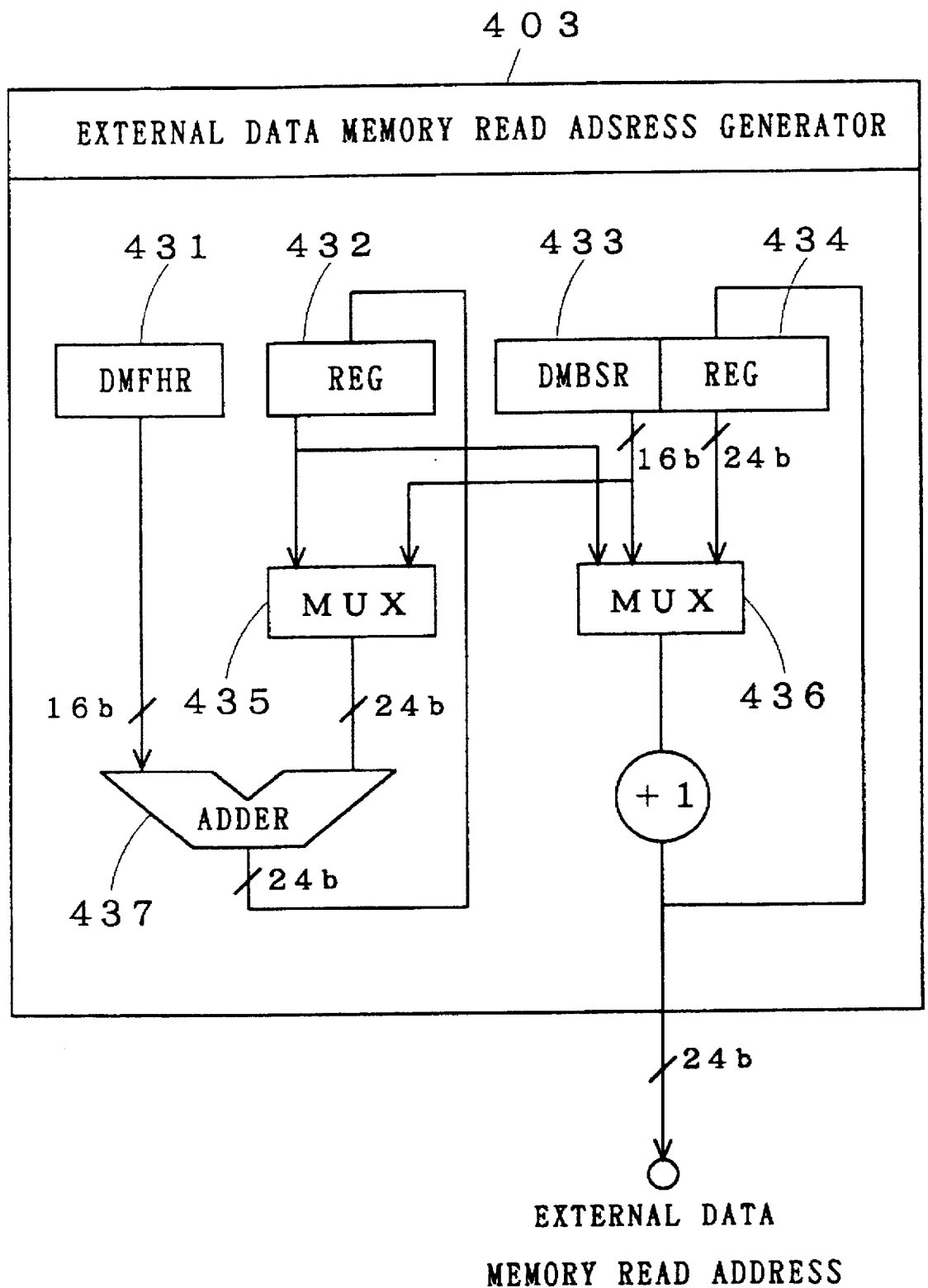
FIG. 33 is a block diagram of an external data read address generator.
Figure 34:
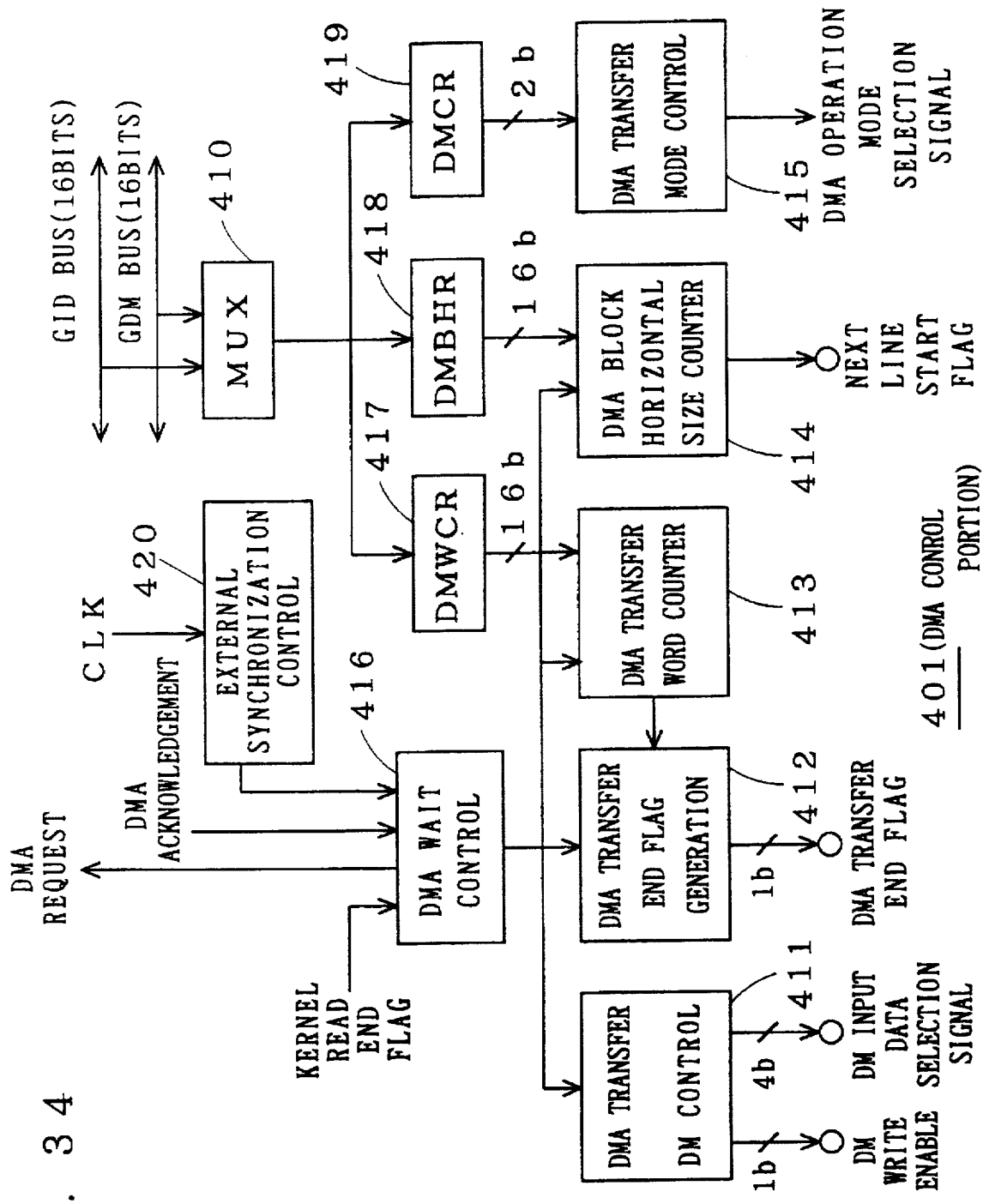
FIG. 34 is a block diagram of a DMA control portion.
Figure 36:
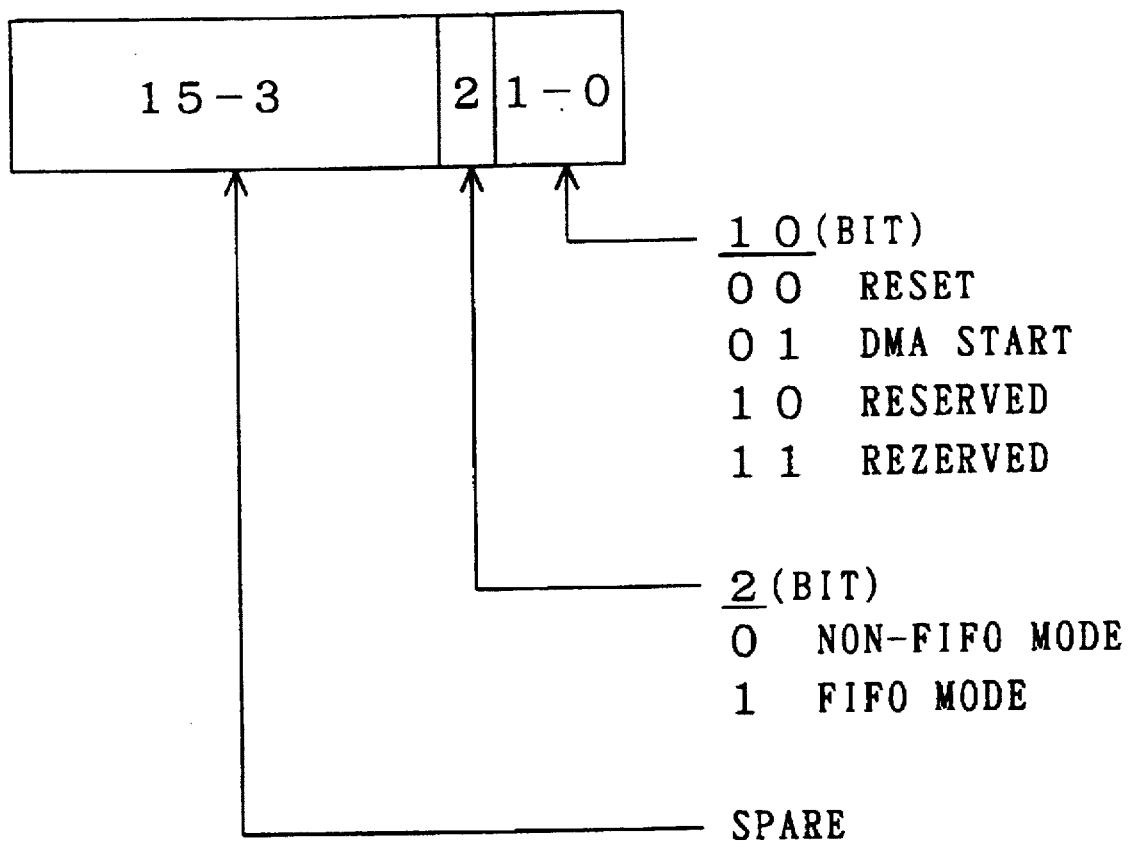
FIG. 36 illustrates bit assignment for the DMA control register.

FIGS. 32, 33, 34 illustrate the DM write address generator 402, the external data memory read address generator 403, and the DMA control portion 401 of FIG. 31 in detail, respectively. FIG. 35 illustrates the symbols, names and functions of the respective portions of FIGS. 32 to 34. FIG. 36 illustrates bit allocation in a DMA control register (DMCR) 419.

Figure 37:
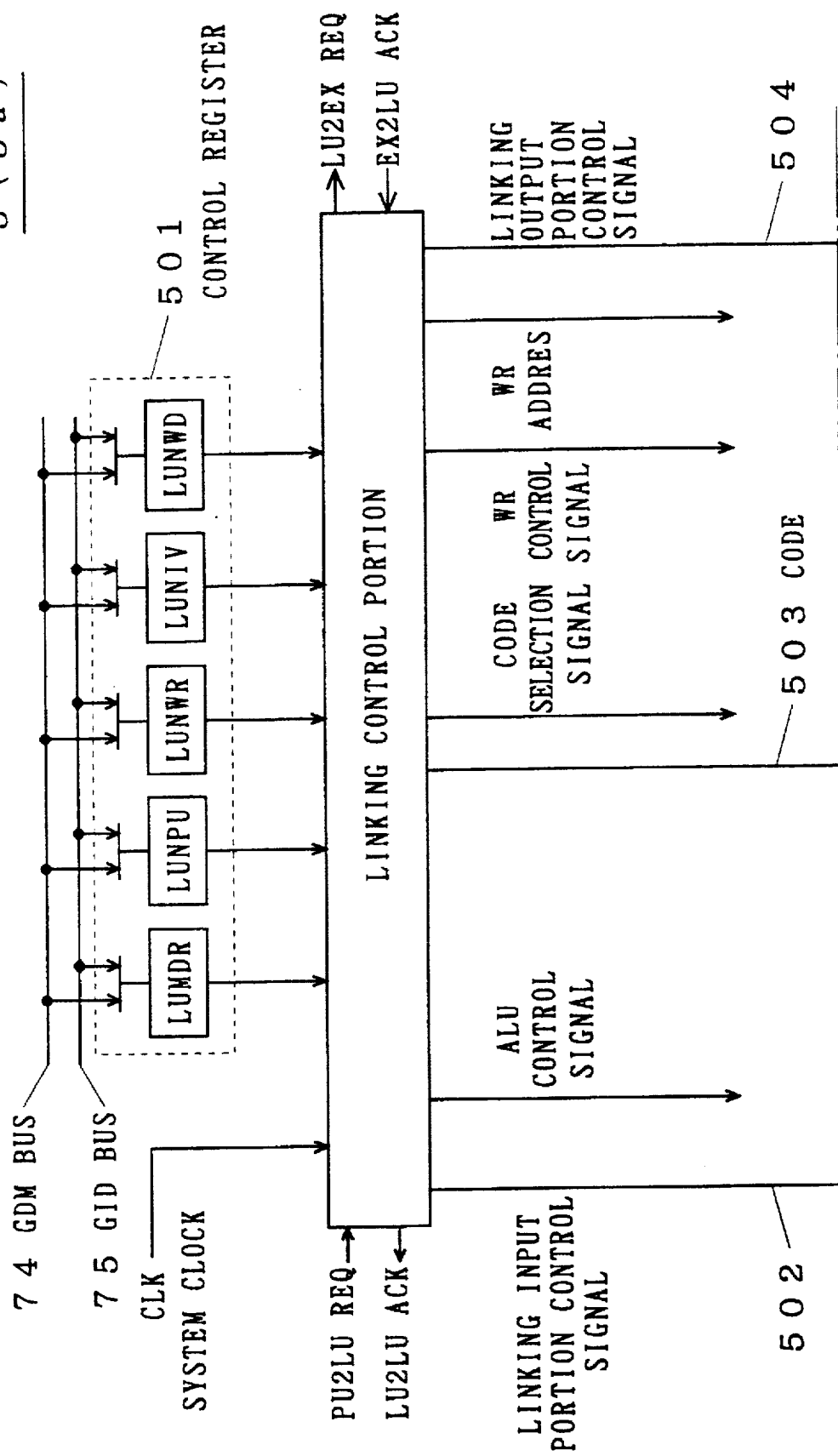
FIGS. 37 and 38 are block diagrams of internal construction of the linking/sorting portion.
Figure 38:
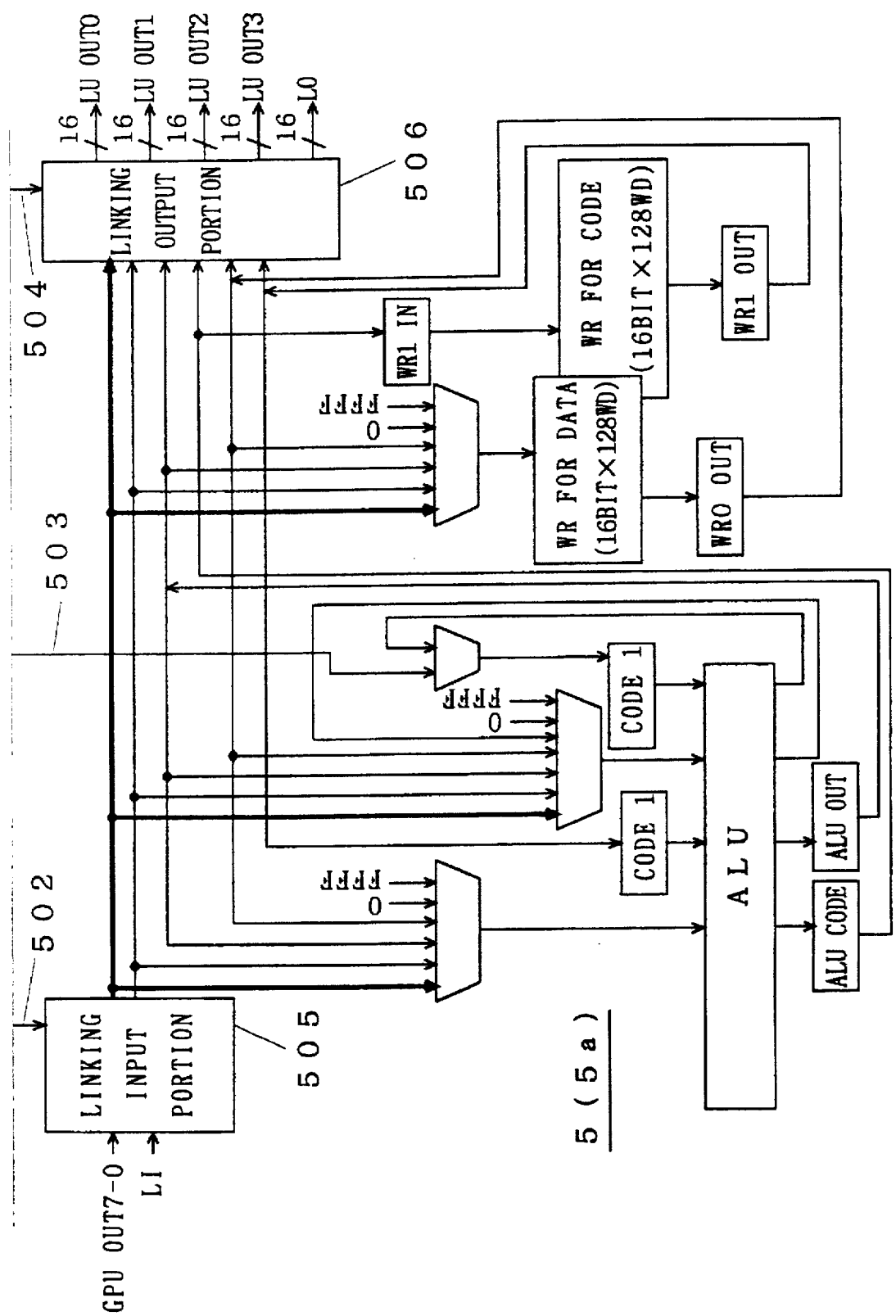
Figure 40:
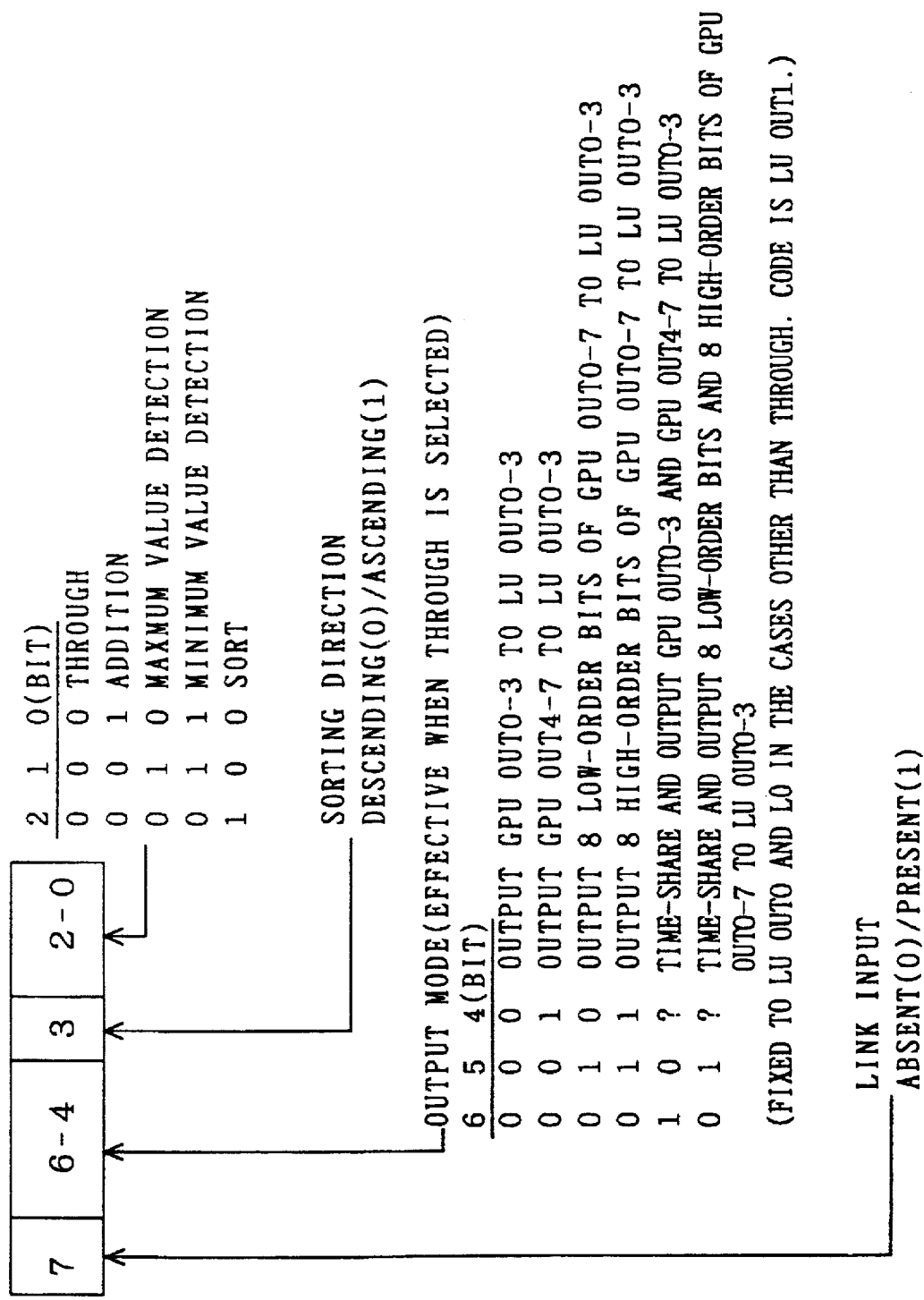
FIG. 40 illustrates bit assignment for a linking mode register.

FIGS. 37 and 38 illustrate the internal structure of the linking/sorting portions 5, 5a as a reference. In FIGS. 37 and 38, the reference numeral 501 designates a control register; 502 designates a linking input portion control signal; 503 designates a code selection signal; 504 designates a linking output portion control signal; 505 designates a linking input portion; and 506 designates a linking output portion. FIG. 39 illustrates the symbols, names and functions of the respective portions of the control register 501. FIG. 40 illustrates bit allocation in a linking mode register "lumdr" in the control register 501.

FIG. 41 is a timing chart of the data transfer into the image processing LSI circuit 1 by the DMA transfer control portion 4. FIG. 42 is a timing chart of the output data transfer out of the image processing LSI circuit 1 by the linking/sorting portions 5, 5a.

While the invention has been shown and described in detail, the foregoing description is in all aspects illustrative and not restrictive. It is therefore understood that numerous modifications and variations can be devised without departing from the scope of the invention.

What is claimed is:

1. An image processing LSI circuit comprising:

clock signal generating means for multiplying an externally applied basic clock to generate a clock;

data memory means;

DMA transfer control means for reading and transferring an input data signal to be subjected to image processing from an external memory storing the input data signal in response to said basic clock to write transfer said input data signal to said data memory means in response to a write address signal, said write address signal being generated in response to said clock;

an instruction memory for storing an instruction code signal; and control means for generating a read address signal synchronized with said clock in response to said instruction code signal read from said instruction memory to control reading of said input data signal from said data memory means by outputting said read address signal.

2. The image processing LSI circuit of claim 1, wherein said data memory means comprises a plurality of data memories, and wherein said image processing comprises first image processing and second image processing, said image processing LSI circuit further comprising:

a plurality of SIMD type processing units provided in corresponding relation to outputs of said plurality of data memories for executing said first image processing by parallel calculation processing in response to said clock; and a postprocessing portion connected to outputs of said plurality of processing units for executing said second image processing in response to said clock to output an output data signal to the exterior.

3. The image processing LSI circuit of claim 2, wherein said plurality of data memories and said plurality of processing units include first to N-th data memories and first to N-th processing units (N≧2), respectively, and wherein an input of the first data memory is connected to an output of said DMA transfer control means, and inputs of said second to N-th data memories are connected to outputs of said first to (N−1)-th data memories, respectively.

4. The image processing LSI circuit of claim 3, wherein each of said data memories comprises a plurality of banks, and wherein, while said DMA transfer control means writes said input data signal to one of said plurality of banks in response to said write address signal, said control means reads said input data signal which has been written from the next one of said banks in response to said read address signal.

5. The image processing LSI circuit of claim 3, wherein each of said plurality of processing units comprises a first output connected to said postprocessing portion and a second output connected with a fourth data bus to an input of one of said data memories which transmits said input data signal to a first input of said each processing unit through a third data bus.

6. The image processing LSI circuit of claim 5,
wherein said control means and said plurality of processing units are connected to each other with an immediate data transfer data bus for transferring immediate data of said control means to said processing units.

7. The image processing LSI circuit of claim 6,
wherein said first to N-th data memories and said first to N-th processing units are connected to each other with a broadcast transfer data bus for transferring and applying a data signal read from one of said first to N-th data memories to all of said first to N-th processing units.

8. The image processing LSI circuit of claim 7, further comprising:
N first image processing result transfer data buses for connecting said first outputs of said processing units associated therewith to said postprocessing portion; and
N processing unit input selector means each having an input connected to a corresponding one of said N first image processing result transfer data buses and an output connected to a second input of a corresponding one of said processing units,
wherein said control means outputs a processing unit input select signal to said N processing unit input selector means to control outputs from said N processing unit input selector means.

9. The image processing LSI circuit of claim 8,
wherein said control means comprises:
a control register for holding a control information signal for generation of a control signal in said image processing LSI circuit; and
a register selector for selectively outputting data read from said broadcast transfer data bus and data read from said immediate data transfer data bus to said control register.

10. The image processing LSI circuit of claim 2,
wherein said plurality of data memories are separately connected to said DMA transfer control means.

11. The image processing LSI circuit of claim 2,
wherein connections between the outputs of said processing units and said postprocessing portion are established by second data buses equal in number to said processing units, respectively.

12. The image processing LSI circuit of claim 2, further comprising:
processing unit output control means connected between said plurality of processing units and said postprocessing portion for judging whether or not said postprocessing portion is in a wait state only when said plurality of processing units output processing results, said processing unit output control means causing said plurality of processing units to stop outputting said processing results when said postprocessing portion is in the wait state, said processing unit output control means permitting said plurality of processing units to output said processing results when said postprocessing portion is not in the wait state.

13. An image processing LSI circuit, comprising:
clock signal generating means for multiplying an externally applied basic clock to generate a clock;
a plurality of data memories;
DMA transfer control means for reading and transferring an input data signal to be subjected to first image processing and second image processing from an external memory storing the input data signal in response to said basic clock to write transfer said input data signal to said plurality of data memories in response to a write address signal, said write address signal being generated in response to said clock;
an instruction memory for storing an instruction code signal;
control means for generating a read address signal synchronized with said clock in response to said instruction code signal read from said instruction memory to control reading of said input data signal from said plurality of data memories by outputting said read address signal;
a plurality of SIMD type processing units provided in corresponding relation to outputs of said plurality of data memories for executing said first image processing by parallel calculation processing in response to said clock; and
a postprocessing portion connected to outputs of said plurality of processing units for executing said second image processing in response to said clock to output an output data signal to the exterior;
wherein said plurality of data memories and said plurality of processing units include first to N-th data memories and first to N-th processing units ($N \geq 2$), respectively, and said DMA transfer control means includes N outputs ($N \geq 2$),
said image processing LsI circuit further comprising:
first to (N−1)-th selector means having outputs connected to inputs of said second to N-th data memories, respectively,
wherein an input of one of said selector means corresponding to an i-th one ($2 \leq i \leq N$) of said data memories is connected to an i-th of the outputs of said DMA transfer control means and an output of an (i−1)-th one of said data memories, and
wherein said selector means switch their inputs in response to a select signal outputted from said control means.

14. The image processing LSI circuit of claim 13,
wherein a connection between the input of said first data memory and the first output of said DMA transfer control means and a connection between the input of one of said selector means connected to the input of said i-th data memory and the i-th output of said DMA transfer control means are established by N first data buses, respectively.

15. The image processing LSI circuit of claim 13,
wherein said postprocessing portion performs linking or sorting of processing results of said plurality of processing units as said second image processing.

16. The image processing LSI circuit of claim 15, further comprising:
data input ports arranged in parallel and receiving said externally applied input data signal to be applied to said plurality of processing units for transferring said input data signal to said DMA transfer control means;
data output ports arranged in parallel and receiving a processing result of said postprocessing portion for outputting said processing result to the exterior; and
a link output port receiving a linking result of said postprocessing portion for outputting said linking result to the exterior.

17. The image processing LSI circuit of claim 16, further comprising:
an input data signal output port connected to an output of said N-th data memory for receiving said input data signal delayed in said plurality of data memories to output said input data signal to the exterior.

18. The image processing LSI circuit of claim 17, further comprising:

a link input port receiving an externally applied linking intermediate result for transferring said result to said postprocessing portion.

19. The image processing LSI circuit of claim 13, wherein each of said data memories comprises a plurality of banks, and wherein, while said DMA transfer control means writes said input data signal to one of said plurality of banks in response to said write address signal, said control means reads said input data signal which has been written from the next one of said banks in response to said read address signal.

20. The image processing LSI circuit of claim 13, wherein each of said plurality of processing units includes a first output connected to said postprocessing portion and a second output connected with a fourth data bus to an input of one of said data memories which transmits said input data signal to a first input of said each processing unit through a third data bus.

* * * * *